United States Patent [19]
Geiner et al.

[11] Patent Number: 5,737,600
[45] Date of Patent: Apr. 7, 1998

[54] METHOD AND SYSTEM FOR LOG MANAGEMENT IN A COUPLED DATA PROCESSING SYSTEM

[75] Inventors: Robert Vaughn Geiner, Poughkeepsie; Jeffrey Mark Nick, Fishkill, both of N.Y.; Mark Phillips, Campbell, Calif.; James Henry Warnes, Poughkeepsie, N.Y.; Dennis Jack Zimmer, Eastleigh, England

[73] Assignee: International Business Machines Corporation, Armonk, N.Y.

[21] Appl. No.: 632,683

[22] Filed: Apr. 15, 1996

Related U.S. Application Data

[63] Continuation of Ser. No. 304,677, Sep. 12, 1994, abandoned.

[51] Int. Cl.$^6$ .................................................. G06F 17/30
[52] U.S. Cl. ........................ 395/616; 395/617; 395/618
[58] Field of Search ................................. 395/600, 616, 395/618, 617

[56] References Cited

U.S. PATENT DOCUMENTS

| | | | |
|---|---|---|---|
| 4,633,467 | 12/1986 | Abel et al. | 371/16 |
| 4,823,261 | 4/1989 | Bank et al. | 364/200 |
| 4,853,843 | 8/1989 | Ecklund | 364/200 |
| 4,912,637 | 3/1990 | Sheedy et al. | 364/300 |
| 5,010,560 | 4/1991 | Janney et al. | 377/20 |
| 5,151,988 | 9/1992 | Yamagishi | 395/600 |
| 5,157,667 | 10/1992 | Carusone, Jr. et al. | 371/29.1 |
| 5,202,998 | 4/1993 | Yanes | 395/725 |

FOREIGN PATENT DOCUMENTS

| | | | |
|---|---|---|---|
| 0438020A2 | 7/1991 | European Pat. Off. | G06F 15/40 |
| 0528617A2 | 2/1993 | European Pat. Off. | G06F 9/44 |

OTHER PUBLICATIONS

D. Helmbold et al. "Determining Possible Event Orders by Analyzing Sequential Traces" IEEE Trans. Parallel Distributed Systems, pp. 827–840, 1993.

L. Levroon et al. "An Efficient Record–Replay Mechanism for Shared Memory Systems" IEEE Proc. Evromicro Workshop Par. Dist. Comp., pp. 169–176, 1993.

J. Schoeffler "A Real–Time Programming Event Monitor" IEEE Trans. Education, pp. 245–250, 1988.

H. Scholten et al "A Debugging Tool for Distributed Systems" IEEE Tencon '93, pp. 173–176, 1993.

Disclosed Anonymously–"Merge Overlap Writes in Disk Controller," Research Disclosure 31413, p. 463, Jun. 10, 1990.

*Primary Examiner*—Thomas G. Black
*Assistant Examiner*—Cheryl R. Lewis
*Attorney, Agent, or Firm*—Lawrence D. Cutter; Heslin & Rothenberg, P.C.

[57] ABSTRACT

In a coupled data processing system having multiple users, either in a single system or in a multi-system environment, a coupling facility storage structure is used to provide a log management facility. The log management facility provides for a real time physical log merge of the data written into the log stream without interprocessor communication required to process the records in logical sequence. The log management facility supports concurrent write, delete, browse, and asynchronous off-load to dasd processes across multi-users and multi-systems. The log management facility maintains the log records, independent of the log media, in time sequence. A logical block id is assigned to each log record written so that it can be directly accessed at a later time.

71 Claims, 33 Drawing Sheets

LIST-STRUCTURE CONTROLS

| | |
|---|---|
| MAXIMUM DATA-LIST-ENTRY SIZE | (MDLES) |
| LIST-STRUCTURE TYPE | (LST) |
| LOCK-TABLE-ENTRY CHARACTERISTIC | (LTEX) |
| LIST-ELEMENT CHARACTERISTIC | (LELX) |
| MINIMUM STRUCTURE SIZE | (MNSS) |
| LOCK-TABLE-ENTRY COUNT | (LTEC) |
| LIST COUNT | (LC) |
| STRUCTURE SIZE | (SS) |
| MAXIMUM STRUCTURE SIZE | (MXSS) |
| MAXIMUM LIST-SET-ELEMENT COUNT | (MLSELC) |
| LIST-SET-ELEMENT COUNT | (LSELC) |
| MAXIMUM LIST-SET-ENTRY COUNT | (MLSELC) |
| LIST-SET-ENTRY COUNT | (LSEC) |

LIST CONTROLS

| | |
|---|---|
| ASSIGNMENT KEY | (AK) |
| ASSIGNMENT KEY THRESHOLD | (AKT) |
| LIST-ENTRY-COUNT LIMIT | (LECL) |
| LIST-ELEMENT-COUNT LIMIT | (LELCL) |
| LIST-ENTRY-COUNT | (LEC) |
| LIST-ELEMENT-COUNT | (LELC) |
| LIST AUTHORITY | (LAU) |
| LIST-MONITOR-TABLE ENTRY 0 | |
|     LIST-MONITORING-ACTIVE BIT | (LMAB) |
|     LIST-NOTIFICATION-REQUEST TYPE | (LNRT) |
|     LIST-NOTIFICATION-ENTRY NUMBER | (LNEN) |
| LIST-MONITOR-TABLE ENTRY 1 | |
|     LIST-MONITORING-ACTIVE BIT | (LMAB) |
|     LIST-NOTIFICATION-REQUEST TYPE | (LNRT) |
|     LIST-NOTIFICATION-ENTRY NUMBER | (LNEN) |
| ... | |
| LIST-MONITOR-TABLE ENTRY n | |
|     LIST-MONITORING-ACTIVE BIT | (LMAB) |
|     LIST-NOTIFICATION-REQUEST TYPE | (LNRT) |
|     LIST-NOTIFICATION-ENTRY NUMBER | (LNEN) |

LIST ENTRY CONTROL BLOCK (LECB)

| | |
|---|---|
| DATA-LIST-ENTRY SIZE | (DLES) |
| LIST NUMBER | (LN) |
| LIST-ENTRY IDENTIFIER | (LEID) |
| VERSION NUMBER | (VN) |
| LIST-ENTRY KEY | (LEK) |
| LIST-ENTRY NAME | (LEN) |

REQUEST/RESPONSE OPERANDS

| | |
|---|---|
| ASSIGNMENT KEY INCREMENT | (AKI) |
| ASSIGNMENT KEY | (AK) |
| ASSIGNMENT KEY REQUEST TYPE | (AKRT) |
| ASSIGNMENT KEY UPDATE TYPE | (AKUT) |
| ASSIGNMENT KEY THRESHOLD | (AKT) |
| COMPARATIVE LIST AUTHORITY | (CLAU) |
| DATA-LIST-ENTRY SIZE | (DLES) |
| LIST-MONITORING ACTIVE BIT | (LMAB) |
| LIST-NOTIFICATION-ENTRY NUMBER | (LNEN) |
| LIST-NOTIFICATION-TOKEN | (LNT) |
| LIST AUTHORITY | (LAU) |
| LIST AUTHORITY COMPARISON TYPE | (LAUCT) |
| LIST AUTHORITY REPLACEMENT TYPE | (LAURT) |
| LIST CONTROL TYPE | (LCT) |
| LIST-ENTRY TYPE | (LET) |
| LIST NUMBER | (LN) |
| COMPARATIVE VERSION NUMBER | (CVN) |
| VERSION NUMBER | (VN) |
| COMPARATIVE GLOBAL LOCK MANAGER | (CGLM) |
| LOCAL LOCK MANAGER | (LLM) |
| WRITE REQUEST TYPE | (WRT) |

*fig. 7*

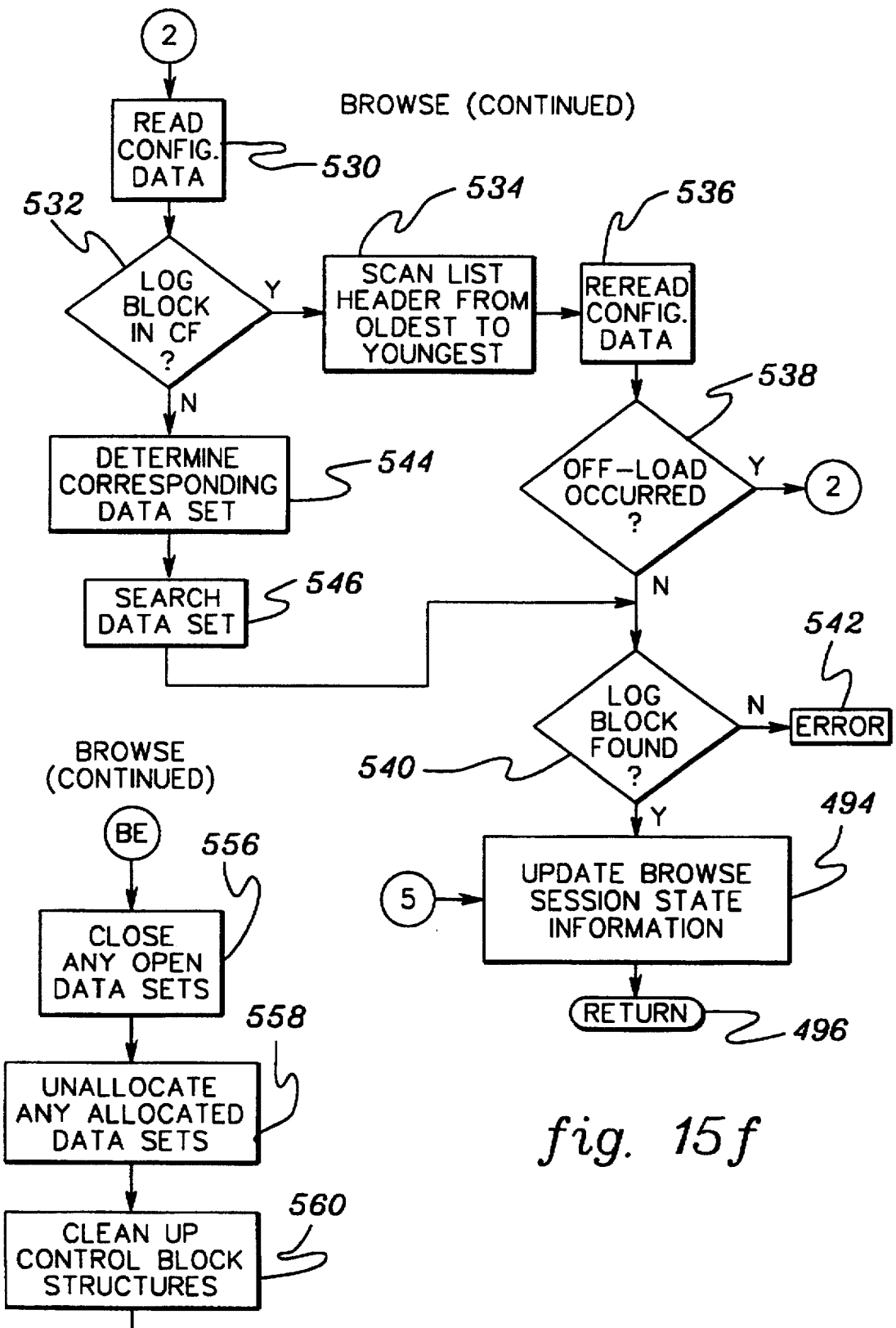

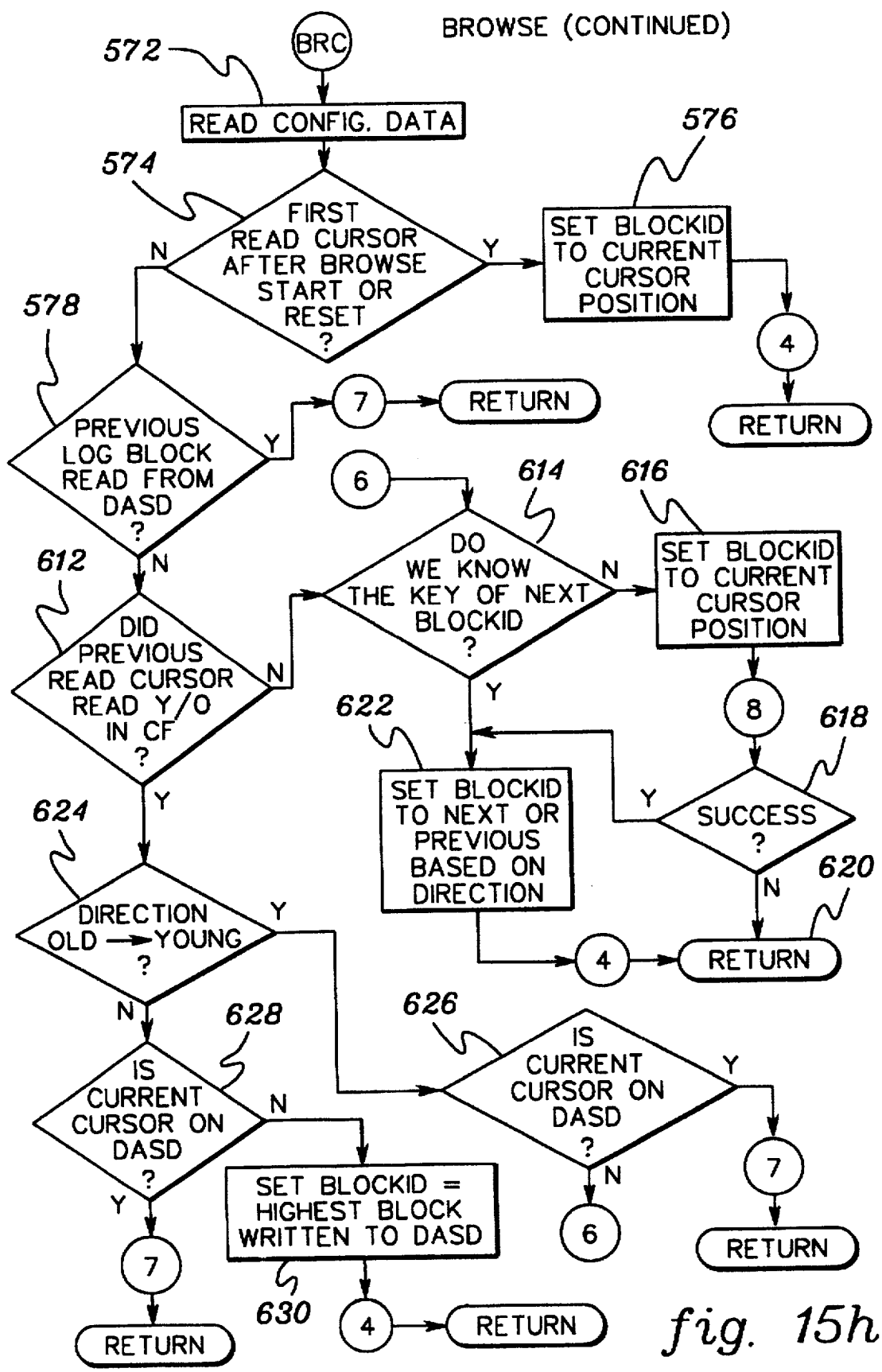

METHOD AND SYSTEM FOR LOG MANAGEMENT IN A COUPLED DATA PROCESSING SYSTEM

This application is a continuation of application Ser. No. 08/304,677 filed Sep. 12, 1994, now abandoned.

TECHNICAL FIELD

This invention relates, in general, to logging information in a data processing system, and in particular, to providing log management services in a coupled data processing system which enables the concurrent processing of main line functions by multiple users in either a single system or multi-system environment.

CROSS REFERENCE TO RELATED APPLICATIONS

This application contains subject matter which is related to the subject matter of the following applications which are assigned to the same assignee as this application. Each of the below listed applications is hereby incorporated by reference in its entirety:

"Configurable, Recoverable Parallel Bus," by N. G. Bartow et al., Filed: Feb. 20, 1992 now U.S. Pat. No. 5,357,608;

"High Performance Intersystem Communications For Data Processing Systems," by N. G. Bartow et al., Filed: Feb. 20, 1992 now U.S. Pat. No. 5,412,803;

"Frame-Group Transmission And Reception For Parallel/ Serial Buses," by N. G. Bartow et al., Filed: Feb. 20, 1992, now U.S. Pat. No. 5,267,240;

"Communicating Messages Between processors And A Coupling Facility," by D. A. Elko et al., Filed: Mar. 30, 1992 now abandoned;

"Sysplex Shared Data Coherency Method And Means," by D. A. Elko et al., Filed: Mar. 30, 1992 now U.S. Pat. No. 5,537,574;

"Method And Apparatus For Distributed Locking of Shared Data, Employing A Central Coupling Facility," by D. A. Elko et al., Filed: Mar. 30, 1992 now U.S. Pat. No. 5,339,427;

"Command Quiesce Function," by D. A. Elko et al., Filed: Mar. 30, 1992 now U.S. Pat. No. 5,339,405;

"Storage Element For A Shared Electronic Storage Cache," by D. A. Elko et al., Filed: Mar. 30, 1992 now U.S. Pat. No. 5,457,793;

"Management Of Data Movement From A SES Cache To DASD," by D. A. Elko et al., Filed: Mar. 30, 1992 now U.S. Pat. No. 5,493,668;

"Command Retry System," by D. A. Elko et al., Filed: Mar. 30, 1992 now U.S. Pat. No. 5,392,397;

"Integrity Of Data Objects Used To Maintain State Information For Shared Data At A Local Complex," by D. A. Elko et al., Filed: Mar. 30, 1992 now U.S. Pat. No. 5,331,673;

"Management Of Data Objects Used To Maintain State Information For Shared Data At A Local Complex," by J. A. Frey et al., Filed: Mar. 30, 1992 now U.S. Pat. No. 5,388,266;

"Recovery Of Data Objects Used To Maintain State Information For Shared Data At A Local Complex," by J. A. Frey et al., Filed: Mar. 30, 1992 now U.S. Pat. No. 5,399,542;

"Message Path Mechanism For Managing Connections Between Processors And A Coupling Facility," by D. A. Elko et al., Ser. No. 07/860,646, Filed: Mar. 30, 1992 now abandoned;

"Method And Apparatus For Notification Of State Transitions For Shared Lists Of Data Entries," by J. A. Frey et al., Ser. No. 07/860,809, Filed: Mar. 30, 1992 now U.S. Pat. No. 5,390,328;

"Method And Apparatus For Performing Conditional Operations On Externally Shared Data," by J. A. Frey et al., Ser. No. 07/860,655, Filed: Mar. 30, 1992 now abandoned;

"Apparatus And Method For List Management In A Coupled Data Processing System," by J. A. Frey et al., Filed: Mar. 30, 1992 now U.S. Pat. No. 5,410,695;

"Interdicting I/O And Messaging Operations In A Multi-System Complex," by D. A. Elko et al., Filed: Mar. 30, 1992 now U.S. Pat. No. 5,394,554;

"Method And Apparatus For Coupling Data Processing Systems," by Elko et al., Filed: Mar. 30, 1992, now U.S. Pat. No. 5,317,739;

"Authorization Method For Conditional Command Execution," by Elko et al., Ser. No. 08/021,285, Filed: Feb. 22, 1993, now abandoned.

"A Dumping Service Facility For Multisystem Environment," by Elko et al., Ser. No. 08/073,909, Filed: Jun. 08, 1993, now abandoned;

"A Method And System For Capturing and Controlling Access To Information In A Coupling Facility," by Neuhard et al., Ser. No. 08/146,647, Filed Nov. 01, 1993, now U.S. Pat. No. 5,630,050;

"A Method And System For Managing Data and Users of Data in a Data Processing System," by Allen et. al., Ser. No. 08/146,727, Filed Nov. 01, 1993, now U.S. Pat. No. 5,465,359;

"A Method And System For Managing One or More Coupling Facilities in a Data Processing System," by Allen et. al., Ser. No. 08/148,075, Filed Nov. 01, 1993, now abandoned; and "A Structure Rebuild Method and System," by Allen et al., Ser. No. 08/146,635, Filed Nov. 1, 1993, now abandoned.

BACKGROUND ART

In a loosely coupled data processing environment, multiple instances of an application requiring data logging facilities, such as a distributed data base manager, may be distributed across multiple systems within the data processing environment. Each instance executing in parallel with other instances, and each instance requiring update access to shared resources (e.g., data bases). For instance, consider a data base being shared by multiple instances of an application, each distributed instance requiring full/equal access to the shared resource with integrity.

To guarantee data integrity, parallel applications log multiple types of data. One type of log data tracks the progress of a transaction (the resources it has changed) such that the modifications performed by the transaction can be backed out to a consistent state should the transaction not complete successfully. A second type of log data tracks updates to physical recording media (e.g., dasd) such that the recording media can be restored to a consistent state in the event of media failure (e.g., dasd head crash).

Applications use one of the following methods for logging data to maintain the integrity of shared resources:

1. Each parallel instance writes its corresponding log data to a log data set, the log data set fully accessible by each parallel instance of the application. Since multiple parallel instances of the application are writing to the same log data set, four problems arise: performance, bandwidth, serialization and synchronization. Each of these problems is discussed below:

Performance is affected because only one parallel instance of the application can be writing log data at any one time; other parallel instances with log data to write must wait until the current writer completes its log writes.

Bandwidth is affected because of the current limits of how much data can be transferred to dasd in a unit of time. Writes to dasd are asynchronous events. Current methods of hardening are limited by the number of I/Os that can be processed per second and the contention resulting from the control unit overhead created by servicing multiple operating system instances in parallel. Dasd subsystem performance can be further aggravated by the failure to write the data sequentially.

Serialization is affected because the log data set must reflect the time sequence in which data base updates were applied so that they can be recovered with integrity. To insure this ordering requirement, the instance of the application must hold serialization that blocks its distributed instances from performing concurrent writes to the log data set.

Synchronization is affected because the instance of the parallel application that has filled up a data set must inform all other instances that they are to now write log data to a different log data set.

2. Each distributed instance writes log data to its own unique set of log data sets. When recovery action is required for a shared resource, the set of instance-specific log data created by all parallel instances of the application that share the resource must be merged to provide a time-sequenced view of the activity against a shared resource so that recovery actions can be successful. When recovery actions are required, installation personnel must intervene to find the appropriate set of shared log data sets, merge them and then initiate recovery utilities. This solution also shares the performance and bandwidth problems previously discussed.

In addition, real time browsing is not practical because of the need to merge the log data requiring systems to be quiesced.

3. Another mechanism includes partitioning the data base. This means that each parallel instance of the application is the exclusive owner of a piece of the data base. Should a transaction it is processing need to access a part of the data base it does not own, then its request must be sent to the parallel instance that owns that part of the data base. As with the previous examples, performance and bandwidth are negatively affected. Recovery is also complex as multiple instances of log data sets must be merged to produce a time-sequenced ordering of data base updates.

Regardless of which option an application implements, each parallel instance of an application requires the following:

1. A set of application-specific definitions that tell the distributed instance of the application the set of log data sets to which it is to record log data.

2. Knowledge of the underlying log recording media and associated access method. For example, dasd media using the Virtual Sequential Access Method (VSAM) access method.

3. The application must know the set of data sets (one or more) on which the log data resides, must be able to create new data sets as log data sets reach capacity, must have ways to read log data to initiate recovery processing, and must have ways to delete log data (and log data sets) that are no longer needed.

4. The ability to allocate and deallocate log data sets as required.

As more and more applications become distributed, each unique application must implement a logging function, much of it very similar to what other applications have already implemented. Correspondingly, the systems management overhead increases as an installation must also specify unique logging definitions to each distributed application.

Based on the foregoing, a need exists for a mechanism for distributed instances of an application to log data to a common set of log data sets that provides a real time merge of log data, acceptable performance, high bandwidth, reduced recovery time and acceptable systems management characteristics.

SUMMARY OF THE INVENTION

The shortcomings of the prior art are overcome and additional advantages are realized through the provision of a log management facility. In accordance with the principles of the present invention, a method and system for managing log data within a data processing system is provided. A plurality of data records are written to a log stream, which comprises at least a portion of a coupling facility storage structure. The data records are arranged in a particular sequence.

In one embodiment, the portion of the coupling facility storage structure is a coupling facility list and the data records are arranged in time sequence. A list authority comparison is used to maintain the time sequence. In another example, the log stream comprises one or more data sets as well as the coupling facility list.

Each record in the log stream has a logical block id for use in accessing the record in the log stream. This logical block id is used to access a record in the list or within the data sets, which provides for direct access to individual records for the purpose of browsing or deleting records in the log stream.

In a further aspect of the invention, key assignment is performed. The key assignment represents the next valid block id to be assigned. The key assignment process enables the assignment of the next block id to be used without having to understand intervening write activity to the log stream by other applications. That is, the key assignment process is independent of other activity against the log stream. No interprocessor communication is required in order to generate the key or perform key assignment processing.

Additionally, the log management facility of the present invention advantageously provides a multi-system dynamic merge of log stream data, high performance and high bandwidth. The merge of the present invention is a real-time physical merge of the log data in logical sequence. The records in the log stream are maintained in logical sequence by timestamp and relative block address (i.e., block id) regardless of whether the data is resident in the coupling facility or on dasd. The log management facility encapsulates the logging function in one operating system component, relieving distributed applications that require logging of having to design and develop their own logging subcomponents. A user application is unaware of the underlying implementation and corresponding topology. It greatly simplifies systems management activities and automatically controls the backup and archiving of log data sets. It eliminates the need for stand alone batch utilities to sort/merge logs so that recovery operations can be performed. It also hides data set specific items from the user application: i.e., allocation and deallocation of data sets, access methods, I/O error recovery, and tracking of the set of individual data sets that comprise a log stream.

In one embodiment, the system logger of the present invention uses lists within a coupling facility list structure to provide a real time log merge function that dynamically merges the log data generated by multiple instances of an application.

Other advantages of the system logger include, for example, the high performance hardening of data, measured in micro-seconds rather than milli-seconds; high bandwidth when writing data to a recording media; and the use of atomic processes or functions, such as write, browse, delete and off-load functions. Further, the system logger provides the ability to concurrently write, browse, and delete information to and from the log stream with integrity. Each of the concurrent processes may be performed across multi-users and/or multi-systems within a data processing environment, without interfering with each other.

Additionally, a writer off-load process may be concurrently performed with the other functions described above (e.g., write, read, delete) without interference and while maintaining integrity. The writer off-load process provides efficient space management in dasd and minimizes dasd contention.

Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 3 depicts one example of the controls associated with the list structure of FIG. 2, in accordance with the principles of the present invention;

FIG. 4 depicts one example of the controls associated with a list within the list structure of FIG. 2 used in accordance with the principles of the present invention;

FIG. 5 illustrates one example of a list entry control block, in accordance with the principles of the present invention;

FIG. 7 depicts one embodiment of request/response operands, in accordance with the principles of the present invention;

FIGS. 15a–15k depict one embodiment of the logic associated with reading log blocks in the log stream, in accordance with the principles of the present invention;

BEST MODE FOR CARRYING OUT THE INVENTION

Figure 1:
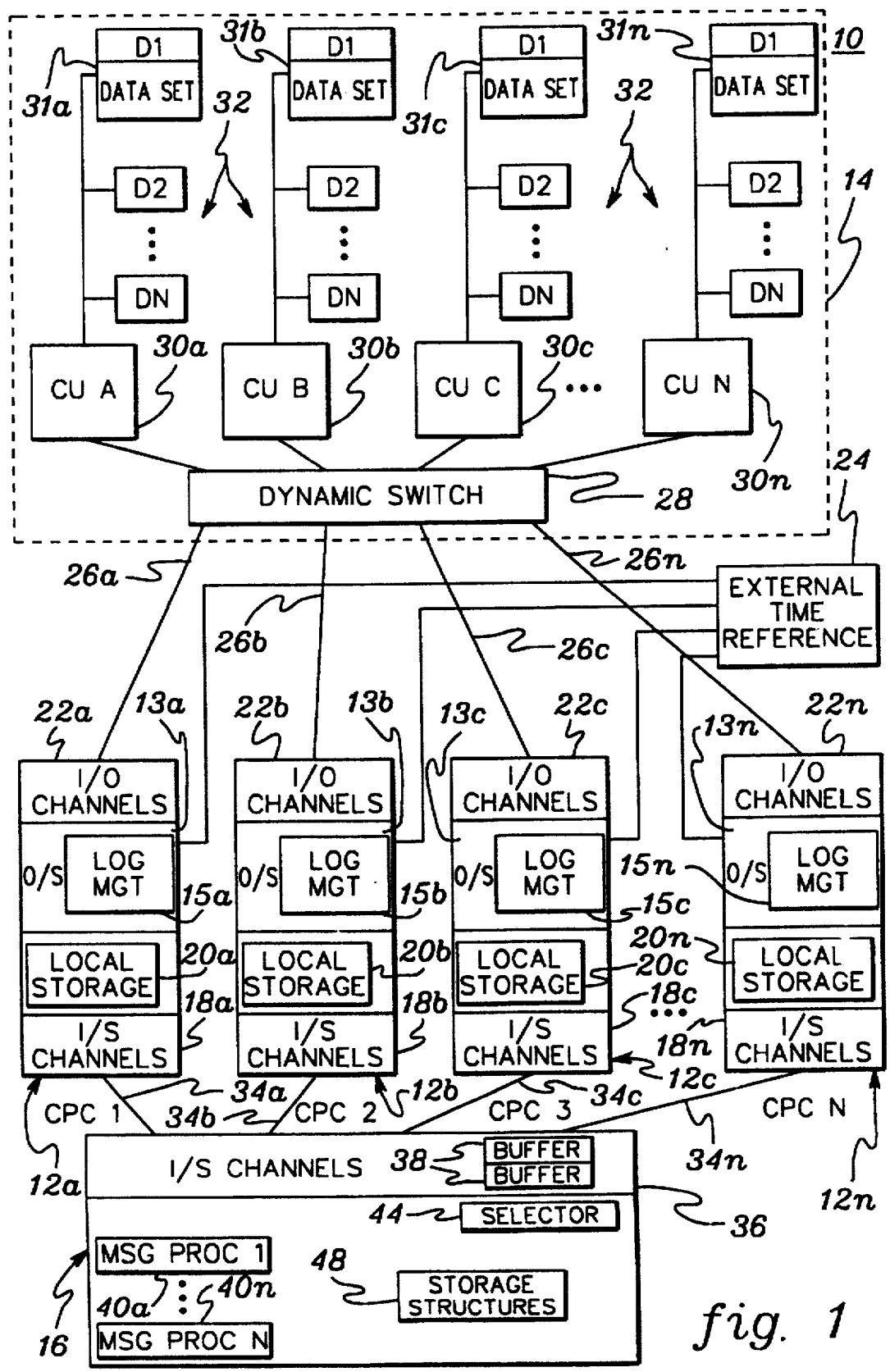
FIG. 1 depicts one example of a block diagram of a data processing system incorporating the log merger services of the present invention.

FIG. 1 is a block diagram of a data processing system 10 incorporating the log management services of the present invention. In one example, data processing system 10 includes multiple central processing complexes (CPCs) 12a through 12n which are coupled to an input/output (I/O) system 14 and a coupling facility 16. (As used herein, central processing complexes 12a–12n are collectively referred to as central processing complex (CPC) 12.) The main components associated with each central processing complex 12, input/output system 14 and coupling facility 16 are described in detail below. (While the invention is described in relation to a multisystem environment, such as the one depicted in FIG. 1, it can also be used with a single system environment, which includes one central processing complex 12.)

Each of the CPCs 12a–12n may be an International Business Machines' (IBM) system following the Enterprise Systems Architecture/390 Principles of Operation as described in IBM publication SA22-7201-00, which is hereby incorporated by reference in its entirety. Each of CPCs 12a–12n includes one or more central processing units (CPUs) (not shown) which executes an operating system 13a–13n, respectively. As used herein, operating systems 13a–13n are collectively referred to as operating system 13. In one instance, operating system 13 is an International Business Machines' Multiple Virtual Storage (MVS) operating system for controlling execution of programs and the processing of data, as is well known. In addition, in accordance with the principles of the present invention, each operating system 13a–13n includes a Cross-System Extended Services (XES) facility (not shown) for managing and accessing information in a coupling facility, and the log management facility of the present invention 15a–15n, respectively.

In addition, each CPC 12a–12n contains a plurality of intersystem (I/S) channels 18a–18n, a plurality of local storage 20a–20n, and a plurality of input/output (I/O) channels 22a–22n, respectively. (Intersystem channels 18a–18n and input/output channels 22a–22n are collectively referred to as intersystem channels 18 and input/output channels 22, respectively.) It will be understood that input/output channels 22 are part of the well known channel subsystem (CSS), which also includes intersystem channels 18 disclosed herein, even though channels 18 and 22 are shown separately in FIG. 1 for convenience.

Coupled to each CPC 12a–12n is an external time reference (ETR) 24, which provides time stamps of control information to be written into a log to document recovery from failures, backing out of undesired operations and for audit trails. External time reference 24, which uses fiber optic interconnect cables, synchronizes the time clocks (not shown) of CPCs 12a–12n to a precision equal to or greater than the duration of the shortest externally visible operation. External time reference 24 provides for cable length propagation time differences, where those differences are important, in order to be able to maintain synchronization to within the length of the mentioned external operation.

As depicted in FIG. 1, each central processing complex 12a–12n is coupled via a link 26a–26n, respectively, to input/output system 14. Input/output system 14 includes, for example, a dynamic switch 28, which controls access to multiple input/output (I/O) control units (CU) 30a through 30n and one or more direct access storage devices (DASD) D1 through DN (collectively referred to as dasd 32), which are controlled by the control units. Dynamic switch 28 may be an ESCON Director Dynamic Switch available from IBM Corporation, Armonk, N.Y. Such a dynamic switch is disclosed in U.S. patent application Ser. No. 07/429,267 for "Switch and its Protocol," filed Oct. 30, 1989, now U.S. Pat. NO. 5,107,489, and assigned to the owner of the present invention, which application is incorporated herein by reference in its entirety. As is known, input/output commands and data are sent from a central processing complex 12a–12n to an I/O control unit 30a–30n through dynamic switch 28 by means of I/O channels 22a through 22n of the respective CPCs 12a through 12n. Channel programs for a particular I/O channel are established by channel command words (CCWs), as is well known in the art.

One or more of direct access storage devices 32 includes one or more data sets 31a–31n, respectively. In accordance with the principles of the present invention, the data sets are used for storing data off-loaded from the coupling facility when a particular threshold is met. The off-loading of data is described in detail below.

Each central processing complex 12a–12n is also coupled via a bus 34a–34n, respectively, to coupling facility 16.

Coupling facility 16 contains storage accessible by the CPCs, performs operations requested by programs in the CPCs and maintains status regarding structures and users of structures located within the coupling facility. The coupling facility enables sharing of data, which is directly accessible by multiple operating systems. In one embodiment, coupling facility 16 is a structured-external storage (SES) processor and includes, for example, a plurality of intersystem (I/S) channels 36 for communicating with intersystem channels 18a–18n, one or more buffers 38 located within intersystem channels 36 for storing data received from intersystem channels 18a–18n, message processors 40a–40n for handling messages, a selector 44 for directing message requests received over an intersystem channel to a message processor 40a–40n, and one or more storage structures 48, each of which is described in further detail below. Even though only one coupling facility 16 is shown in the embodiment of FIG. 1, it will be understood that multiple coupling facilities may be provided for, each with its own I/S channels and message paths connected to all or some subset of the CPCs 12a–12n.

Figure 2:
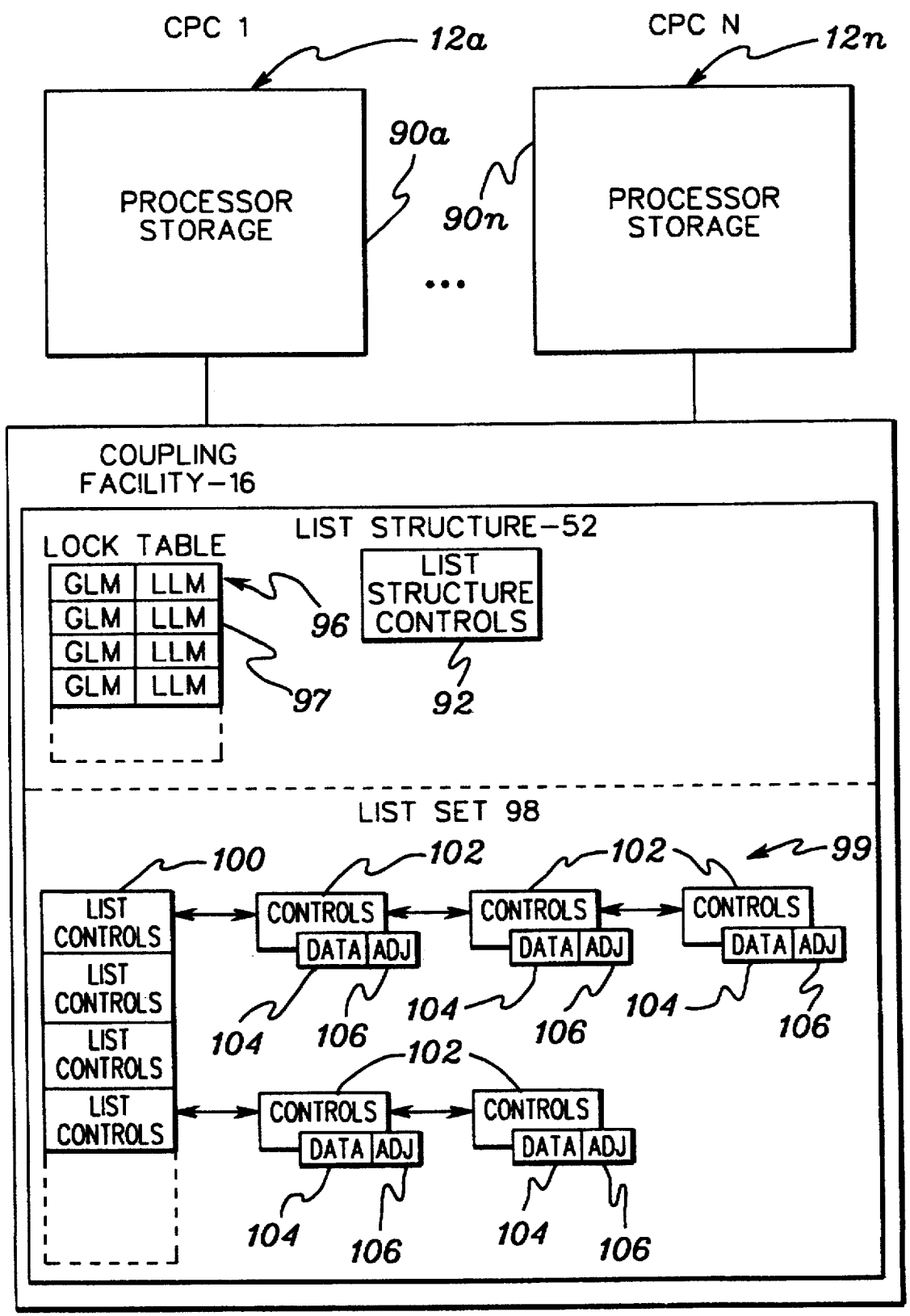
FIG. 2 depicts one example of a list structure, in accordance with the principles of the present invention.

One example of a storage structure 48 located in the coupling facility is a list structure 52, an embodiment of which is depicted in FIG. 2 and described in detail below.

Referring to FIG. 2, in one example, coupling facility 16 is coupled to processor storage 90a–90n located within each CPC 12a–12n, respectively. List structure 52 includes list-structure controls 92, and, optionally, a lock table 96, and/or a list set 98. List set 98 includes list controls 100 and list-entry controls 102. Each of the components of list structure 52 is described in detail below.

List structure controls 92 contain attributes of the structure and are initialized when list structure 52 is created. One example of the controls associated with list structure controls 92 is depicted in FIG. 3. Referring to FIG. 3, list structure controls 92 include, for example:

(a) Maximum Data-List-Entry Size (MDLES): An object or field that specifies the maximum size of the data list entry.

(b) List-Structure Type (LST): An object or field that indicates the list objects created on allocation. The field contains a counter indicator (CI), a lock indicator (LI), a data indicator (DI), an adjunct indicator (AI), a name indicator (NI) and a key indicator (KI).

The counter indicator specifies that either: a list-entry count and list-entry-count limit are defined or a list-element count and list-element-count limit are defined.

The lock indicator specifies whether or not a lock table is created.

The data and adjunct indicators specify whether: no list-set is created; list entries have adjunct only; list entries have data only; or list entries have data and adjunct in the list entries.

The name indicator specifies whether or not list entries are named.

The key indicator specifies whether or not the list entries are keyed.

(c) Lock-Table-Entry Characteristic (LTEX): An object or field that specifies the number of bytes in each lock-table entry. The number of bytes is the product of 2 raised to the power of the LTEX value.

(d) List-Element Characteristic (LELX): An object or field that specifies the number of bytes in each list element. The number of bytes is the product of 256 and 2 raised to the power of the LELX value.

(e) Minimum Structure Size (MNSS): A value that specifies the minimum number of units of SES storage that can be allocated for the list.

(f) Lock-Table-Entry Count (LTEC): An object or field that specifies the number of lock-table entries allocated.

(g) List Count (LC): An object or field that specifies the number of lists created.

(h) Structure Size (SS): An object or field that specifies the amount of storage allocated.

(i) Maximum Structure Size (MXSS): A value that specifies the maximum number of units of SES storage that can be allocated for the list.

(j) Maximum List-Set-Element Count (MLSELC): An object or field that specifies the maximum number of list elements that are available for assignment to list entries or retry-data blocks, or both, in the list set.

(k) List-Set-Element Count (LSELC): An object or field that specifies the number of list elements that have been assigned to list entries or retry-data blocks, or both, in the list set.

(l) Maximum List-Set-Entry Count (MLSELC): An object or field that specifies the maximum number of possible list entries in a list set.

(m) List-Set-Entry Count (LSEC): An object or field that specifies the number of existing list entries in the list set.

Referring once again to FIG. 2, lock table 96 consists of a sequence of one or more lock table entries 97 identified by a lock-table-entry number (LTEN). In one embodiment, lock table entry 97 includes a lock-table-entry number (LTEN), which starts at zero and runs consecutively and a lock-table-entry value (LTEV), including a global-lock manager (GLM) object and optionally, a local-lock-manager (LLM) object or both. The lock-table entry format is determined by the list-structure type located within list structure controls 92.

Commands associated with list structure 52 provide a means for updating lock-table entry 97. That is, a command may compare global-lock managers (GLM) and conditionally replace a global-lock manager (GLM), a local-lock manager (LLM), or both the global-lock and local-lock managers (GLM) and (LLM). The list commands also provide a means for reading an entry in lock-table 96 or the next non-zero lock-table entry, or for clearing lock table 96.

As previously mentioned, also contained within list structure 52 is list set 98. In one example, list set 98 includes one or more lists 99 represented by list controls 100, which are numbered consecutively, starting at zero. In one embodiment, list controls 100 include the following controls, as depicted in FIG. 4:

(a) Assignment Key (AK): In accordance with the principles of the present invention, an assignment key is provided. It is an object or field that specifies the value assigned to a list-entry key when a key-assignment operation is executed for a list entry that is moved or created on the list. The assignment key is initialized to zeros.

(b) Assignment Key Threshold (AKT): In accordance with the principles of the present invention, an assignment key threshold is provided. It is an object or field that specifies the maximum value of an assignment key. The assignment key threshold is initialized to zeros.

(c) List-Entry-Count Limit (LECL): An object or field that specifies the maximum number of possible list entries in a list. This object is initialized to the maximum list-set-entry count when a list structure is created.

(d) List-Element-Count Limit (LELCL): An object or field that specifies the maximum number of possible list elements in a list. This object is initialized to the maximum list-set-element count in the list-structure controls when a list structure is created.

(e) List-Entry-Count (LEC): An object or field that specifies the number of list entries currently in the list.

(f) List-Element-Count (LELC): An object or field that specifies the number of list elements currently in the list.

(g) List Authority (LAU): A value that is compared and conditionally updated. The LAU is used in accordance with the principles of the present invention to maintain the records of the log stream in time sequence.

(h) List-Monitor-Table: The list-monitor table contains information used to process the list-notification vector of each user who has registered interest in the state transitions of the list.

The list-monitor table is a sequence of objects, called list-monitor-table entries. The number of list-monitor-table entries is determined when the table is created and is equal to the maximum number of list-structure users. The list-monitor-table entries are numbered from zero to the user-identifier limit and are indexed by the user identifier (UID).

Each list-monitor-table entry has a list-monitoring-active-bit object, a list-notification-request-type object and a list-notification-entry-number object, each of which is described below:

(1) List-Monitoring-Active Bit (LMAB): An object or field that specifies whether the user associated with the list-monitor-table entry is monitoring the list-state transitions of the list.

When a user is not monitoring a list, all previously issued list-notification commands on behalf of the associated user for this list are complete.

(2) List-Notification-Request Type (LNRT): An object or field that indicates whether the list-notification-vector summaries are to be updated when an empty to not-empty state transition occurs on a monitored list.

(3) List-Notification-Entry Number (LNEN): An object or field that specifies a list-notification-vector entry.

When a list-state transition occurs, one or more list-notification commands are initiated for each user who is monitoring the list to the system which attached the user. All the list-notification commands initiated as a result of the list-state transition are initiated before the command that caused the list-structure transition is completed.

The list-notification command provides the information necessary for the system to update one list-notification entry and, when requested, the associated list-notification summaries, to reflect the new list state.

A user becomes a list monitor by registering with the list by means of a register-list-monitor command. A user ceases to be a list monitor by deregistering from the list by means of a deregister-list-monitor command or by detaching from the list structure by means of a detach-list-structure-user command.

A list-notification command issued to a system for a user as a result of a not-empty-to-empty list-state transition must complete before another list-notification command on behalf of the same list and user that specifies the opposite list-state transition may be issued.

All SES list-structure commands capable of adding, deleting, or moving a list entry execute the list-monitor-notification process for each user monitoring a list that changes state.

When a transition notification is initiated to a system, any previously initiated but unsent notifications for the same list and user may be purged.

Returning to FIG. 2, each list 99 consists of a sequence of zero or more entries. The list-structure type (described above) determines whether all the list entries in list set 98 have a data list entry 104, an adjunct list entry 106, or both. Associated with each entry of a list 99 is one of list-entry controls 102. Controls 102 contain list-entry-location information and other information for controlling operations against data list entry 104.

In particular, list entry controls 102 include, for instance, the following controls, as depicted in FIG. 5:

(a) A Data-List-Entry Size (DLES) indicating the size of the associated data entry.

(b) A List Number (LN) representing the list that a particular entry is associated with.

(c) A List-Entry Identifier (LEID) identifying a particular list entry. The list-entry identifier is unique to a list set 98 and is assigned by coupling facility 16.

(d) A Version Number (VN) object that is conditionally compared and conditionally updated, reflecting a program specified state for the list entry.

(e) An optional List-Entry Key (LEK) indicating a key, if one exists. When list-entry keys exist, the keyed list entries are ordered by the key with the lowest numerical key at the leftmost position. Elements with the same key value may be located by first or last within the same key value.

When an unkeyed list entry is created or moved, the target list-entry position is always located by an unkeyed position. When a keyed list entry is created or moved, the target list-entry position is always located by a keyed position and first or last within the same key value.

(f) An optional List-Entry Name (LEN). A list-entry name is unique to a list set 98 (FIG. 2) at any particular instant and is provided by the operating system program.

List commands provide a means for conditionally creating, reading, replacing, moving, or deleting one entry in list 99. A number of comparisons may be requested during these processes. They include a list-number comparison, a version-number comparison, a global-lock-manager (GLM) comparison, or any combination of the preceding. Additionally, when global locks are compared, local locks (LLM) may be compared. A list entry may be moved from one list 99 to another within the same structure 52 or from one position to another within the same list 99. This is disclosed in U.S. patent application Ser. No. 07/860,655 for "Method and Apparatus for Performing Conditional Operations on Externally Shared Data" by J. A. Frey, et al. (Attorney Docket No. P09-92-008), incorporated herein by reference in its entirety as noted.

The position of a list entry in list 99 is determined when it is created, and may be changed when any entry in the list is created, deleted or moved. A list entry or list-entry position is located within a list set 98 by means of the list-entry identifier or the optional list-entry name (as described above), or by position. Position is specified by means of a list number, a direction, and an optional list-entry key.

The list commands also provide a means for synchronously writing and moving, moving and reading, or reading and deleting one entry of list 99. More than one list entry may be deleted synchronously, and more than one data list entry 104 or adjunct list entry 106 may also be read synchronously. Data list entry 104 is always returned in the data area designated in main storage by a message command/response block, described below. The adjunct list entry is returned in either a message command/response block or the data area, depending on the command. This is disclosed in U.S. patent application Ser. No. 07/860,633 for "Apparatus and Method for List Management in a Coupled Data Processing System" by J. A. Frey, et al., now U.S. Pat. No. 5,410,695, incorporated herein by reference in its entirety, as noted.

Figure 6:
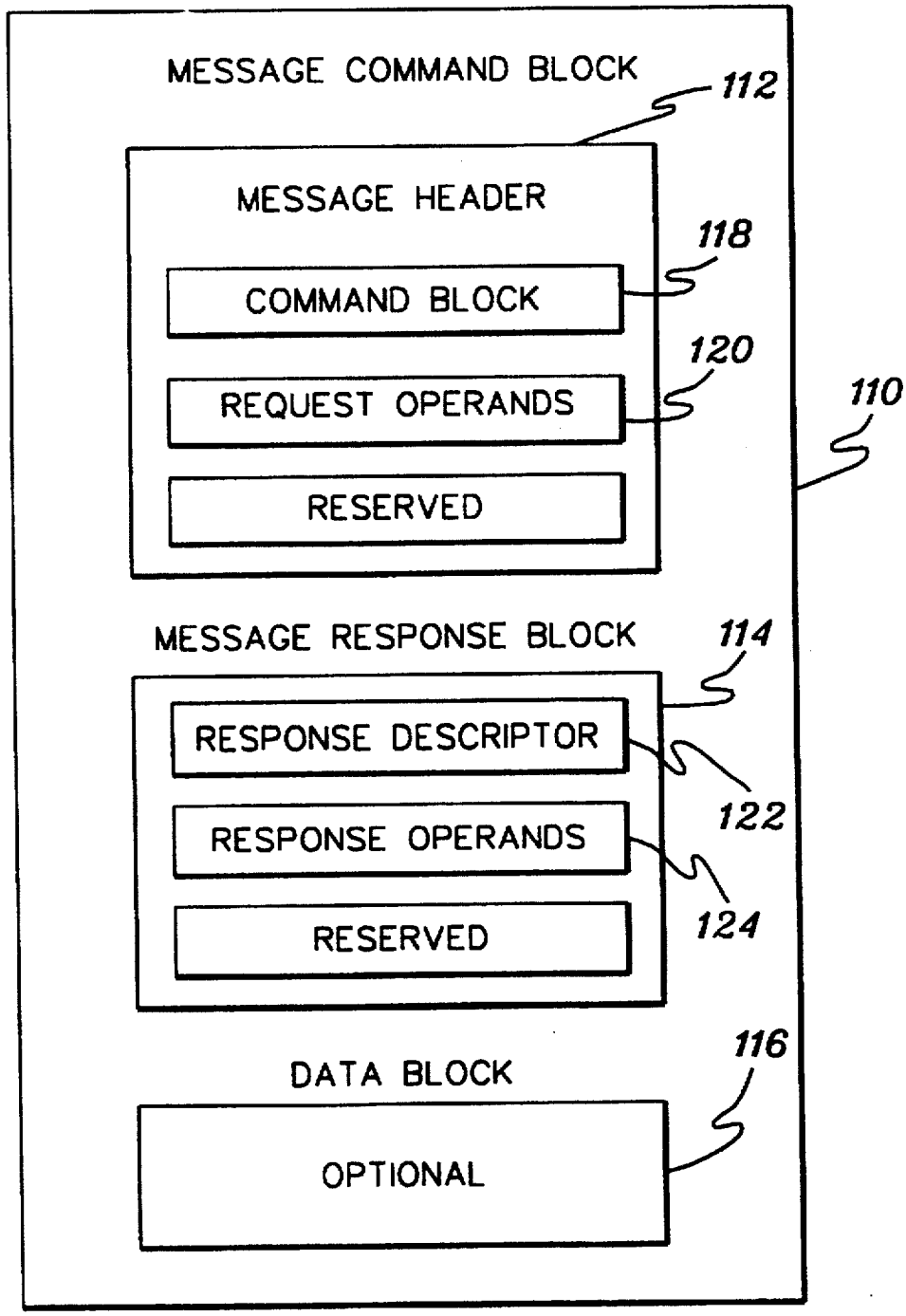
FIG. 6 depicts one example of a message command/response block, in accordance with the principles of the present invention.

In one embodiment, messages are communicated between CPC 12 and coupling facility 16 via a message command/response block 110 (FIG. 6). In one example, message command/response block 110 includes a message command block 112, a message response block 114 and an optional data block 116. Message command block 112 includes a command block 118 and a plurality of request operands 120 and message response block 114 includes a response descriptor 122 and a plurality of response operands 124. In one embodiment, request operands 120 and response operands 124 include the operands listed below, which are depicted in FIG. 7. (An operand may be a request operand, a response operand or both, depending upon the command. It is also possible that other request and/or response operands exist, which are not shown in FIG. 7.) In one embodiment, the response/request operands include the following:

(a) Assignment-Key Increment (AKI): In accordance with the principles of the present invention, an assignment-key increment is provided. It represents a value that is added to the value of the assignment key when the assignment key is updated.

This request operand is ignored unless the list entries are keyed, the assignment-key-request type is not zero, and the assignment-key-update type represents an increment.

(b) Assignment Key (AK): In accordance with the principles of the present invention, it is a value that specifies the value assigned to a list-entry key when a key-assignment operation is executed for a list entry that is moved or created on the list.

(c) Assignment-Key-Request Type (AKRT): In accordance with the principles of the present invention, it is a value that indicates when the list-entry key is set to the value of the assignment key in the list controls. In one example, the assignment-key-request type has the following states:
List-entry key not assigned
List-entry key assigned on move
List-entry key assigned on create
List-entry key assigned on create or move
This request operand is ignored unless the list entries are keyed.

(d) Assignment-Key-Update Type (AKUT): In accordance with the principles of the present invention, it is a value that indicates how the assignment key is updated. In one example, it has the following states:
Assignment key not updated increment assignment key
This request operand is ignored unless the list entries are keyed and the assignment-key request type (AKRT) is not zero.

(e) Assignment Key Threshold (AKT): In accordance with the principles of the present invention, it is a value that specifies the maximum value of an assignment key.

(f) Comparative List Authority (CLAU): A value that is compared to the list authority.

(g) Data-List-Entry Size (DLES): An object or field that specifies the size of the data list entry.

(h) List-Monitoring Active Bit (LMAB): A value that specifies whether the user associated with the listmonitor-table entry is monitoring the list-state transitions of the list. The value has one of the two following meanings: Not monitoring the list and monitoring the list. When the list-monitoring-active bit indicates that the list is not monitored, all previously issued list-notification commands on behalf of the associated user for this list are complete.

(i) List-Notification-Entry Number (LNEN): An object or field that specifies a list-notification-vector entry.

(j) List-Notification-Token (LNT): A value that specifies a list-notification vector to the system.

(k) List Authority (LAU): A value that is compared and conditionally updated. The LAU is used in accordance with the principles of the present invention to maintain the records of the log stream in time sequence.

(l) List-Authority-Comparison Type (LAUCT): In accordance with the principles of the present invention, it is a value that indicates the procedure for comparing the list authority. In one example, it has the following meanings:

Do not compare list authorities

Compare list-authority object and CLAU operand for being equal

Compare list-authority object for being less than or equal to the
CLAU operand

Invalid

This request operand is ignored unless the entry is located by keyed or unkeyed position, by list cursor, or list-number comparison is requested.

(m) List-Authority-Replacement Type (LAURT): In accordance with the principles of the present invention, it is a value that indicates the procedure for updating the list authority. In one example, it has the following meanings:

Do not replace the list authority

Replace the list-authority object
with the LAU operand

This request operand is ignored unless the entry is located by keyed or unkeyed position, by list cursor, or list-number comparison is requested.

(n) List-Control Type (LCT): A bit string consisting of consecutive list-control-update bits. Each bit is associated with a particular list control, and when one, causes the list control to be updated to a specified value. When the bit is zero, the associated list control is not updated. One example of the list controls represented by the list-control type are:

List Control

Assignment Key
Assignment Key Threshold
User-List Control
List-Element-Count Limit or List-Entry-Count Limit
 The assignment key and assignment key threshold are provided in accordance with the principles of the present invention. They are ignored unless the list entries are keyed.

(o) List-Entry Type (LET): A value that indicates whether data list entries, adjunct list entries, or both are read or replaced upon normal completion of the command execution.

(p) List Number (LN): An object or field which designates the list that the list entry is in.

(q) Comparative Version Number (CVN): A value that is compared to the version number object located in list entry control block 102.

(r) Version Number (VN): An object or field that is conditionally updated. The version number is initialized to zero when a list entry is created.

(s) Comparative Global Lock Manager (CGLM): A value that is compared to the global lock manager object located in lock table 96.

(t) Local Lock Manager (LLM): A value which identifies users with local interest in the lock-table entry.

(u) Write Request Type (WRT): A value that indicates the type of write request. The write request type specifies to replace a list entry, to create a list entry, or to replace or create a list entry.

In accordance with the principles of the present invention, a system logger running in its own address space provides a set of services that allows an application to connect to and maintain a log stream of data. Each system has its own system logger. In one example, a log stream is defined as a collection of one or more log records (also referred to as log blocks) written by an application using the services provided by the system logger. In accordance with the principles of the present invention, in one example, the data for each log stream is stored within a coupling facility list structure and dasd. The media in which the data is stored is, however, transparent to the user of the system logger. The application using the system logger services may or may not have multiple instances of itself executing in a coupled system environment. If there are multiple instances of the application in a coupled data processing system, the instances may be distributed across multiple systems in the coupled system or all instances may be executing on the same system. In the example of a multi-instance application where each instance of an application writes log records to the same log stream, the result, in accordance with the principles of the present invention, is a coupled system-wide merged log stream.

In accordance with the principles of the present invention, an application can use the system logger to connect to a log stream, write data to a log stream, browse data from a log stream, delete data from a log stream and disconnect from a log stream. Each of these services is described in detail below.

In one example, in order to connect to a log stream, a service referred to as IXGCONN is used. One example of the syntax associated with an IXGCONN macro used in invoking the connect service is described in detail below. (In this example, certain of the parameters are listed as required, while others are listed as optional. This is only one example and it may be different for another embodiment.):

```
[xlabel]  IXGCONN,  ,REQUEST=CONNECT
                   ,STREAMNAME=xstreamname
                   ,AUTH=READ
                   ,AUTH=WRITE
                   ,STREAMTOKEN=xstreamtoken
                   ,USERDATA={xuserdata|
                       NO_USERDATA}
                   ,STRUCTNAME=xstructname
                   ,AVGBUFSIZE=xavgbufsize
                   ,MAXBUFSIZE=xmaxbufsize
                   ,ELEMENTSIZE=xelementsize
                   ,REQUEST=DISCONNECT
                   ,STREAMTOKEN=xstreamtoken
                   ,FORCE=NO
                   ,FORCE=YES
                   ,USERDATA={xuserdata|
                       NO_USERDATA}
                   ,ANSAREA=xansarea
                   ,ANSLEN=xanslen
                   ,RETCODE=xretcode
                   ,RSNCODE=xrsncode
```

Where:
- [xlabel] is an optional symbol, starting in column 1, that is the name on the IXGCONN macro invocation. DEFAULT: No name.
- REQUEST({CONNECT|DISCONNECT}) is a required keyword input that specifies whether the program wishes to connect to or disconnect from the log stream. When CONNECT is specified, the user supplies the log stream name. When DISCONNECT is specified, the user supplies the STREAMTOKEN that is returned when a log stream connection request is successful.
  - REQUEST(CONNECT) indicates that the program wishes to connect to the log stream identified by the STREAMNAME keyword.
    - STREAMNAME(xstreamname) is the name (RS-type) (or address in register (2)–(12) ASM only) of a required 26 character input that specifies the name of the log stream into which the program will read and write log blocks. If multiple log users (each executing in a different address space) write log blocks to the same log stream name, the blocks will be merged in the log stream.
- AUTH({READ|WRITE}) is an optional keyword input which indicates the system logger functions a caller can successfully invoke after a successful connection request. DEFAULT: READ
  - AUTH(READ) specifies that only IXGBRWSE requests can be issued for the log stream. IXGBRWSE is described in detail below.
  - AUTH(WRITE) specifies that IXGBRWSE, IXGDELET and IXGWRITE requests can be issued for the log stream. IXGDELET and IXGWRITE are described in detail below.
- STREAMTOKEN(xstreamtoken) is the name (RS-type) (or address in register (2)–(12) ASM only) of a required 16 character output in which IXGCONN, upon successful completion, places the log stream token. The log stream token uniquely identifies a connection to a log stream.
- USERDATA({xuserdata|NO_USERDATA}) is the name (RS-type) (or address in register (2)–(12) ASM only) of an optional 64 character input/output that specifies a user data area. A program on any system can set or update the data when disconnecting from this log stream and retrieve the data when connecting to the same log stream. DEFAULT: NO_USERDATA, no user data will be saved or returned.
- STRUCTNAME(xstructname) is the name (RS-type) (or address in register (2)–(12) ASM only) of an optional 16 character output that specifies the output area in which the structure name for which the log stream was connected to is returned.
- AVGBUFSIZE(xavgbufsize) is the name (RS=type) (or address in register (2)–(12) ASM only) of an optional fullword output that specifies the output area in which the average buffer size defined for this log stream is returned.
- MAXBUFSIZE(xmaxbufsize) is the name (RS-type) (or address in register (2)–(12) ASM only) of an optional fullword output that specifies the output area in which the maximum buffer size defined for this log stream is returned.
- ELEMENTSIZE(xelementsize) is the name (RS-type) (or address in register (2)–(12) ASM only) of an optional fullword output that specifies the output area in which the element size for this log stream is returned.
- REQUEST(DISCONNECT) indicates that the program wishes to disconnect from the log stream identified by the STREAMTOKEN keyword.
  - STREAMTOKEN(xstreamtoken) is the name (RS-type) (or address in register (2)–(12) ASM only) of a required 16 character input that specifies the log stream token that was returned to a user when it successfully connected to a named log stream.
  - FORCE({NO|YES}) is an optional keyword input which indicates if the disconnect request is being issued from the End of Task Resource Manager. DEFAULT: NO
    - FORCE(NO) The request will be rejected if there is a potential loss of data condition detected for the log stream. If disconnect processing is still desired, user can request disconnection with the FORCE=YES option.
    - FORCE(YES) The request will be processed even if there is a potential loss of data condition encountered. This results in freeing of all log stream related resources which is needed to recover lost data. DEFAULT: NO
  - USERDATA({xuserdata|NO_USERDATA}) is the name (RS-type) (or address in register (2)–(12) ASM only) of an optional 64 character input that specifies a user data area. A program on any system can set or update the data when disconnecting from this log stream and retrieve the data when connecting to the same log stream. DEFAULT: NO USERDATA
- ANSAREA(xansarea) is the name (RS-type) (or address in register (2)–(12) ASM only) of a required 32 character output that specifies the answer area. The ANSAREA contains additional information about this request.
- ANSLEN(xanslen) is the name (RS-type) (or address in register (2)–(12) ASM only) of a required fullword input address that specifies the answer area length.
- RETCODE(xretcode) is the name (RS-type) (or address in register (2)–(12) ASM only) of an optional fullword output variable into which the return code is to be copied from GPR 15.
- RSNCODE(xrsncode) is the name (RS-type) (or address in register (2)–(12) ASM only) of an optional fullword output variable into which the reason code is to be copied from GPR 0.

Figure 8:
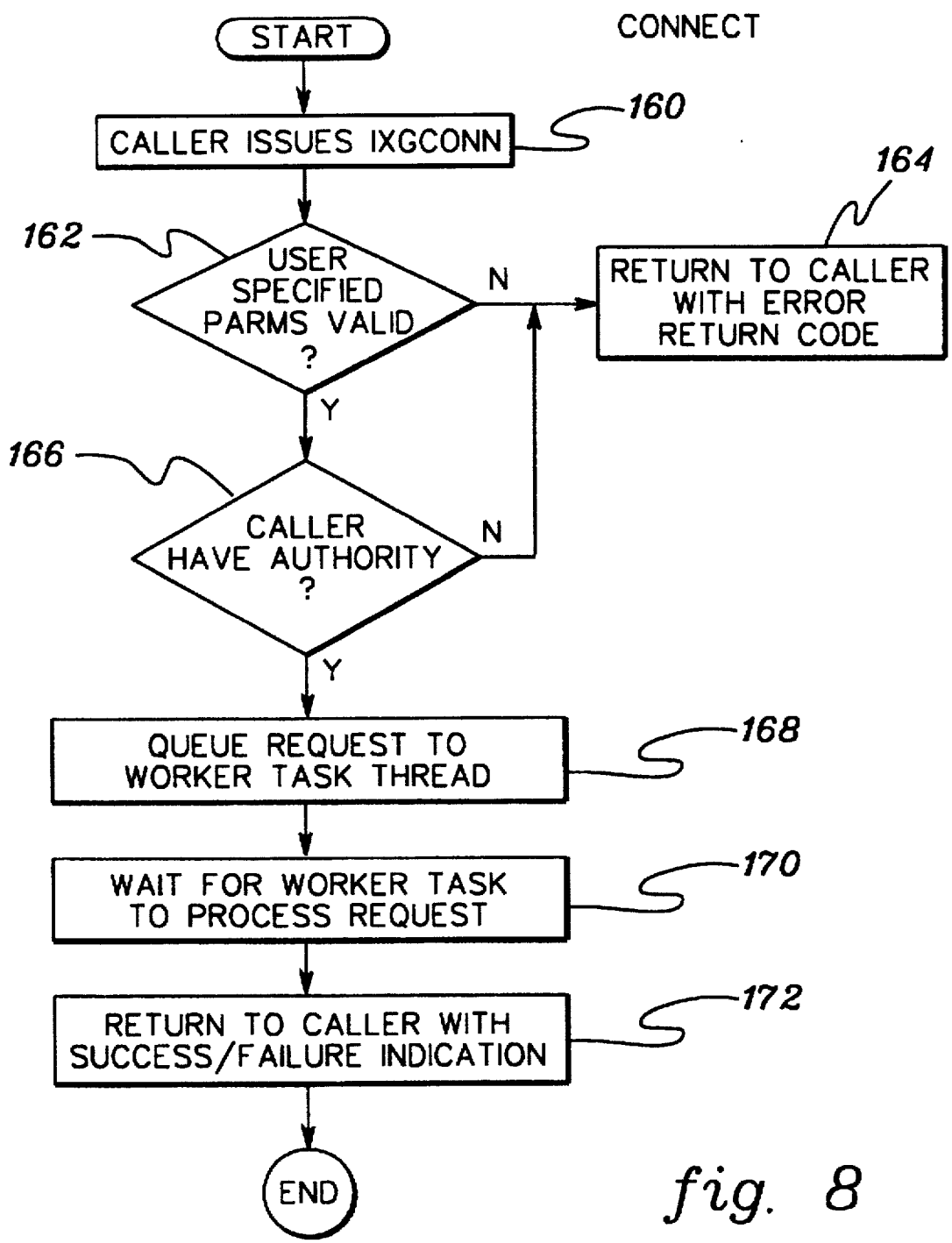
FIG. 8 depicts one embodiment of the logic associated with connecting to a log stream, in accordance with the principles of the present invention.

One example of the logic associated with the connect service is described in detail below with reference to FIG. 8. Initially, a caller, such as an application, invokes the IXGCONN service from the caller's address space in order to connect the application to the log stream designated by the STREAMNAME, STEP 160 "CALLER ISSUES IXGCONN." Thereafter, a determination is made as to whether the parameters specified by the user on the IXGCONN macro are valid, INQUIRY 162 "USER SPECIFIED PARMS VALID?" In particular, while executing in the connector address space, a check is made to determine whether the STREAMNAME is valid and what specific functions are authorized for the caller, as specified by AUTH. Other input parameters on the IXGCONN macro may be validated in a similar manner. If the parameters are invalid, then an error return code is passed to the caller and processing of the connect service is terminated, STEP 164. However, if the parameters are valid, processing continues.

Figure 9:
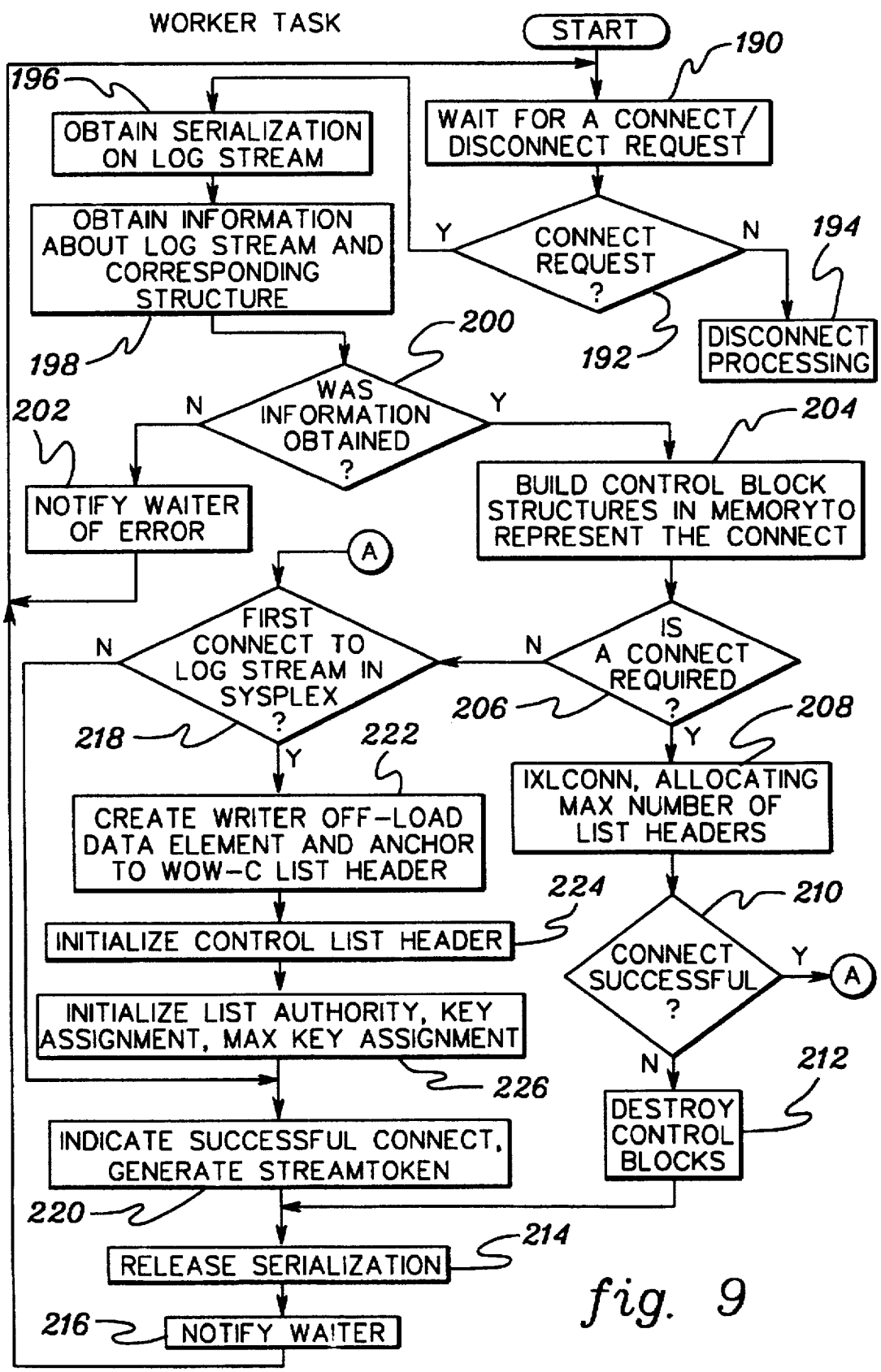
FIG. 9 depicts one embodiment of the logic associated with a worker task processing a request received during the connect processing of FIG. 8, in accordance with the principles of the present invention.

Specifically, a determination is made as to whether the caller has authority to reference the log stream, INQUIRY 166 "CALLER HAVE AUTHORITY?" If the caller does not have authority, then an error code is returned and the connect processing is terminated, STEP 164 "RETURN TO CALLER WITH ERROR RETURN CODE." However, if the caller does have authority, then the connect request is queued to a worker task thread within the system logger address space, STEP 168. As described in detail below with reference to FIG. 9, each request queued on the worker task thread will be processed by a worker task, STEP 170 "WAIT FOR WORKER TASK TO PROCESS REQUEST." The worker task is a separate task executing in the system logger address space. The queue is shared between the worker task and all of the address spaces that want to connect to the log stream. When the request is queued, the worker task will be notified that there is work to be done.

Subsequent to processing the connect request, an indication is passed to the caller specifying whether the request processing was successful or unsuccessful, STEP 172 "RETURN TO CALLER WITH SUCCESS/FAILURE INDICATION." Thereafter, the connect processing is complete.

As stated above, during connect processing, each request to connect to a log stream is queued to a worker task thread to be processed at a later time. The worker task is located in the system logger address space and is created during system logger address space initialization. The processing of a worker task is described below with reference to FIG. 9.

Initially, the worker task, which executes in the system logger address space, waits for a connect/disconnect request to be queued to the worker task thread, STEP 190 "WAIT FOR CONNECT/DISCONNECT REQUEST." When the worker task gets notified of work, a determination is made as to whether the request is a connect or disconnect request, INQUIRY 192 "CONNECT REQUEST?" Should the request be a disconnect request, then disconnect processing will take place, as described further below, STEP 194 "DISCONNECT PROCESSING." However, if the request was a connect request, then serialization on the log stream is obtained so that no other application in the coupled system can connect to the log stream until the present connection is complete, STEP 196 "OBTAIN SERIALIZATION ON LOG STREAM."

Subsequent to obtaining serialization, information about the log stream and the corresponding coupling facility structure mapped to by the log stream is obtained, STEP 198 "OBTAIN INFORMATION ABOUT LOG STREAM AND CORRESPONDING STRUCTURE." In one embodiment, the structure name, the log streams mapped to the structure, and the number of log streams mapped to by the structure are installation specified. In one example, many unique log streams can be mapped to the same coupling facility list structure.

If the log stream information was not successfully obtained, INQUIRY 200 "WAS INFORMATION OBTAINED?", then the waiter is notified of the error, STEP 202, and processing returns to STEP 190 "WAIT FOR CONNECT/DISCONNECT REQUEST." Otherwise, if the desired information was obtained, processing continues with associating particular characteristics to the log stream.

Control block structures representing the connect are built in memory, STEP 204 "BUILD CONTROL BLOCK STRUCTURES IN MEMORY TO REPRESENT THE CONNECT." In particular, internal control blocks that represent this connection are created.

After the control structures are built, a determination is made as to whether a connect is required to the coupling facility structure that maps to this log stream, INQUIRY 206. Specifically, an instance of the system logger only connects to a structure once. Therefore, if this is the first connect to a structure, an XES service referred to as IXLCONN is invoked in order to connect to the coupling facility structure and create a keyed list structure. One embodiment of IXLCONN is described in detail in "A Structure Rebuild Method and System," by Allen et al., Ser. No. 08/146,635, Filed Nov. 1, 1993, now abandoned, which is hereby incorporated herein by reference in its entirety. If this log stream or another log stream is connected to the structure, no connection to the structure has to be made.

As mentioned above, if a connect is required, then the IXLCONN service is issued in order to allocate storage in the coupling facility and, for instance, the maximum number of list headers, STEP 208. In particular, as one example, four list headers in a list structure are assigned to the log stream. A list header is the anchor for the coupling facility list. It includes, for instance, the list controls described above as well as a pointer to the associated coupling facility list structure. The four list headers include a data list header accepting data for the log stream, a control list header containing real time information cached in the coupling facility for the log stream, a writer off-load initiative list header (WOW-I) and a writer off-load control list header (WOW-C). The control list header is described in further detail below.

In one example, the control list header for the log stream contains a configuration data entry and a data set directory entry, each of which is explained in further detail herein. In one embodiment, the configuration data entry includes the lowest valid block id in the log stream, the highest valid block id written to dasd, the highest Greenwich Mean Time (GMT) of a block off-loaded to dasd, the highest local time of a block off-loaded to dasd, and information concerning the current output data set, such as the number of bytes the current data set can hold, the highest GMT of a log block written to this data set, the highest local time of the log block written to this data set and the highest logical relative block address written to this data set.

In one embodiment, the data set directory entry of the control list header includes a header containing a starting index of the first dasd log stream data set, an ending index of the last dasd log stream data set, and a current index of the current output data set. Additionally, the data set directory entry includes a data set directory array comprising one element for each data set. The data set directory array contains, for instance, a data set sequence number, the lowest relative block address in this data set, the highest relative block address in this data set, the highest GMT of a log block in this data set, and the highest and local time of a log block in this data set.

Thereafter, a determination is made as to whether the connect to the coupling facility structure was successful, INQUIRY 210 "CONNECT SUCCESSFUL?" If the connect was unsuccessful, then all of the control blocks built in STEP 204 are destroyed, STEP 212, and serialization of the log stream is released, STEP 214 "RELEASE SERIALIZATION." Subsequently, the waiter is notified that a connection to the coupling facility structure failed, STEP 216 "NOTIFY WAITER." Processing then continues with STEP 190 "WAIT FOR A CONNECT/DISCONNECT REQUEST."

On the other hand, if connection to the coupling facility structure is successful, INQUIRY 210, or if no connection was required, INQUIRY 206, then processing continues with INQUIRY 218 "FIRST CONNECT TO LOG STREAM IN SYSPLEX?" If this is the first connection to the log stream in the loosely coupled system, then a storage consumption limit for the named log stream is calculated.

The storage consumption limit for a named log stream is dependent on the number of other uniquely named log streams allowed to be concurrently connected to the coupling facility list structure when the first connect request for a new log stream is processed in the coupled system. That is, the storage consumption limit per log stream represented in the coupling facility is the size of the coupling facility structure divided by the number of log streams allowed to be actively in use.

At the same time, the system logger associates a low and high threshold value with the log stream. Both thresholds are less than the storage consumption limit; the low threshold is less than the high threshold. The low and high threshold values are calculated as a percentage of the storage consumption goal associated with the log stream. In one example, the high threshold is 80% and the low threshold is 60%.

Additionally, control information needs to be added to the coupling facility to represent the log stream. In particular, a writer off-load data element, i.e., a list entry, is created and anchored to the writer off-load control list header (WOW-C), STEP 222. In one example, a write list entry command is invoked in order to write the data element on the writer off-load control list header. One example of a write list entry command in described in detail in "Apparatus And Method For List Management In A Coupled Data Processing System," by J. A. Frey et al., Ser. No. 07/860,633, Filed: Mar. 30, 1992, now U.S. Pat. No. 5,410,695, which is hereby incorporated herein by reference.

Subsequent to writing the data entry to the writer off-load control list header, the configuration data entry and the data set directory entry within the control list header, described above, are initialized, STEP 224. Additionally, the list authority, assignment key, assignment key threshold, and list element count limit are initialized for the log stream data list, STEPS 226.

In one embodiment, a write list controls command is used to initialize the values. One example of the write list controls command is described in detail in "Apparatus And Method For List Management In A Coupled Data Processing System," by J. A. Frey et al., Ser. No. 07/860,633, Filed: Mar. 30, 1992, now U.S. Pat. No. 5,410,695, which is hereby incorporated herein by reference. In addition to the above, in accordance with the principles of the present invention, during processing of the write-list controls command, list authorities are compared, as described below. Otherwise, the comparison of list authorities is controlled by the list-authority-comparison-type operand.

When the value of the list-authority comparison type indicates a comparison based on equality or less than or equal, or when a write-list-controls command is executed, the CLAU operand is compared with the value of the list-authority control in the specified list.

When the value of the list-authority comparison type indicates a comparison based on equality, and they are equal, the list-authority comparison succeeds, and the command continues.

When the value of the list-authority comparison type indicates a less than or equal comparison, and the list-authority control is less than or equal to the CLAU operand, the list-authority comparison succeeds and the command continues.

The list-authority control may be replaced when the write-list-controls command is executed. Otherwise, the replacement of list authorities is controlled by the list-authority-replacement-type and list-authority-comparison-type operands. When the value of the list-authority replacement type indicates replacement, the value of the LAU operand is stored in the list-authority control provided one of the following conditions exists:

The command is write list controls and list-authority comparison is successful;

The value of the LAUCT operand represents do not compare; or

The value of the LAUCT operand represents an equal comparison or a less than or equal comparison, and list authority comparison is successful.

During the write list controls command, the list authority is initialized to the GMT timestamp, the assignment key field is initialized to zero, the assignment key threshold is initialized to all binary ones, and the list element count limit (LELCL) is initialized to the total number of elements available in the structure (MLSELC) divided by the number of log streams mapped to the structure.

Subsequently, a successful connect is indicated, the log stream token is generated, STEP 220, serialization is released, STEP 214, and the waiter is notified that the connection is successfully complete, STEP 216. Processing then returns to STEP 190, "WAIT FOR A CONNECT/DISCONNECT REQUEST."

Returning to INQUIRY 218 "FIRST CONNECT TO LOG STREAM IN SYSPLEX?", if this is not the first connect to the log stream, then processing continues with STEP 220, "INDICATE SUCCESSFUL CONNECTION; GENERATE STREAM TOKEN."

Subsequent to successfully connecting to a log stream, the application, if authorized, can write log records to the log stream. In one example, a service referred to as IXGWRITE is used to write data to the log stream. The IXGWRITE macro writes a log block from the user's buffer to the log stream and returns a unique logical block identifier for every block written to the log stream. The block identifier can later be used to specify the block for a browse or delete operation.

One example of the syntax associated with the IXGWRITE macro is described in detail below. (In this example, certain of the parameters are listed as required, while others are listed as optional. This is only one example and it may be different for another embodiment.):

```
[xlabel]   IXGWRITE   ,STREAMTOKEN=xstreamtoken
                      ,BUFFER=xbuffer
                      ,BLOCKLEN=xblocklen
                      ,BUFFALET=xbuffaleti0}
                      ,BUFFKEY={xbuffkeyl*}
                      ,RETBLOCKID=xretblockid
                      ,TIMESTAMP={xtimestampl
                        NO_TIMESTAMP}
                      ,MODE=SYNC
                      ,MODE=SYNCECB
                      ,ECB=xecb
                      ,ANSAREA=xansarea
                      ,ANSLEN=xanslen
                      ,RETCODE=xretcode
                      ,RSNCODE=xrsncode
```

Where:

[xlabel] is an optional symbol, starting in column 1, that is the name on the IXGWRITE macro invocation. DEFAULT: No name.

STREAMTOKEN(xstreamtoken) is the name (RS-type) (or address in register (2)–(12) ASM only) of a required 16 character input that specifies the log stream token that was returned on the IXGCONN service.

BUFFER(xbuffer) is the name (RS-type) (or address in register (2)–(12) ASM only) of a required character input that specifies the buffer from which the log stream block is to be written.

The buffer can be ALET qualified. If the buffer is ALET qualified, the ALET must index a valid entry on the task's dispatchable unit access list.

BLOCKLEN(xblocklen) is the name (RS-type) (or address in register (2)–(12) ASM only) of a required fullword input that specifies the length of the log block to be written. In one example, the maximum block length is 65,536.

BUFFALET({xbuffaletl0}) is the name (RS-type) (or address in register (2)–(12) ASM only) of an optional fullword input that specifies the ALET to be used to access the storage specified by the BUFFER keyword. DEFAULT: 0, which means the buffer resides in the caller's primary address space.

BUFFKEY({xbuffkeyl*}) is the name (RS-type) (or address in register (2)–(12) ASM only) of an optional fullword input that specifies the KEY associated with the storage specified by the BUFFER keyword.

RETBLOCKID(xretblockid) is the name (RS-type) (or address in register (2)–(12) ASM only) of a required 8 character input that specifies the name of an output area in which IXGWRITE returns the log block identifier when it successfully writes the log block into the log stream. The returned RETBLOCKID is used as input to the IXGBRWSE and IXGDELET services, described in detail below.

TIMESTAMP({xtimestamplNO_TIMESTAMP}) is the name (RS-type) (or address in register (2)–(12) ASM only) of an optional 16 character input that specifies the output area in which both the GMT and local time is concatenated and returned. The time stamp is associated with the block referenced by the RETBLOCKID keyword and both GMT time and local time are in store clock (STCK) format. The GMT time is incremented by 'Leap Seconds'. DEFAULT: NO_TIMESTAMP When you omit this keyword, the time stamps associated with the log block will not be returned.

MODE({SYNCISYNCECB}) is an optional keyword input which indicates whether the WRITE request should be performed synchronously or asynchronously. If MODE(SYNCECB) is specified, then the ECB keyword must also be specified. DEFAULT: SYNC MODE(SYNC) specifies that the request should be performed synchronously. Control is not returned to the caller until request processing is complete.

If necessary, the caller will be suspended until the request completes.

MODE(SYNCECB) specifies that the request should be attempted synchronously. If the request can not be completed synchronously, control is returned to the caller prior to completion of the request and the ECB specified by ECB is posted when the request has completed.

When MODE=SYNCECB is specified and the request does not complete synchronously, the system logger maintains latent binds to the storage location specified by ANSAREA, RETBLOCKID and TIMESTAMP.

[ECB(xecb)] is the name (RS-type) (or address in register (2)–(12) ASM only) of a required fullword input that specifies an ECB, which is the ECB that is to be posted when the request completes.

The ECB should be initialized by the requestor prior to using this service.

ANSAREA(xansarea) is the name (RS-type) (or address in register (2)–(12) ASM only) of a required 32 character input that specifies the answer area. The ANSAREA contains the resulting return and reason code, if the request is processed asynchronously, as well as additional error status when the IXGWRITE service generates an error return code.

ANSLEN(xanslen) is the name (RS-type) (or address in register (2)–(12) ASM only) of a required fullword input that specifies the answer area length.

RETCODE(xretcode) is the name (RS-type) (or register (2)–(12) ASM only) of an optional fullword output variable into which the return code is to be copied from GPR 15.

RSNCODE(xrsncode) is the name (RS-type) (or register (2)–(12) ASM only) of an optional fullword output variable into which the reason code is to be copied from GPR 0.

Figure 10:
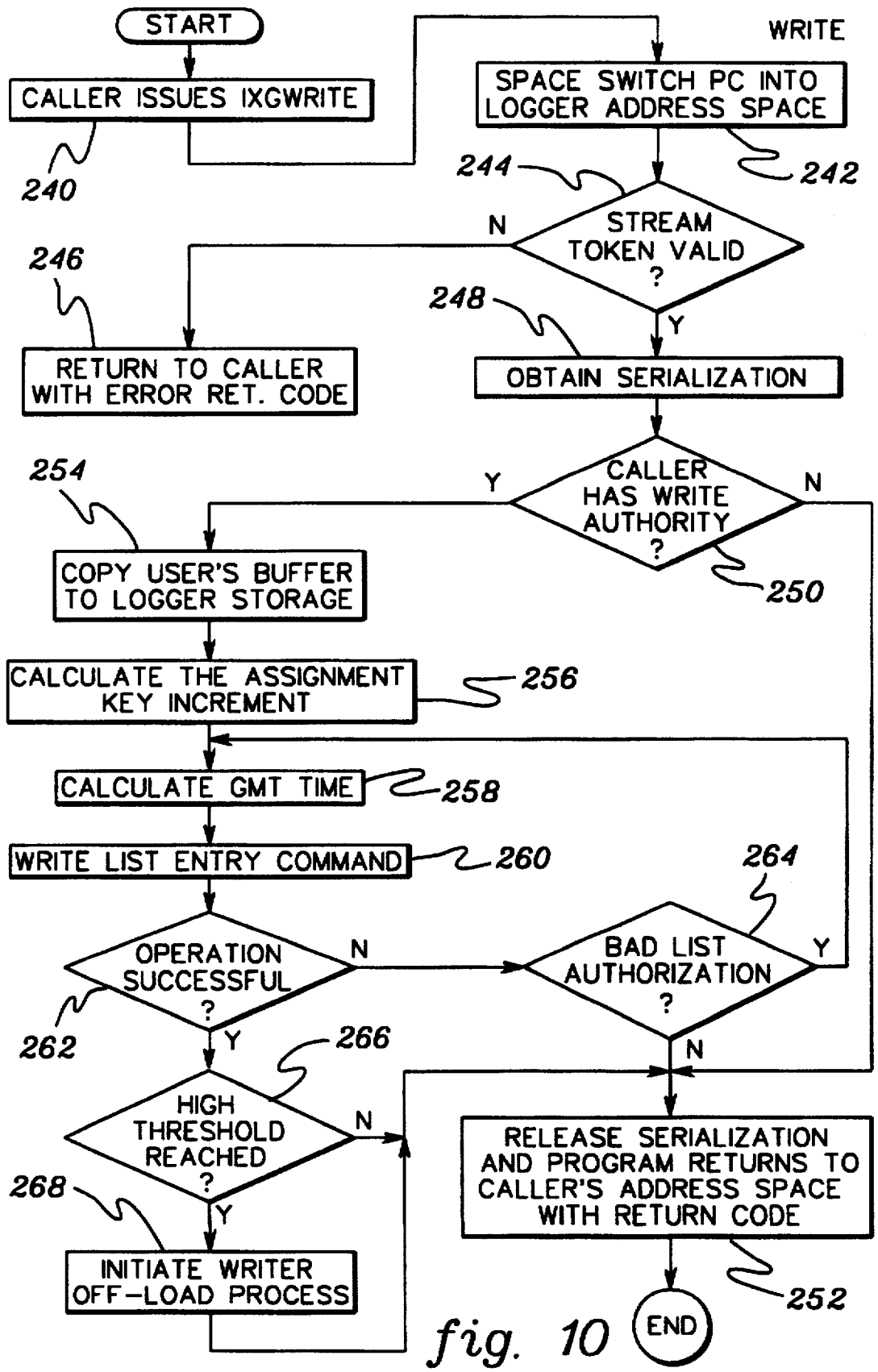
FIG. 10 illustrates one example of the logic associated with writing log blocks to a log stream, in accordance with the principles of the present invention.

One example of the logic associated with the write service is described in detail below with reference to FIG. 10. Initially, a caller issues the IXGWRITE macro from the caller's address space, STEP 240 "CALLER ISSUES IXG-WRITE." Thereafter, there is a switch into the system logger's address space from the user's address space for processing of the write service, STEP 242 "SPACE SWITCH PROGRAM CALL (PC) INTO LOGGER ADDRESS SPACE."

In the system logger's address space, an inquiry is made as to whether the log stream token obtained during connect processing matches the log stream token input on the write macro via the parameter STREAMTOKEN, INQUIRY 244 "STREAM TOKEN VALID?" If the STREAMTOKEN is invalid, then an error return code is passed to the caller, STEP 246 "RETURN TO CALLER WITH ERROR RETURN CODE," and processing of the write service is terminated.

On the other hand, if the STREAMTOKEN is valid, then activity against the log stream is locally serialized, STEP 248 "OBTAIN SERIALIZATION." That is, on this system disconnection from the log stream is prevented while the log stream is in use by this system. Further, a determination is made as to whether the caller has write authority to the log stream, INQUIRY 250 "CALLER HAS WRITE AUTHORITY?" Specifically, the AUTH parameter on the connect macro is checked to see if it is equal to WRITE.

If the caller does not have WRITE authority, then the log record cannot be written to the log stream. Therefore, local serialization of the log stream is released and the program returns to the caller's address space with a return code indicating that the caller does not have the proper authority, STEP 252 "RELEASE SERIALIZATION AND PROGRAM RETURNS TO CALLER'S ADDRESS SPACE WITH RETURN CODE."

If the caller does have WRITE authority, then write processing continues. The user's log record specified by BUFFER on the IXGWRITE macro is copied to the system logger address space, STEP 254 "COPY USER'S BUFFER TO LOGGER STORAGE." Subsequently, the assignment key increment is calculated in order to determine where the next log record is to be placed in the log stream, STEP 256 "CALCULATE THE ASSIGNMENT KEY INCREMENT." In particular, in one example, the increment is equal to the length of the data record to be written as well as the length of the control information.

After calculating the assignment key increment, the current GMT time and local time are calculated in a known manner STEP 258, and a write list entry command is initiated, STEP 260. Upon initiation of the write list entry command, the list number is input to the command to designate on which list the entry is to be written. Also, the GMT and local time are stored in the adjunct list entry value, which is passed to the write list entry command. One example of the write list entry command is described in detail in "Apparatus And Method For List Management In A Coupled Data Processing System," by J. A. Frey et al., Ser. No. 07/860,633, Filed: Mar. 30, 1992, now U.S. Pat. No. 5,410,695, which is incorporated herein by reference in its entirety. However, a general overview of the procedure for writing list entries and further particulars of the write list entry command are described in detail below.

In general, a list entry may be written on a write-list-entry or a write-and-move-list-entry command. A list entry is written when an entry is created or replaced.

When a list entry is created, the data and adjunct indicators within the list-structure-type object are used to determine whether or not to write the data or adjunct list entry, or both. When a list entry is replaced, the data and adjunct indicators within the list-entry-type operand are used to determine whether or not to write the data or adjunct list entry, or both.

When the data indicator specifies that the list entries have data, the data list entry is written from the data block. When the adjunct indicator specifies that the list entries have adjunct, the adjunct list entry is written from the adjunct-list-entry-value request operand.

When the data list entry is replaced and the data-list-entry-size operand is smaller than the data-list-entry-size object, the data-list entry is contracted to the new size, the data block is stored in the data-list entry, and the data-list-entry-size object in the list-entry controls is updated with the value of the data-list-entry-size operand. When the data list entry is replaced and the data-list-entry-size operand is larger than the data-list-entry-size object, the data-list entry is expanded to the new size, the data block is stored in the data-list entry, and the data-list-entry-size object in the list-entry controls is updated with the value of the data-list-entry-size operand.

During a write-list entry command, list-entry creation may be requested, depending on the write-request type specified.

When a write-request type specifies to create a list entry, list-entry creation is unconditionally requested. When a write-request type specifies to replace or create a list entry, list-entry creation is conditionally requested; that is, the list-entry creation is requested when the designated list entry does not exist.

When the list set and list is not full and list-entry creation is requested, a list entry may be created. When a list entry is created, the list-set-entry count and when it exists, the associated list-entry count are each incremented by one. When a list entry is created, the list-set-element count and when it exists, the associated list-element count are each increased by the value of the data-list-entry size.

A list entry is created at the first entry position relative to the designated position, and the relative position of all succeeding entries is increased by one.

A list entry may be replaced on a write-list-entry command. When a write-request type specifies to replace a list entry or to replace or create a list entry and the designated list entry exists, the list entry may be replaced.

When a list entry is replaced, the list-set-element count and when it exists, the associated list-element count are each increased or decreased by the change in the data-list-entry size.

The position of an entry is not affected when it is replaced.

When a write-request type specifies to replace a list entry and the designated list entry does not exist, an indicative response code is returned.

A list entry may be moved on a move-list-entry, a write-and-move-list-entry, or a move-and-read-list-entry command. List entries may be moved between lists or to the same list within a list set.

A list entry is moved from the first entry position relative to the designated position, and the relative position of all succeeding entries is decreased by one. A list entry is moved to the first entry position relative to the targeted position, and the relative position of all succeeding entries is increased by one.

When a list entry is moved from one list to another and list-entry counts exist, the list-entry count of the source list is decremented by one and the list-entry count of the target list is incremented by one.

When a list entry is moved from one list to another and list-element counts exist, the list-element count of the source list is decreased by the value of the data-list-entry size and the list-element count of the target list is increased by the same amount.

Particulars of the write list entry command will now be described. The write list entry command conditionally compares the list number in the list entry control block with the list number in the operands, compares the list-set-entry count with the maximum list-set entry count, compares the list-entry count with the list entry count limit or the list element count with the list element count limit, conditionally compares the version number in the list entry control block with the comparative version number in the operands, conditionally updates the version number in the list entry control block with the version number in the operands, compares the global-lock managers in the lock table with the comparative global lock manager of the operands, compares the local-lock managers of the lock table with the local lock manager of the operands, writes the lock-table entry, replaces or creates the designated list entry, returns the designated list-entry controls (including the list-entry key), and conditionally updates the retry buffer.

In addition to the above comparisons, a list authority comparison is made in accordance with the principles of the present invention. Initially, the list authority and comparative list authority are initialized to the GMT calculated in STEP 258, the list authority comparison type is set to less than or equal and the list authority replacement type is set to replace if the compare is successful. The list authority located in the list controls is compared to the comparative list authority and if the list authority is less than or equal to the comparative list authority indicating proper timestamp sequence in the log stream, the list authority in list controls is updated with the value of list authority in the operands.

Additionally, in accordance with the principles of the present invention, a key is assigned to the entry. Initially, the assignment key increment calculated in STEP 256 is stored in the assignment key increment operand, the assignment key request type is initialized to assign a key on create and the assignment key update type is initialized to update the current assignment key in list controls by the assignment key increment. Upon successful completion of the write list entry command, the current assignment key is stored in the list-entry key in the list entry control block, and the assignment key in list controls is updated by the assignment key increment. The list-entry key represents the block id used in the browse and delete services, described herein. The logical block id represents the logical offset into the log stream sequence. The key assignment process enables the system logger instance to assign a block id, which represents the next available relative offset in the log stream without having to understand intervening write activity to the log stream by other system logger instances in the coupled system.

Figure 18A:
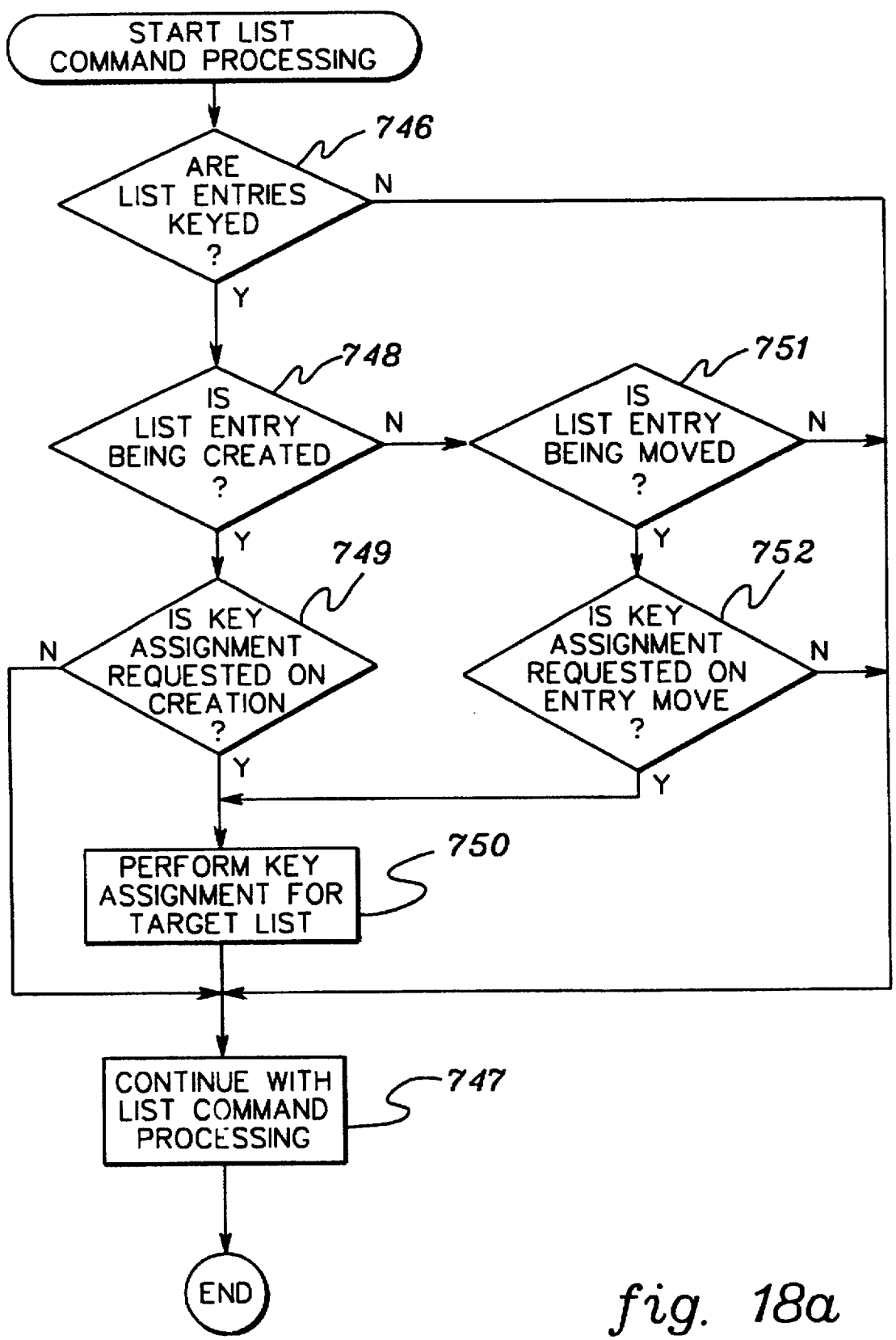
FIGS. 18a–18b illustrate one example of the logic associated with assignment key request processing, in accordance with the principles of the present invention.

One example of key assignment request processing is described in detail below with reference to FIGS. 18a–18b. The use of assignment keys is an important feature of the present invention. As described in detail above, the assignment key is used during the write list entry processing. It may also be used in other processes, such as a write list controls command, a write and move list entry command, a move and read list entry command, a move list entry command, as well as any other commands that are associated with writing and moving keyed list entries.

As described in detail above, the write list entry command uses the assignment key. Processing of the assignment key is described in detail below with reference to FIGS. 18a and 18b. Referring to FIG. 18a, initially, a determination is made as to whether the list entries are keyed, INQUIRY 746. If the entries are not keyed, then assignment key processing is not used, and the flow passes to STEP 747 "CONTINUE WITH LIST COMMAND PROCESSING." In this example, the list command processing is the write list entry command.

If, however, the entries are keyed, then a determination is made as to whether the list entry is being created, INQUIRY 748. If the list entry is being created, then another determination is made as to whether key assignment was requested on creation, INQUIRY 749. In one example, this determination is made by reading the value of the assignment key request type. If a list entry is being created and key assignment processing is requested, key assignment processing is performed for the target list, as described below with reference to FIG. 18b. Subsequent, to performing the key assignment, list command processing continues, STEP 747.

Returning to INQUIRY 748, if a list entry is not being created, then further inquiries are made into whether the list entry is being moved and whether key assignment was requested, INQUIRIES 751, 752. If the list entry is not being moved, then, in this embodiment, key assignment is not needed. Thus, processing continues with STEP 747 "CONTINUE WITH LIST COMMAND PROCESSING." However, if the list entry is being moved, but key assignment is not requested, then once again, processing continues with STEP 747.

If a list entry is being moved and key assignment processing is requested, as indicated by the assignment key request type, then key assignment processing is performed for the target list, as described in detail with reference to FIG. 18b.

Figure 18B:
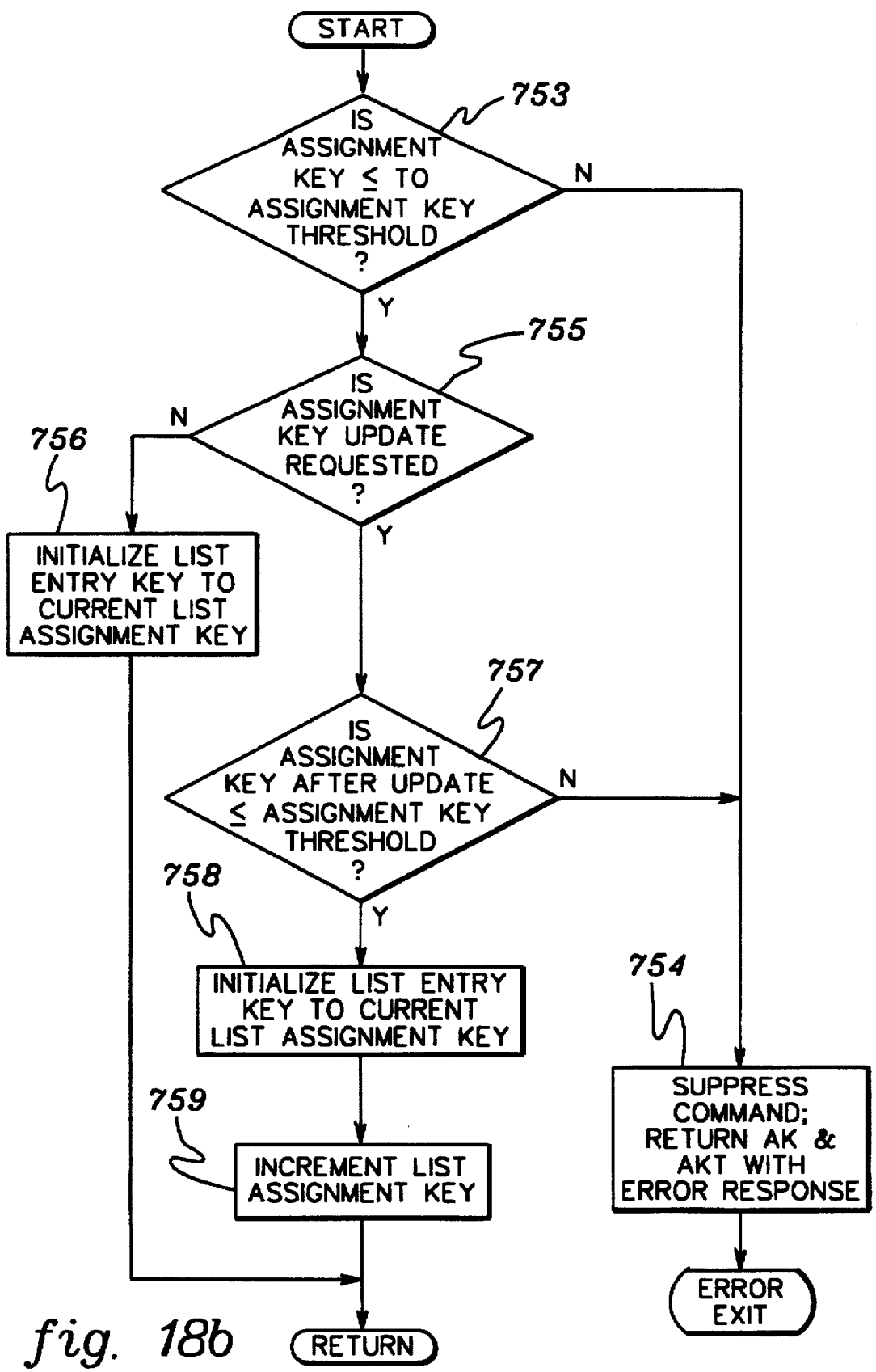

Referring to FIG. 18b, if the assignment key is less than or equal to the assignment key threshold, then a determination is made as to whether an assignment key update is requested, INQUIRY 755. In one example, an assignment key update is requested when the assignment key update type is equal to '1'b.

If the assignment key update type did not reflect an update, then the list-entry key is initialized to the current list assignment key, STEP 756. The list-entry key will be used as the block id during the write processing, as well as other processing. Thereafter, key assignment processing is complete.

If the assignment key update type did reflect an update request, then a determination is made as to whether the assignment key after updating (i.e., the AK+AKI) is less than or equal to the assignment key threshold (AKT), INQUIRY 757. If the comparison fails, then the command is suppressed, and the assignment key and assignment key threshold values are returned, STEP 754. However, if the comparison is successful, then the list-entry key is initialized to the current list assignment key (i.e., LEK=AK), STEP 758, and the list assignment key is incremented by the assignment key increment, STEP 759. Thereafter, key assignment processing is complete.

Subsequent to invoking the write list entry command, a determination is made as to whether the write operation was successful, INQUIRY 262 "OPERATION SUCCESSFUL?" If the operation was unsuccessful, then a further determination is made as to whether the comparison of the list authorities failed, INQUIRY 264 "BAD LIST AUTHORIZATION?" If the list authority comparison failed indicating that another system running in parallel calculated its GMT time after this system but had its write command processed before this system, then the GMT is recalculated and the write is attempted once again, STEP 258 "CALCULATE GMT TIME."

On the other hand, if the operation was unsuccessful but the list authority comparison did not fail, then an unexpected condition has occurred. Thus, local serialization is released and an indicative return code is passed to the caller's address space, STEP 252.

Returning to INQUIRY 262, if the log block was successfully written to the log stream, then a further determination is made as to whether the high threshold of allocated resources in the coupling facility for this log stream was reached, INQUIRY 266 "HIGH THRESHOLD REACHED?" In particular, in one example, a calculation is performed to see if 80% utilization of the storage assigned to the list header has been reached. That is, the list element count limit previously initialized is compared to the list element count returned on successful completion of the write list entry command. If the high threshold was not reached, then processing continues with STEP 252. Specifically, local serialization is released, and the block id, which is set equal to the list entry key returned on successful completion of the write list entry command, and an indicative return code are passed to the caller's address space. However, if the high threshold was reached, then in an effort to prevent the coupling facility list from becoming full, a writer off-load process is initiated, as described in detail below, STEP 268 "INITIATE WRITER OFF-LOAD PROCESS." Thereafter, processing continues with STEP 252 in which local serialization is released and the block id and an indicative return code are passed to the caller.

Figure 11:
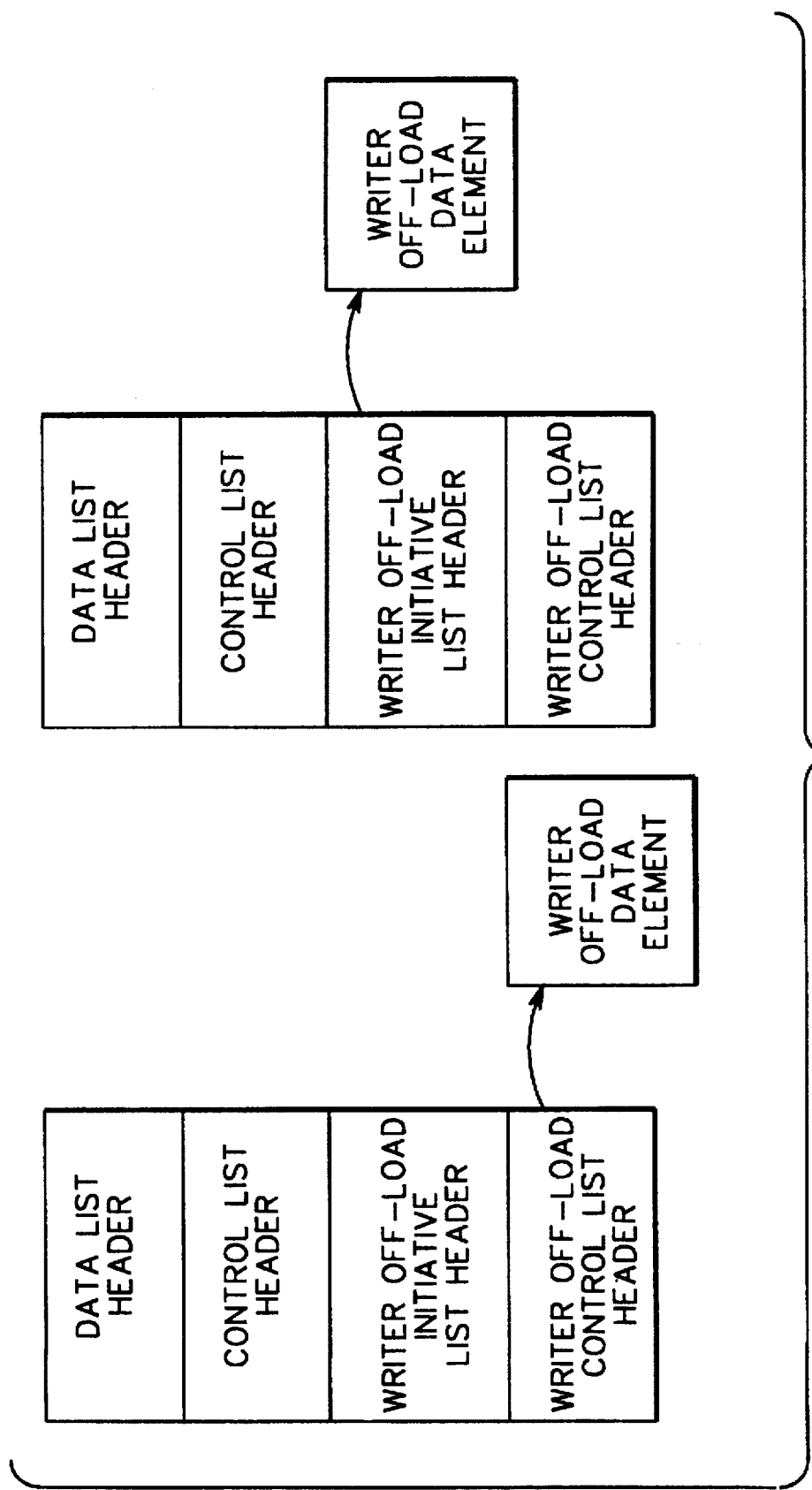
FIG. 11 illustrates one example of a data element being written from a writer off-load control list header to a writer off-load initiative list header, in accordance with the principles of the present invention.

As described in detail below, during the off-load process initiated in STEP 268, a writer off-load data element (FIG. 11) is moved from the writer off-load control list header (WOW-C) to the writer off-load initiative list header (WOW-I). One example of the logic associated with the writer off-load process is described in detail with reference to FIGS. 12 and 13.

In one embodiment, there is only one instance of the writer off-load executing at any one time for a given log stream. In accordance with the principles of the present invention, the writer off-load process begins copying the oldest data in the coupling facility for the affected log stream to dasd and terminates when the coupling facility resources allocated to the log stream are at or below the designated low threshold.

Figure 12:
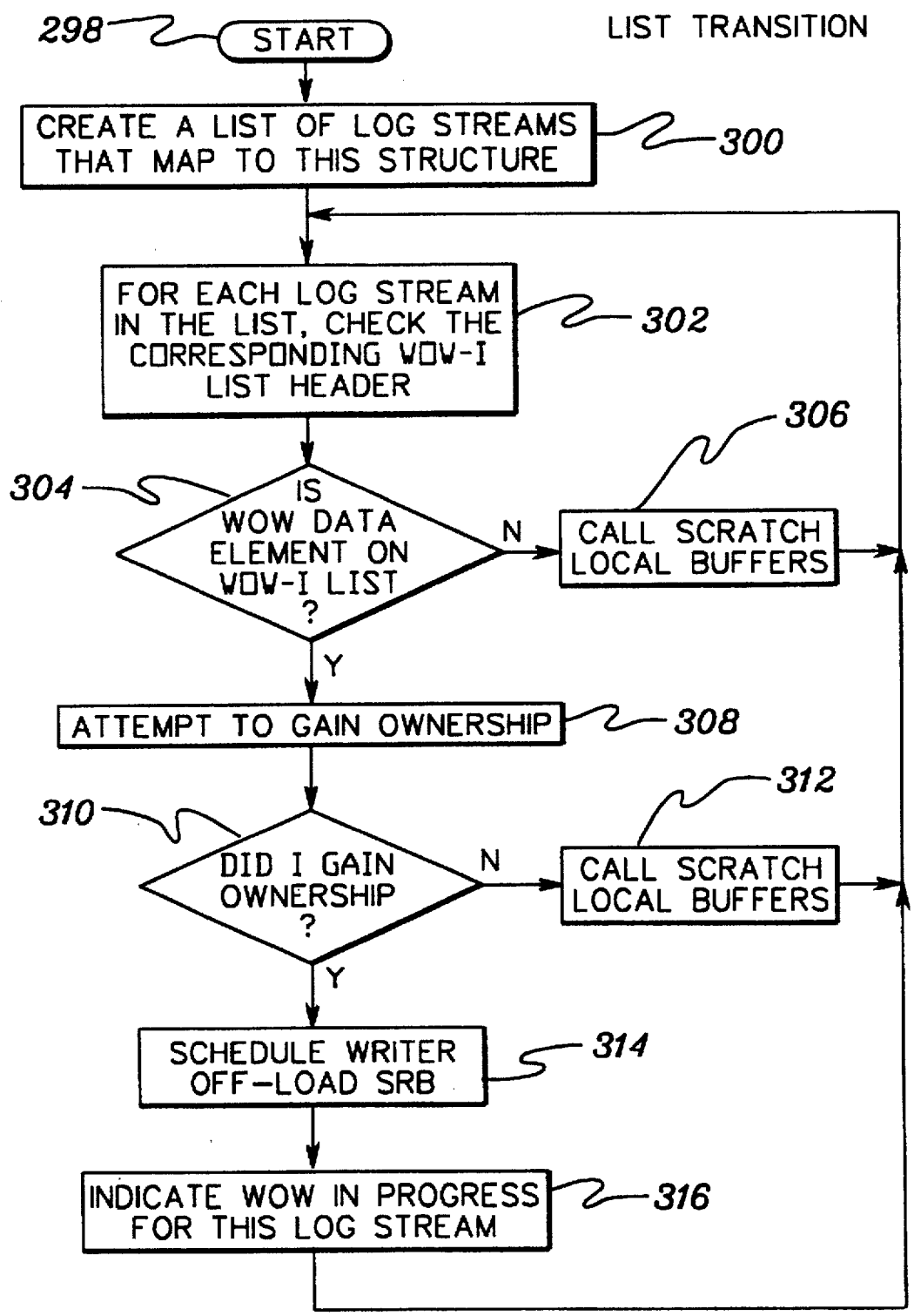
FIG. 12 depicts one example of the logic associated with transitioning list information from the coupling facility to dasd during writer off-load processing, in accordance with the principles of the present invention.

Referring to FIG. 12, when the writer off-load data element is moved from the writer off-load control list header to the writer off-load initiative list header, the transition exit of each system logger connected to the structure is given control, STEP 298 "START." Specifically, when a list transitions from the empty to non-empty state, state transition notification is triggered for the connected system logger instances who are interested in that log stream for writer off-load processing. List transition and notification is described in detail in "Method And Apparatus For Notification Of State Transitions For Shared Lists Of Data Entries," by J. A. Frey et al., Ser. No. 07/860,809, Filed: Mar. 30, 1992, now U.S. Pat. No. 5,390,328, which is incorporated herein by reference in its entirety.

After the system logger is given control, a list of log streams that map to this particular coupling facility structure, as seen by the system performing the list transition processing, is created, STEP 300 "CREATE A LIST OF LOG STREAMS THAT MAP TO THIS STRUCTURE." For example, if Log Stream A running on System A is connected to Structure A, and Log Stream B running on System B is connected to Structure A, the list of log streams created on System A for Structure A only includes Log Stream A.

For each log stream in the list created in STEP 300, the corresponding writer off-load initiative list header is checked to determine if the data element is located on the list header, STEP 302. In particular, a test vector entry instruction is issued against the list notification vector to determine if there has been a list state transition, and if so, for which list. This instruction is described in detail in "Method And Apparatus For Notification Of State Transitions For Shared Lists Of Data Entries," by J. A. Frey et al., Ser. No. 07/860,809, Filed: Mar. 30, 1992, now U.S. Pat. No. 5,390,308, which is incorporated herein by reference in its entirety. If the data element is not on the list header, then it was processed by another system running the list transitioning in parallel to this system. In particular, the other system has already moved and written the data element to the writer off-load control list header. Thus, the local buffers which contain a copy of the data written from the coupling facility to dasd are scratched, STEP 306 "CALL SCRATCH LOCAL BUFFERS." More specifically, the configuration data entry is read to retrieve the highest block id written to dasd. Blocks in the local buffer having block ids less than or equal to the highest block id written to dasd have been off-loaded and can be scratched. Thereafter, processing continues with STEP 302.

Returning to INQUIRY 304, if the writer off-load data element is on the writer off-load initiative list header, then each system attempts to gain ownership of the data element, STEP 308 "ATTEMPT TO GAIN OWNERSHIP." In particular, each instance of the system logger races to gain ownership of the data element by performing a compare and swap operation of the version number and connection id. A write list entry command is performed to place the connection id of this system logger instance, which was returned by the IXLCONN service, in the version number field of the list entry controls. If the version number is not zero, then the compare and swap is unsuccessful.

Thereafter, a determination is made as to whether ownership was gained, INQUIRY 310 "DID I GAIN OWNERSHIP?" If the system was unable to place its connection id in the data element, then ownership was not gained, and the pertinent local buffers are scratched in the manner described above, and processing continues with STEP 302. However, if the system did gain ownership, then the system asynchronously schedules a service request block (SRB), which actually performs the writer off-load process, STEP 314 "SCHEDULE WRITER OFF-LOAD SRB." One example of SRB processing is described in detail below with reference to FIG. 13.

Subsequently, an indication is made in the control structures that represent the log stream that writer off-load process is in progress on this system for this log stream, STEP 316, and processing continues with STEP 302 "FOR EACH LOG STREAM IN THE LIST, CHECK THE CORRESPONDING WOW-I LIST HEADER."

Figure 13:
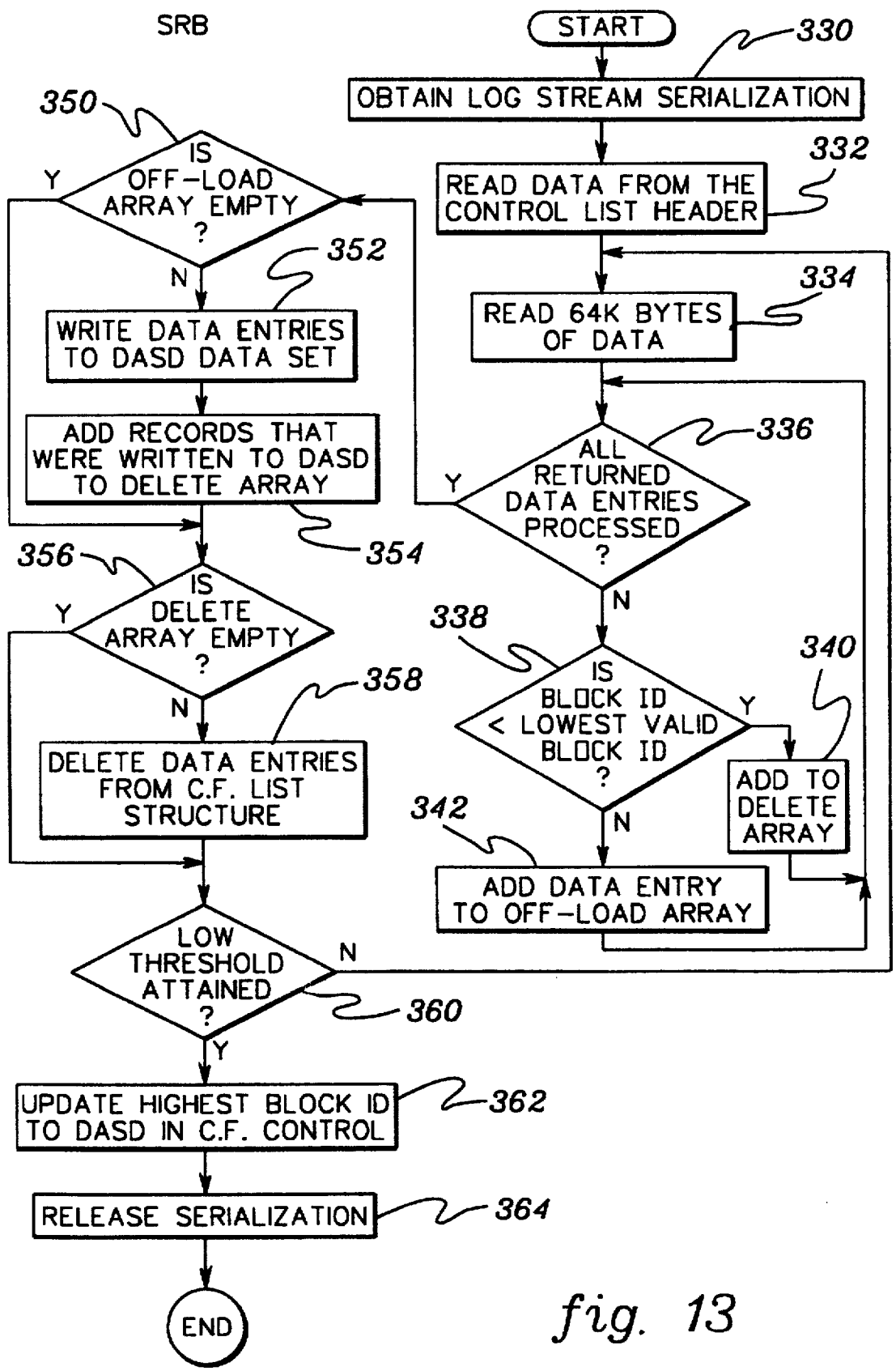
FIG. 13 depicts one example of the logic associated with processing of a service request block, which was scheduled during the list transitioning process of FIG. 12, in accordance with the principles of the present invention.

One example of the logic associated with processing the writer off-load service request block is described in detail with reference to FIG. 13. A service request block is initiated for each log stream. Initially, local serialization of the writer off-load process is obtained on the log stream, STEP 330. Thereafter, data relating to the log stream is read from the control list header via, for instance, a read list entry command, STEP 332 "READ DATA FROM CONTROL LIST HEADER." (One example of the read list entry command is described in detail in "Apparatus And Method For List Management In A Coupled Data Processing System," by J. A. Frey et al., Ser. No. 07/860,633, Filed: Mar. 30, 1992, now U.S. Pat. No. 5,410,695, which is hereby incorporated herein by reference in its entirety.) In one example, the data obtained from the control list header and specifically, the configuration data entry of the control list header, includes the lowest valid block id specified during delete processing, described below, the highest block id written to dasd, as well as the current output data set information.

Subsequently, data is read from the log stream using, for example, a read list command described in detail in "Apparatus And Method For List Management In A Coupled Data Processing System," by J. A. Frey et al., Ser. No. 07/860,633, Filed: Mar. 30, 1992, now U.S. Pat. No. 5,410,695, which is hereby incorporated herein by reference in its entirety, STEP 334. In one embodiment, 64k bytes of the oldest data in the log stream is read. This 64k bytes of data may include one or more data entries of the coupling facility list structure representing the log stream. The log stream data list is read as unkeyed starting at the beginning. The read list command will also return the list entry controls of the next entry to be processed on the list.

After reading the data, a determination is made for each piece of data returned whether it needs to be written out to dasd because it still represents valid data or can it be deleted because it represents old data that was previously logically deleted via IXGDELET, INQUIRY 336 "ALL RETURNED DATA ENTRIES PROCESSED?" If there are still data entries to be processed, then a determination is made as to whether the block id for the particular data entry is less than the lowest valid block id for the log stream, INQUIRY 338.

Should the block id be less than the lowest valid block id for the log stream, then the data is added to the delete array for deletion from the coupling facility, STEP 340, and processing returns to INQUIRY 336 "ALL RETURNED DATA ENTRIES PROCESSED?"

However, if the block id is not less than the lowest valid block id, then the data entry is added to the off-load array to be written to dasd, STEP 342 "ADD DATA ENTRY TO OFF-LOAD ARRAY," and processing continues with INQUIRY 336 "ALL RETURNED DATA ENTRIES PROCESSED?"

When all of the returned data entries have been processed, then a determination is made as to whether the off-load array is empty, INQUIRY 350 "IS OFF-LOAD ARRAY EMPTY?" If the off-load array is not empty, then each data entry in the array is written to the corresponding dasd data sets for the log stream, STEP 352 "WRITE DATA ENTRIES TO DASD DATA SET." One example of a technique for writing data entries to the dasd data sets is described in detail below with reference to FIGS. 14a–14d. Thereafter, the records that were written to dasd are written to the delete array for subsequent deletion from the coupling facility, STEP 354.

After writing the records to dasd, or if the off-load array was empty, then a further determination is made as to whether the delete array is empty, INQUIRY 356 "IS DELETE ARRAY EMPTY?" If the delete array is not empty, then each data entry within the array is deleted from the coupling facility list structure, STEP 358 "DELETE DATA ENTRIES FROM C.F. LIST STRUCTURE." In one embodiment, a delete list entries command is used to delete entries off of the coupling facility list structure. The list entry identifier (LEID) for each list entry to be deleted is input to the command.

Subsequent to deleting the data entries, or if the delete array was empty, a determination is made as to whether enough storage has been freed to obtain the low threshold, INQUIRY 360 "LOW THRESHOLD OBTAINED?" If the low threshold is not reached, then processing continues with STEP 334 "READ 64k BYTES OF DATA." However, if enough storage has been freed, then the highest block id to dasd in the configuration data entry is updated by a write list entry command, along with the highest GMT of log block written to the data set, the highest local time of the log block written to the data set, and the highest logical relative block address of log block written to the data set, STEP 362. Information about the current output data set is also updated. The writer off-load data entry is moved to the WOW-C, resetting the version number to zero. Further, local serialization is released, STEP 364.

In accordance with the principles of the present invention, off-loading to dasd is performed, as described in detail below, with reference to FIGS. 14a–14d. The off-load processing can happen on any operating system is connected to the log stream. Initially, a determination is made as to whether the current output data set is allocated on this system, INQUIRY 390. If the current output file is not allocated to the system but it should be, then it is allocated as defined by the configuration data, STEP 392, and any old output data set is unallocated, STEP 394.

Once the current output file is allocated to the system, a determination is made as to whether the log block to be off-loaded will fit into the current file, INQUIRY 400. The block id of the block to be written minus the lowest block id for the current output data set provides the physical offset at which the log block is to be written. If this offset plus the length of the data to be written and any controls is less than the physical end of the data set, then the block will fit in the data set.

Figure 14A:
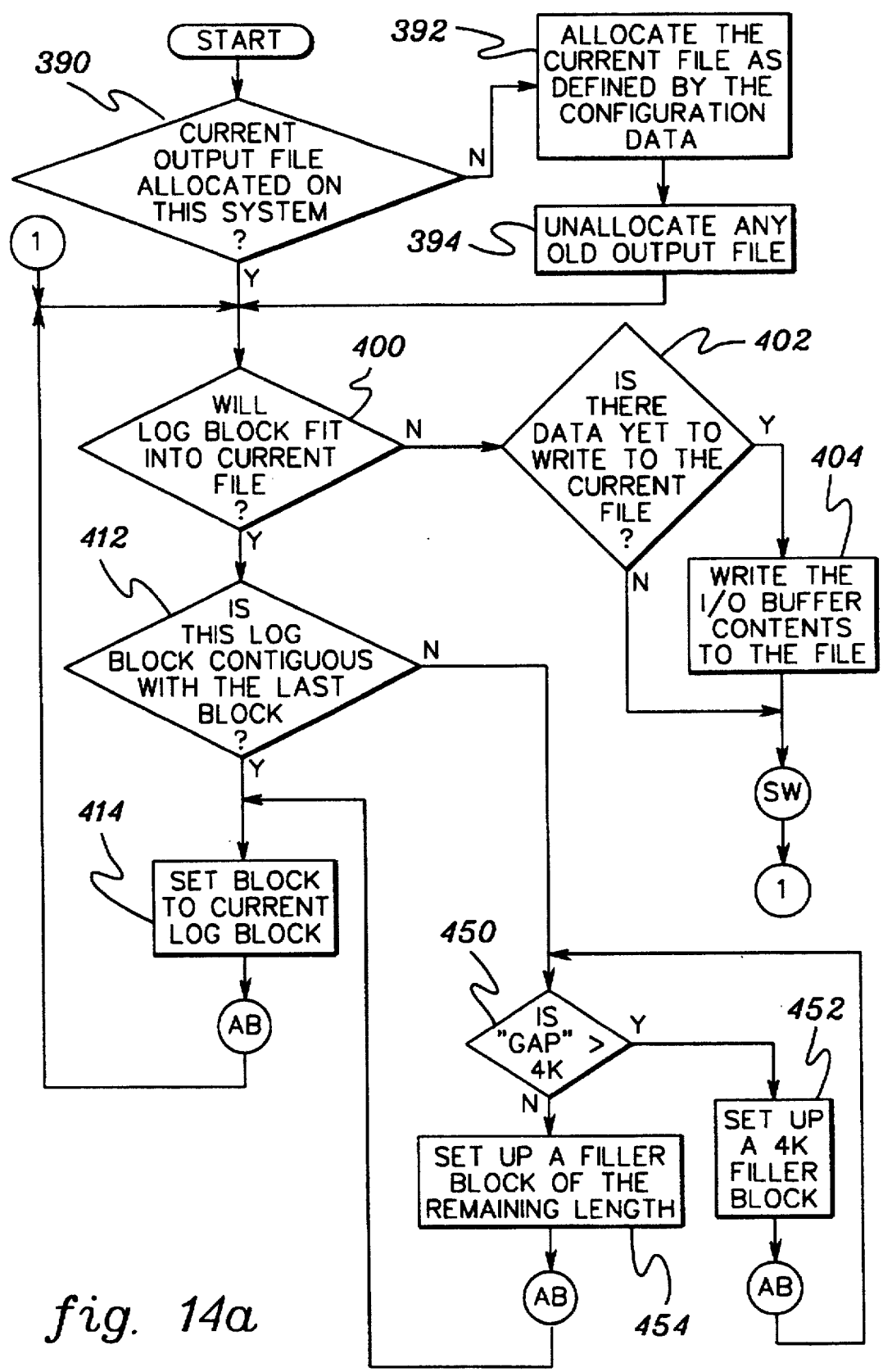
FIGS. 14a–14d depict one example of the logic associated with writing data entries to a dasd data set during the service request block processing of FIG. 13, in accordance with the principles of the present invention.
Figures 14B, 14C:
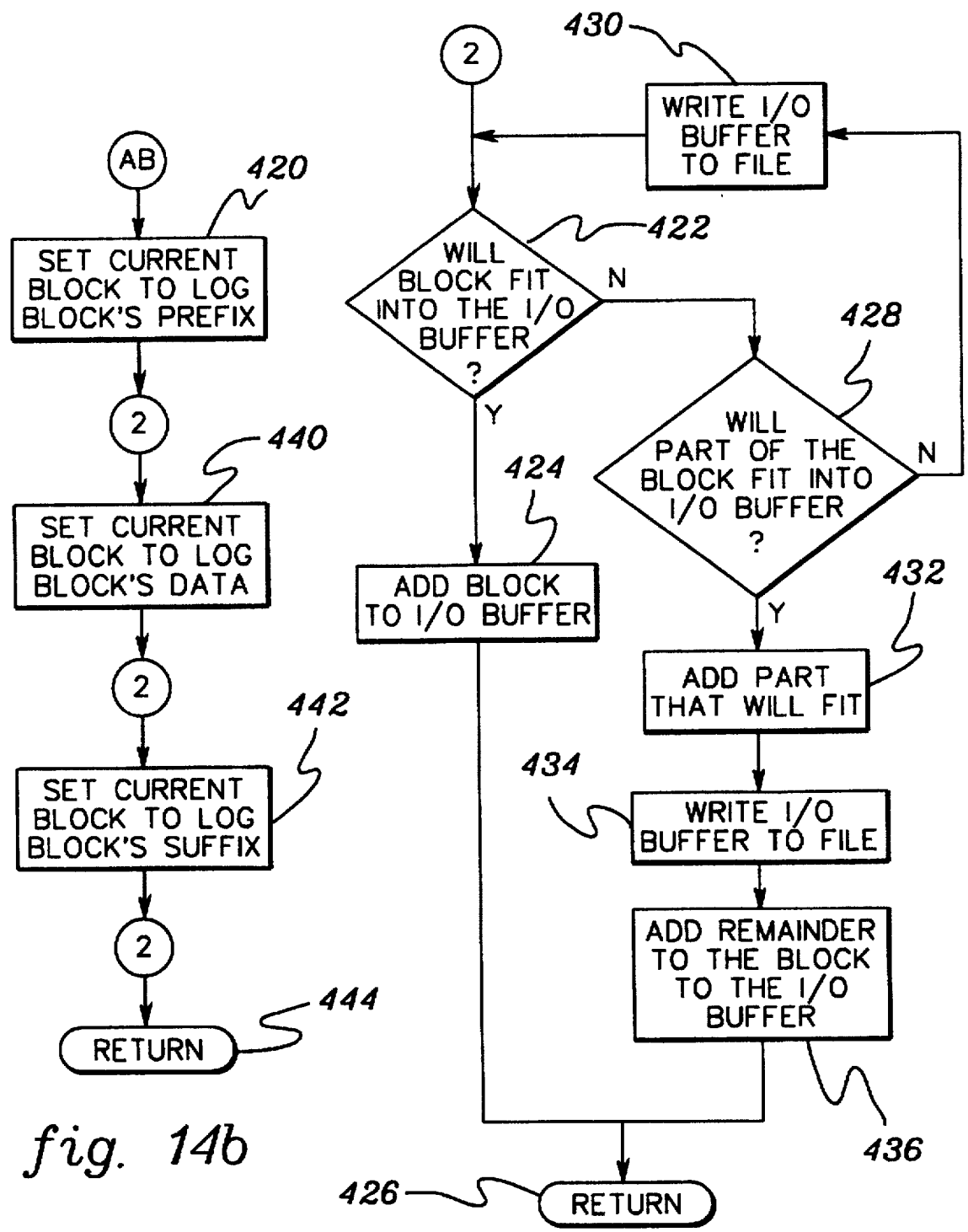
Figure 14D:
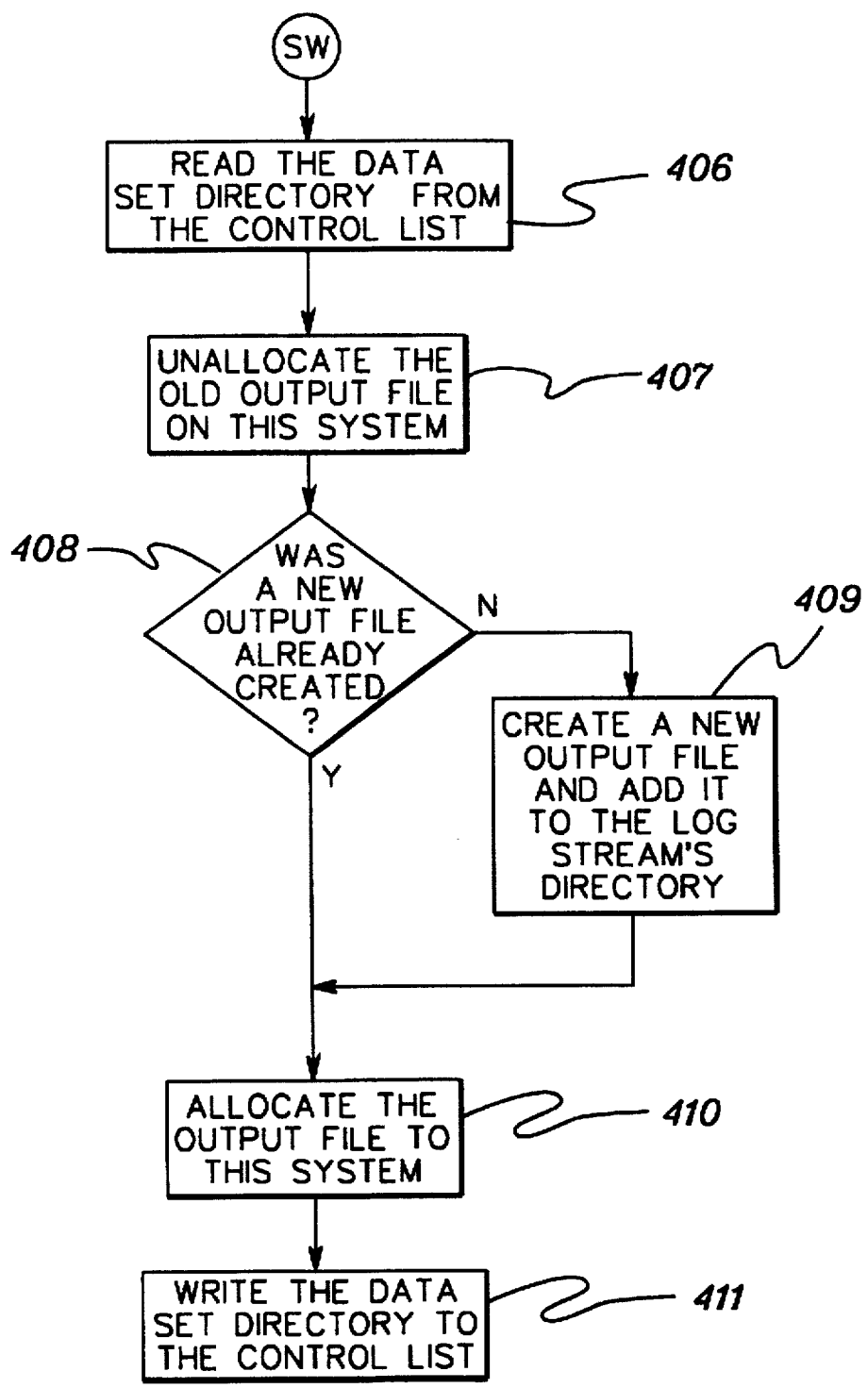

If the current log block will not fit into the current output file, and there are prior log blocks buffered in the I/O buffer to be written to the current output file, that data is written to the data file, INQUIRY 402, the data is written to the file, STEP 404. Subsequent to writing the data to the file or if there was no data in the I/O buffer, the data set directory is read from the control list header, STEP 406 (FIG. 14d).

Thereafter, the old output file is unallocated on this system, STEP 407 and an inquiry is made into whether a new output file was already created as determined from the data set directory entry read in STEP 406, INQUIRY 408. If a new output file was not created, then it is created and added to the log stream's directory, STEP 409. Subsequently, the created output file is allocated to the system, STEP 410 and the data set is added to the directory of the control list, STEP 411. After a new data set is created and allocated to the log stream and system, processing returns to INQUIRY 400 "WILL LOG BLOCK FIT INTO CURRENT FILE?"

If the log block will fit into the current file, then another determination is made as to whether the log block is contiguous with the last log block, INQUIRY 412. The log block id for the record to be processed is set to the current log block id obtained during write processing, STEP 414.

Next, as described with reference to FIGS. 14b and 14c, each block is written to an I/O buffer. Each block on dasd has three parts: a prefix (containing control information, part of which includes the GMT and local time generated during IXGWRITE processing), a data portion and a suffix. Each of the parts are written to the I/O buffer. Thus, initially, the current block is set to the log block's prefix, STEP 420, and a determination is made as to whether the block will fit into the I/O buffer, INQUIRY 422 (FIG. 14c). If the block is capable of being placed in the I/O buffer, then it is added, STEP 424, and the next part is obtained. However, if the block is too large to fit into the I/O buffer and, as a matter of fact, not even part of the block will fit into the buffer, INQUIRY 428, then the I/O buffer is written to the current output data set, and processing continues with INQUIRY 422 "WILL BLOCK FIT INTO THE I/O BUFFER?"

If the entire block will not fit into the I/O buffer, but part of the block will, then that part is added to the I/O buffer and the I/O buffer is written to the current output file, STEPS 432 and 434. After writing the I/O buffer to the file, the remainder of the block is added to I/O buffer, STEP 436.

Subsequent to adding the block to the I/O buffer, processing continues with STEP 440 "SET CURRENT BLOCK TO THE LOG BLOCKS DATA." Thereafter, the fitting process just described above is repeated, and when the data block has been added to the I/O buffer, the current block is set to the log block's suffix, STEP 442, and the process is repeated again.

After all of the blocks have been placed in the I/O buffer, processing continues with INQUIRY 400 (FIG. 14a) "WILL LOG BLOCK FIT INTO CURRENT FILE?"

Returning to INQUIRY 412 "IS THIS LOG BLOCK CONTIGUOUS WITH THE LAST LOG BLOCK?", if the log block is not contiguous with the last log block, a determination is made as to whether the gap between the log blocks is greater than 4k, INQUIRY 450 "IS GAP>4k?" If the gap is greater than 4k, then a 4k filler block is set up and processing continues, as described above with reference to STEP 420 "SET CURRENT BLOCK TO THE LOG BLOCK'S PREFIX."

If the gap is less than or equal to 4k, then a filler block of the remaining length is set up and once again processing continues with STEP 420 "SET CURRENT BLOCK TO LOG BLOCK'S PREFIX." Thereafter, processing continues with STEP 414 "SET BLOCK TO CURRENT LOG BLOCK."

The above described processing of off-loading data entries to a data set is meant to prevent the coupling facility from becoming full. In an environment in which there are multiple connectors to the same log stream on the same or different systems, it is important to represent the entries in sequence as they are written out to the data sets. When the coupling facility is written to, there is an asynchronous off-load of the information from the coupling facility to the data sets comprising the log streams. Off-loading is performed on any system but it needs to keep the records in the same order as written to the coupling facility.

In accordance with the principles of the present invention, a service is provided for reading data stored in a log stream. In one example, a service referred to as IXGBRWSE is used to read the data stored in the log stream. One embodiment of the syntax associated with IXGBRWSE is described in detail below. (In this example, certain of the parameters are listed as required, while others are listed as optional. This is only one example and it may be different for another embodiment.)

```
[xlabel] IXGBRWSE   ,STREAMTOKEN=xstreamtoken
                   ,REQUEST=START
                           ,OLDEST
                           ,YOUNGEST
                           ,STARTBLOCKID={xstartblockid}
                           ,SEARCH={search}
                                  ,GMT={YES|NO}
                           ,BROWSETOKEN=xbrowsetoken
                   ,REQUEST=READCURSOR
                           ,BROWSETOKEN=xbrowsetoken
                           ,BUFFER=xbuffer
                           ,BUFFLEN=xbufflen
                           ,BUFFKEY={xbuffkey|*}
                           ,BUFFALET={xbuffalet|0}
                           ,BLKSIZE={xblksize|0}
                           ,DIRECTION={OLDTOYOUNG|
                                  YOUNGTOOLD}
                           ,RETBLOCKID={xretblockid|
                                  NO_BLKID}
                           ,TIMESTAMP={xtimestamp|
                                  NO_TIMSETAMP}
                   ,REQUEST=READBLOCK
                           ,BROWSETOKEN=xbrowsetoken
                           ,BLOCKID=xblockid
                           ,SEARCH=xsearch
                                  ,GMT={YES/NO}
                           ,RETBLOCKID={xretblockid|
                                  NO_BLKID}
                           ,BUFFER=xbuffer
                           ,BUFFLEN=xbufflen
                           ,BUFFKEY={xbuffkey|*}
                           ,BUFFALET={xbuffalet|0}
                           ,BLKSIZE={xblksize|0}
                           ,TIMESTAMP={xtimestamp|
                                  NO_TIMESTAMP}
                   ,REQUEST_RESET
                           ,BROWSETOKEN=xbrowsetoken
                           ,POSITION={YOUNGEST|OLDEST}
                   ,REQUEST=END
                           ,BROWSETOKEN=xbrowsetoken
                   ,MODE=SYNC
                   ,MODE=SYNCECB
                           ,ECB=xecb
                   ,ANSAREA=xansarea
                   ,ANSLEN=xanslen
                   ,RETCODE=xretcode
                   ,RSNCODE=xrsncode
```

Where:

[xlabel] is an optional symbol, starting in column 1, that is the name on the IXGBRWSE macro invocation. DEFAULT: No name.

STREAMTOKEN(xstreamtoken) is the name (RS-type) (or address in register (2)–(12) ASM only) of a required 16 character input that specifies the log stream token that was returned by the IXGCONN service.

REQUEST({START|READCURSOR|READBLOCK|RESET|END}) is a required keyword input for the browse request.

REQUEST(START)—Start a browse session. REQUEST(START) must be specified before using the other options: READCURSOR, READBLOCK, RESET and END.

A log stream connection can have unlimited browse sessions active at any point in time.

The following is a set of mutually exclusive keys. This set is optional; only one key may be specified.

OLDEST reflects the positioning of the current cursor to the oldest log block in the log stream.

YOUNGEST reflects the positioning of the current cursor to the youngest log block in the log stream.

STARTBLOCKID({xstartblockid}) belongs to a set of mutually exclusive keys. It is the name (RS-type) (or address in register (2)–(12) ASM only) of an optional 8 character input that identifies the specific cursor position in the log stream.

SEARCH({xsearch}) belongs to a set of mutually exclusive keys. It is the name (RS-type) (or address in register (2)–(12) ASM only) of an optional 64 bit input that specifies the time criteria to find the specific cursor position in the log stream.

The search function will always start at the beginning of the log stream (i.e. oldest log block) and search for the first log block in the log stream with a search identifier greater than or equal to this keyword's value. The search criteria can be a GMT or local time in STCK format. If SEARCH is specified, then the GMT keyword must also be specified.

[GMT({YES|NO})] is a required keyword input that indicates the time criteria the user specified on SEARCH keyword is a GMT/local time.

YES—time criteria specified on SEARCH is a GMT time.

NO—time criteria specified on SEARCH is a local time.

End of a set of mutually exclusive optional keys. DEFAULT: OLDEST

BROWSETOKEN(xbrowsetoken) is the name (RS-type) (or address in register (2)–(12) ASM only) of a required 4 character input that specifies the output area in which a browse token that identifies the browse session just established is returned. The browse token is used to identify a given browse session on subsequent IXGBRWSE requests.

REQUEST(READCURSOR)—This request allows a user to browse consecutive log blocks in a log stream. The direction of the browse is user controlled and can be changed dynamically.

READCURSOR reads blocks by the following rules. If this is the first read cursor request after START/RESET, then it reads the log block at the current cursor position without updating the cursor. Otherwise, it updates the cursor position in the specified browse direction and then reads the block at that cursor position.

BROWSETOKEN(xbrowsetoken) is the name (RS-type) (or address in register (2)–(12) ASM only) of a required 4 character input that identifies the browse session. The browse token is described in greater detail below.

BUFFER(xbuffer) is the name (RS-type) (or address in register (2)–(12) ASM only) of a required character input that specifies the buffer into which the log blocks are to be read.

BUFFLEN(xbufflen) is the name (RS-type) (or address in register (2)–(12) ASM only) of a required fullword input that specifies the length of the buffer identified by the BUFFER keyword.

If the user specified buffer is not large enough to return the specified log block, a specific return/reason code will be returned and the cursor position will remain unchanged. The actual size of the requested log block will be returned in BLKSIZE, if specified. The user can obtain a large enough buffer and then redrive the request to read the log block.

BUFFKEY({xbuffkey|*}) is the name (RS-type) (or address in register (2)–(12) ASM only) of an optional fullword input that specifies the storage key for the buffer specified on the BUFFER keyword.

BUFFALET({xbuffalet|0}) is the name (RS-type) (or address in register (2)–(12) ASM only) of an optional fullword input that specifies the ALET to be used to access the buffer specified by the BUFFER keyword. If the buffer is ALET qualified, the ALET must index a valid entry on the task's dispatchable unit access list (DUAL). DEFAULT: 0, which means the buffer is in the caller's primary space.

BLKSIZE({xblksize|0}) is the name (RS-type) (or address in register (2)–(12) ASM only) of an optional fullword input that specifies the output area in which the actual size of the log block requested is returned. DEFAULT: 0, which means when you omit this keyword, the actual size of the requested log block will not be returned.

DIRECTION({OLDTOYOUNG|YOUNGTOOLD}) is a required keyword input in which direction the records in a log stream are to be browsed.
  OLDTOYOUNG—specifies the browse cursor will proceed in the direction from the oldest block in the log stream to the youngest block.
  YOUNGTOOLD—specifies the browse cursor will proceed in the direction from the youngest block in the log stream to the oldest block.

RETBLOCKID({xretblockid|NO_BLKID}) is the name (RS-type) (or address in register (2)–(12) ASM only) of an optional 8 character input that specifies the output area in which the log block identifier of the requested block just read is to be returned. DEFAULT: NO_BLKID, which means when you omit this keyword, the identifier of the returned log block will not be returned.

TIMESTAMP({xtimestamp|NO_TIMESTAMP}) is the name (RS-type) (or address in register (2)–(12) ASM only) of an optional 16 character input that specifies the output area in which both GMT and local time stamps associated with the log block just read is concatenated and returned. Both time stamps are in STCK format. DEFAULT: NO_TIMESTAMP, which means when you omit this keyword, the time stamps associated with the log block will not be returned.

REQUEST(READBLOCK) Reads a specific log block from the log stream. The target block is identified by either specifying a log block identifier or a date/time criteria.
  A successful read block will update the cursor position of the browse session to the block read.

BROWSETOKEN(xbrowsetoken) is the name (RS-type) (or address in register (2)–(12) ASM only) of a required 4 character input that identifies the browse session.

The following is a set of mutually exclusive keys. This set is required; only one key must be specified.
  BLOCKID(xblockid) belongs to a set of mutually exclusive keys. It is the name (RS-type) (or address in register (2)–(12) ASM only) of an 8 character input that specifies the block id of the log block to be read. The BLOCKID was received as output from IXGWRITE. This keyword is mutually exclusive with the SEARCH keyword.
  SEARCH(xsearch) belongs to a set of mutually exclusive keys. It is the name (RS-type) (or address in register (2)–(12) ASM only) of an 8 character input that specifies the date, and time of a log block to be read.

SEARCH specifies the GMT/local time criteria, in STCK format, used to read a particular log block.
  The search function will always start at the beginning of the log stream (i.e., oldest log block) and search for the first log block in the log stream with a search identifier greater than or equal to this keyword's value.

GMT({YES|NO}) is required keyword input that indicates the time criteria the user specified on SEARCH keyword is a GMT/local time.
  YES—indicates that the time stamp specified as search criteria is a GMT time.
  NO—time criteria specified on SEARCH is a local time.

End of a set of mutually exclusive required keys.

RETBLOCKID({xretblockid|NO_BLKID}) is the name (RS-type) (or address in register (2)–(12) ASM only) of an optional 8 character input that specifies the output area in which the log block identifier of the block that was read is returned. DEFAULT: NO_BLKID, which means when you omit this keyword, the identifier of the returned log block will not be returned.

BUFFER(xbuffer) is the name (RS-type) (or address in register (2)–(12) only) of a required character input that specifies the buffer into which the log blocks are to be read.

BUFFLEN(xbufflen) is the name (RS-type) (or address in register (2)–(12) ASM only) of a required fullword input that specifies the length of buffer identified by the BUFFER keyword.
  If the user specified buffer is not large enough to return the specified log block, a specific return/reason code will be returned and the cursor position will remain unchanged. The actual size of the requested log block will be returned in BLKSIZE, if specified. The user can obtain a large enough buffer and then redrive the request to read the log block.

BUFFKEY({xbuffkey|*}) is the name (RS-type) (or address in register (2)–(12) ASM only) of an optional fullword input that specifies the storage key for the buffer specified on the BUFFER keyword.

BUFFALET({xbuffalet|0}) is the name (RS-type) (or address in register (2)–(12) ASM only) of an optional fullword input that specifies the ALET to be used to access the buffer specified by the BUFFER keyword. If the buffer is ALET qualified, the ALET must index a valid entry on the task's dispatchable unit access list (DUAL). DEFAULT: 0, which means the buffer is in the caller's primary space.

BLKSIZE({xblksize|0}) is the name (RS-type) (or address in register (2)–(12) ASM only) of an optional fullword input that specifies the output area in which the actual size of the log block requested is returned. DEFAULT: 0, which means when you omit this keyword, the actual size of the requested log block will not be returned.

TIMESTAMP({xtimestamp|NO_TIMESTAMP}) is the name (RS-type) (or address in register (2)–(12) ASM only) of an optional 16 character input that specifies the output area in which both GMT and local time stamps associated with the log block just read is concatenated and returned. Both time stamps are in STCK format. DEFAULT: NO_TIMESTAMP, which means when you omit this keyword, the time stamps associated with the log block will not be returned.

REQUEST(RESET) Reposition the browse cursor to the youngest/oldest log block.

BROWSETOKEN(xbrowsetoken) is the name (RS-type) (or address in register (2)–(12) ASM only) of a required 4 character input that identifies the browse session.

POSITION({YOUNGEST|OLDEST}) is a required keyword input specifies the cursor position.

YOUNGEST—Position current cursor to the youngest log block in the log stream.

OLDEST—Position current cursor to the oldest log block in the log stream.

REQUEST(END) End the browse.

BROWSETOKEN(xbrowsetoken) is the name (RS-type) (or address in register (2)–(12) ASM only) of a required 4 character input that identifies the browse session.

MODE({SYNC|SYNCECB}) is an optional keyword input which indicates whether the END request should be performed synchronously or asynchronously. If MODE(SYNCECB) is specified, then the ECB keyword must also be specified. DEFAULT: SYNC MODE(SYNC) specifies that the request should be performed synchronously. Control is not returned to the caller until request processing is complete.

If necessary, the caller will be suspended until the request completes.

MODE(SYNCECB) specifies that the request should be attempted synchronously. If the request can not be completed synchronously, control is returned to the caller prior to completion of the request and the ECB specified by ECB is posted when the request has completed.

When MODE=SYNCECB is specified and the request does not complete synchronously, the system logger maintains latent binds to the storage location specified by ANSAREA.

ECB(xecb) is the name (RS-type) (or address in register (2)–(12) ASM only) of a required fullword input that specifies an ECB, which is the ECB that is to be posted when the request completes.

The ECB should be initialized by the requestor prior to using this service.

ANSAREA(xansarea) is the name (RS-type) (or address in register (2)–(12) ASM only) of a required 32 character input that specifies the answer area. The ANSAREA contains additional error status when the IXGBRWSE service generates an error return code.

ANSLEN(xanslen) is the name (RS-type) (or address in register (2)–(12) ASM only) of a required fullword input that specifies the answer area length.

RETCODE(xretcode) is the name (RS-type) of an optional fullword output variable (or register (2)–(12) ASM only) into which the return code is to be copied from GPR 15. RSNCODE(xrsncode) is the name (RS-type) of an optional fullword output variable (or register (2)–(12) ASM only) into which the reason code is to be copied from GPR 0.

One embodiment of the logic associated with the browse processing is described in detail below with reference with FIGS. 15a–15k. Initially, the caller invokes IXGBRWSE in order to initiate browse processing, STEP 470 "CALLER ISSUES IXGBRWSE." Thereafter, there is a space switch program call into the system logger address space for processing of the browse request, STEP 472.

Next, a determination is made as to whether the log stream token input on the browse macro is valid, INQUIRY 474 "STREAM TOKEN VALID?" If the log stream token is invalid, then an error return code is passed to the caller, STEP 476. However, if the log stream token is valid, then a question is asked as to whether this is a browse start request, INQUIRY 478 "BROWSE START REQUEST." In particular, if REQUEST=START was specified on the browse macro, then this is a request to start a browse session.

Figure 15A:
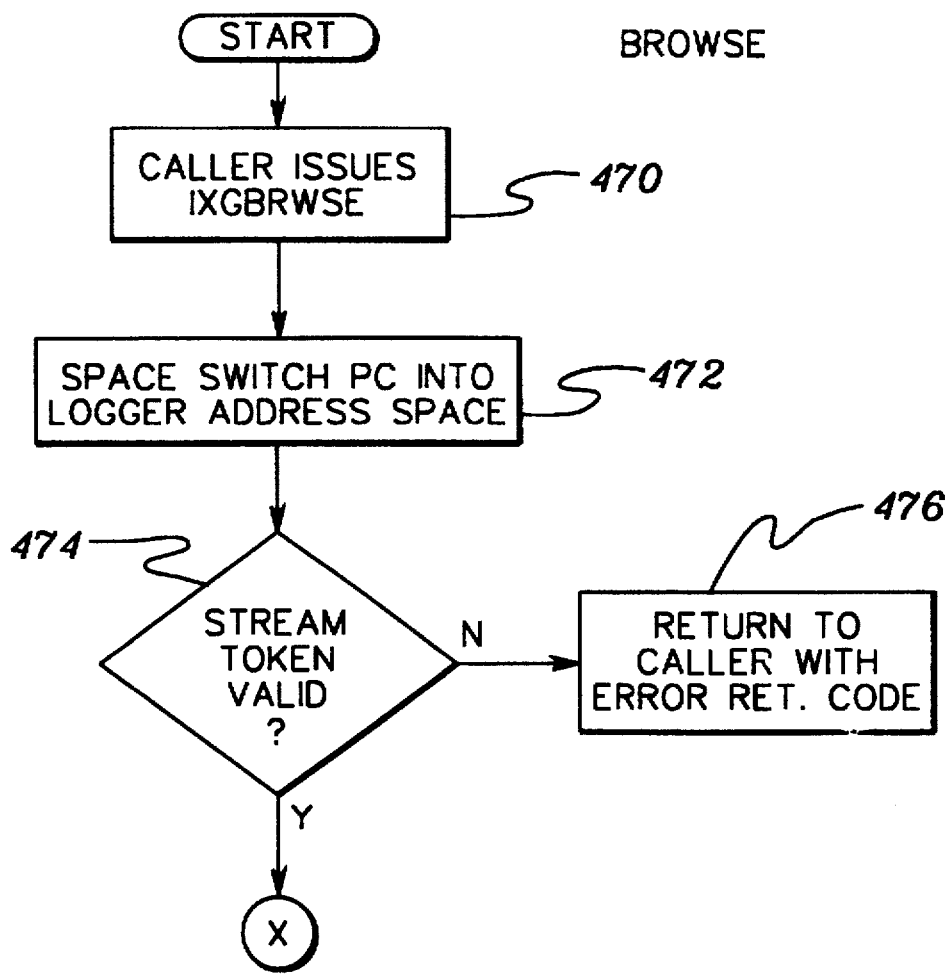
Figure 15B:
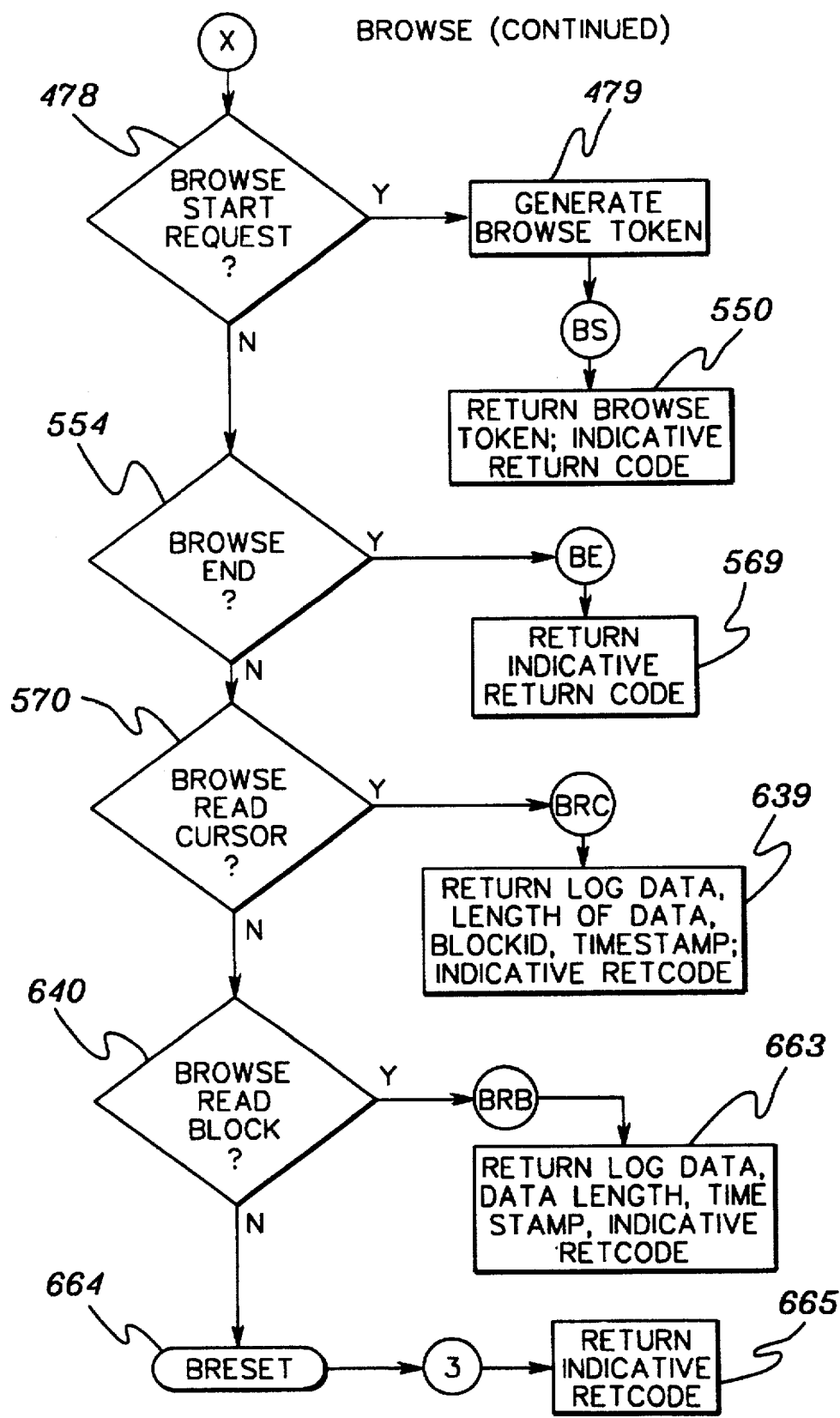
Figure 15C:
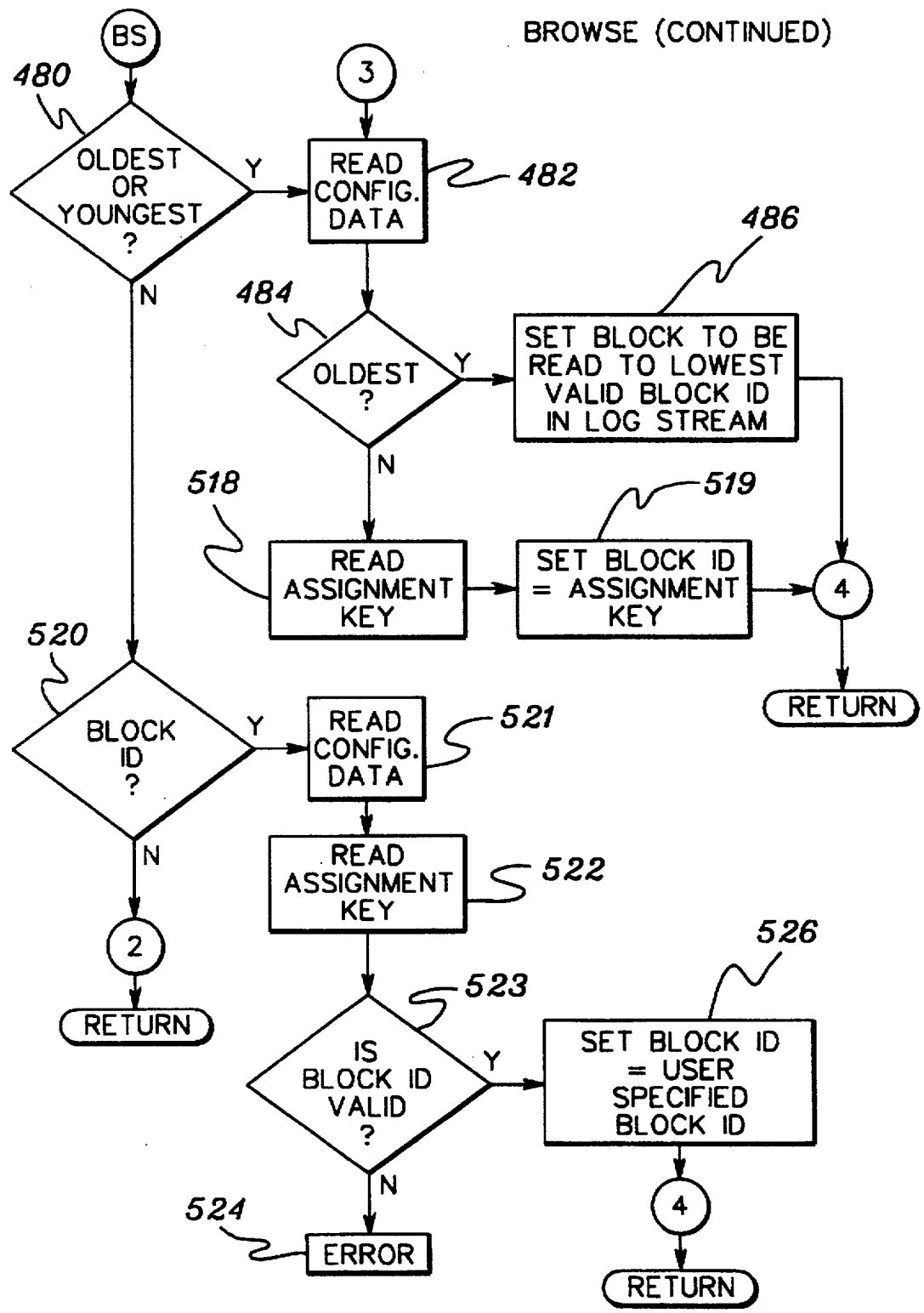
Figure 15D:
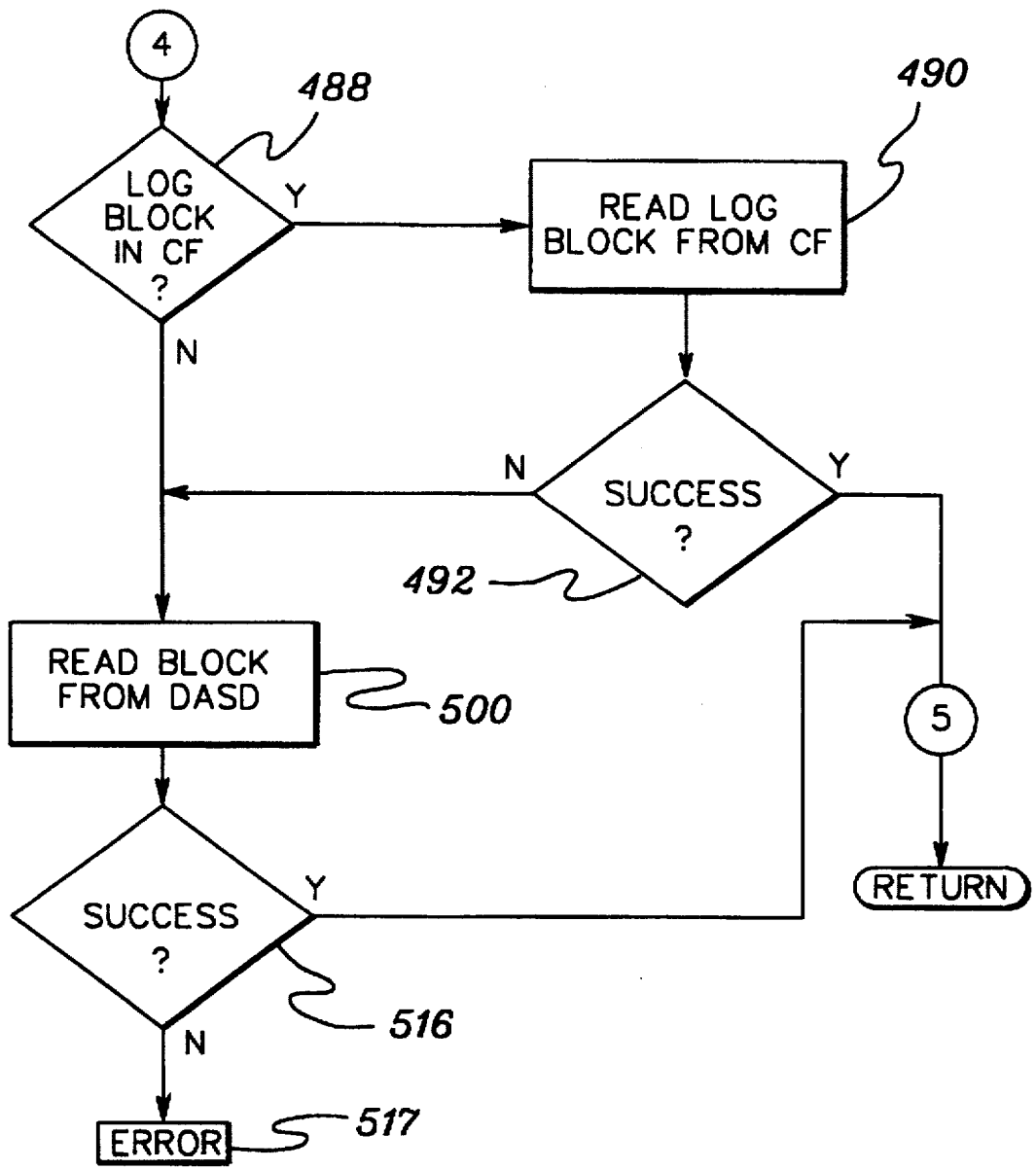
Figure 15E:
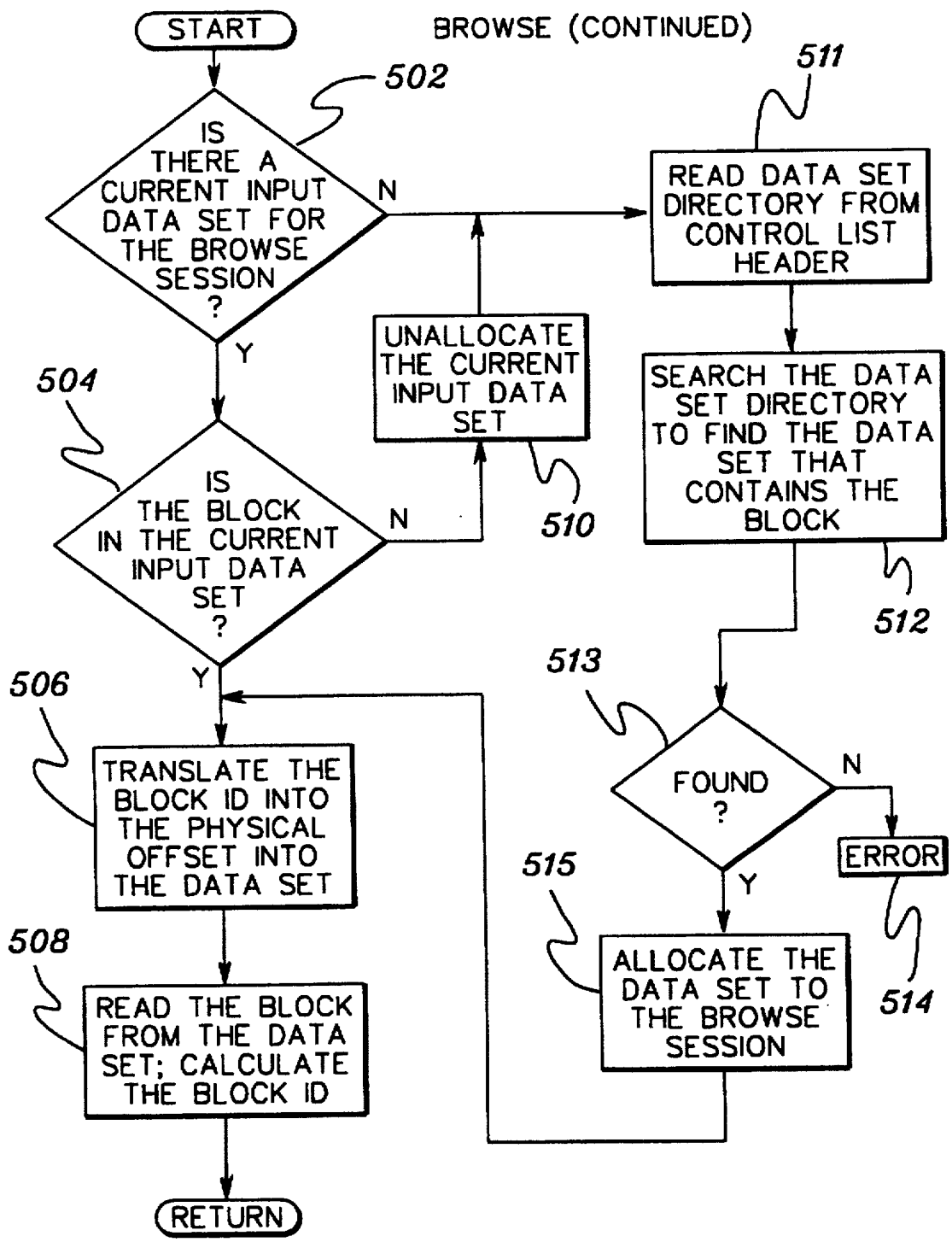
Figure 15I:
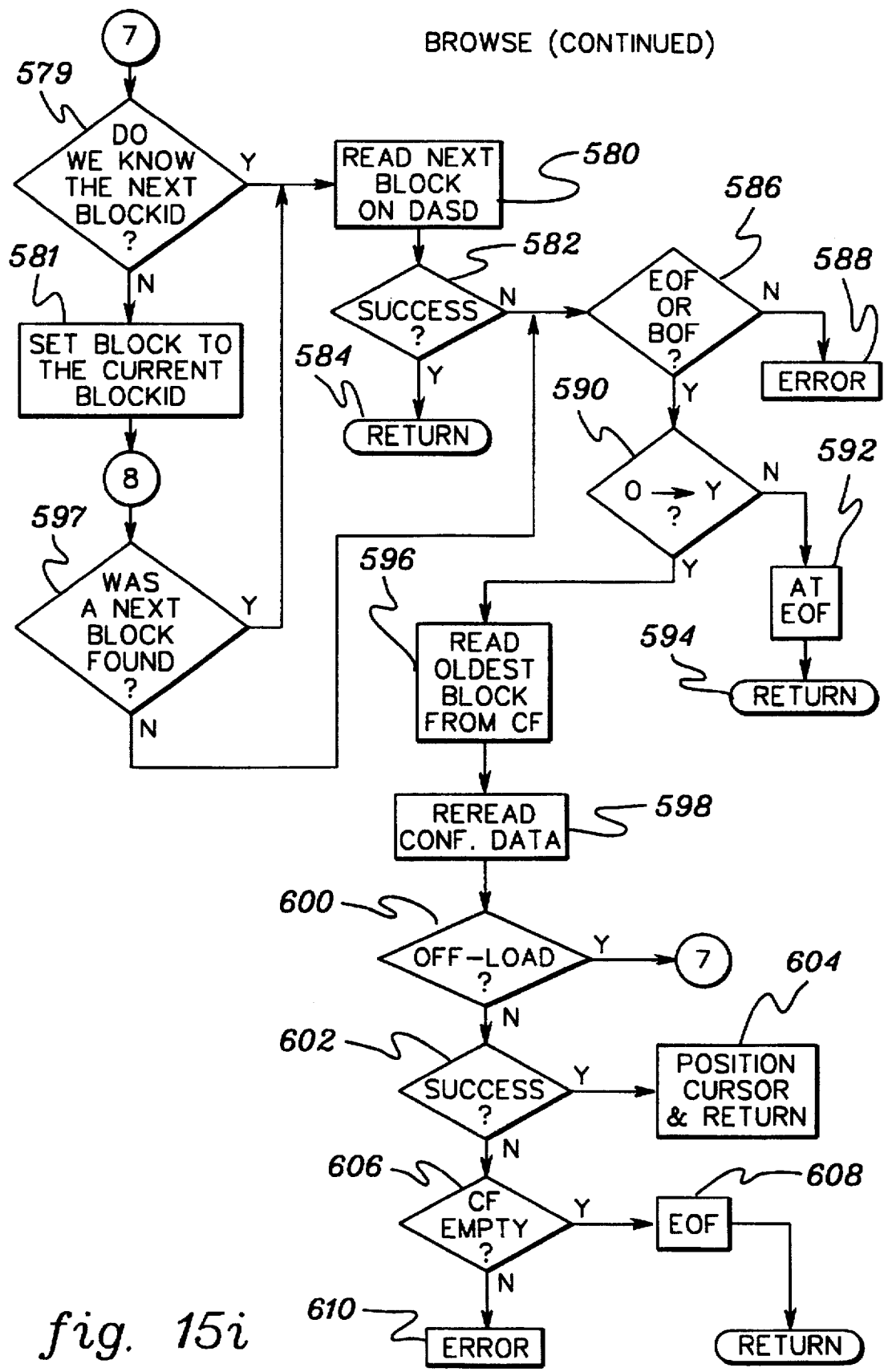
Figure 15J:
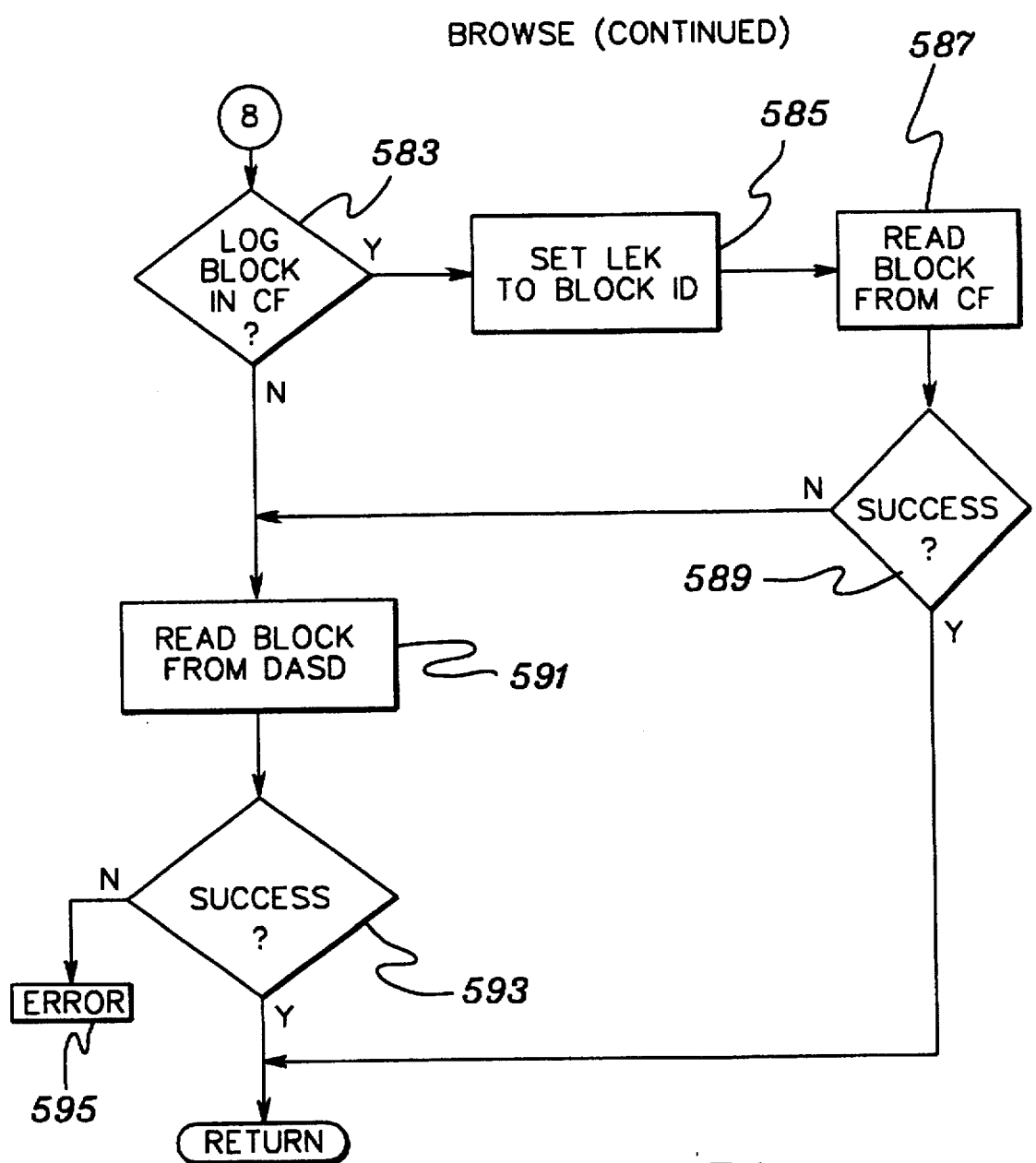

If a start was indicated, then the browse token is generated for use during subsequent browse processing, STEP 479 "GENERATE BROWSE TOKEN." In accordance with the principles of the present invention, a browse token is a pointer to a browse session, which has particular state information associated therewith. One example of the associated state information is depicted in FIG. 15l and described below.

The state information includes a number of flags, such as the last log block read from dasd, and a special case flag, described in detail herein, as well as a previous block id, a current block id, a next block id and an indication of the current browse data set.

Returning to FIG. 15b, after the browse token is generated, processing continues with INQUIRY 480 (FIG. 15c) "OLDEST OR YOUNGEST?" In particular, a determination is made as to whether the user specified on the start request that the cursor was to be positioned at the oldest or youngest log block in the log stream, INQUIRY 480. If the oldest or youngest was specified, then the configuration data entry of the control list header for the log stream to be browsed is read using, for instance, the read list entry command, to determine the lowest valid block id in the log stream and the highest block id written to dasd, STEP 482 "READ CONFIG. DATA."

After reading the configuration data, a determination is made as to whether REQUEST=START,OLDEST was specified when the browse service was invoked, INQUIRY 484 "OLDEST?" If the current cursor is to be positioned at the oldest log block in the log stream, then the identifier of the block to be read is set to the lowest valid block id retrieved from the configuration data, the direction to be read is specified as oldest to youngest and the assignment key request type is set to greater than or equal, STEP 486.

Next, a determination is made as to whether the log block identified by the block id just set is located in the coupling facility, INQUIRY 488 "LOG BLOCK IN CF?" In one example, this determination is made by comparing the block id just set to the highest block id written to dasd, which was previously read from the configuration data. If the block id is greater than the highest block id in dasd, then it is presumed at this time that the log block is located in the coupling facility. Thus, a read list command is issued to read the block from the coupling facility, STEP 490 "READ LOG BLOCK FROM CF." The read list command is passed the list-entry key, which is set equal to the block id determined above.

If the block was successfully read, INQUIRY 492, then the browse session state information is updated, STEP 494 (FIG. 15f) "UPDATE BROWSE SESSION STATE INFORMATION." Subsequent to updating the information, the browse start session is complete, STEP 496 "RETURN."

However, if the read from the coupling facility was unsuccessful and thus, an off-load occurred from the coupling facility to dasd, the log block is read from dasd, STEP 500 "READ BLOCK FROM DASD." One embodiment of the logic associated with reading a log block from dasd is described in detail with reference to FIG. 15e.

Initially, a determination is made as to whether there is a current input data set for this browse session, INQUIRY 502. In one example, this is determined by reading the browse session state information, and in particular, the entry within the state information referred to as the current browse data set. If there is a current data set, then the log block is looked for in the current data set. Specifically, a determination is made as to whether the block id is within the range of block ids on the data set, INQUIRY 504 "IS THE BLOCK IN THE CURRENT INPUT DATA SET?"

Should the log block be located in the current data set, then the block id is translated to the physical offset into the data set, STEP 506. The physical offset is equal to the relative block address for the block to be read minus the lowest relative block address located in the data set directory entry. Once obtaining the physical offset into the data set, the physical offset is used to read the block from dasd. Additionally, the block id of the next block in the direction of the read (i.e., oldest to youngest or youngest to oldest) is calculated, STEP 508.

Returning to INQUIRY 504 "IS THE BLOCK IN THE CURRENT INPUT DATA SET?", if the current data set does not contain the block id of the record to be read, then the data set is unallocated, STEP 510 "UNALLOCATE THE CURRENT INPUT DATA SET." Thereafter, the data set directory entry in the control list header is read to determine in which data set the block id is located, STEP 511 "READ DATA SET DIRECTORY FROM CONTROL LIST HEADER." Specifically, the highest rba in each data set is read from the directory element and used to determine which data set contains the block id. A comparison is made of the block id to be read and the highest rba, STEP 512 "SEARCH THE DATA SET DIRECTORY TO FIND THE DATA SET THAT CONTAINS THE BLOCK." If the block id is less than or equal to the highest relative block address (rba) of a particular data set, then it is expected that the block id to be read is located in that data set.

Should the end of the directory be reached prior to satisfying the comparison of the block id to the highest rba in the data set, then the block id is invalid and an error is returned, STEP 514 "ERROR." However, if the comparison is successful, then the data set is allocated to the browse session such that the log record corresponding to that block id can be read from dasd, STEP 515 "ALLOCATE THE DATA SET TO THE BROWSE SESSION." Subsequently, flow passes to STEP 506 "TRANSLATE THE BLOCK ID INTO THE PHYSICAL OFFSET INTO THE DATA SET."

Returning to INQUIRY 502 "IS THERE A CURRENT INPUT DATA SET FOR THE BROWSE SESSION?", if no data set is currently allocated to the browse session, then processing continues with STEP 511 "READ DATA SET DIRECTORY FROM CONTROL LIST HEADER," as described in detail above.

Returning to FIG. 15d and in particular, STEP 500 "READ BLOCK FROM DASD," after the block is read from dasd, a determination is made as to whether that read was successful, INQUIRY 516. Should the read be unsuccessful, then an error is returned, STEP 517. However, if the log record corresponding to the block id is successfully read, then the browse session state information is updated to reflect the successful read, STEP 494 "UPDATE BROWSE SESSION STATE INFORMATION," and browse processing is complete, STEP 496 "RETURN."

Returning to INQUIRY 484 "OLDEST?", if the browse start request indicated that the cursor was to be positioned at the youngest log block in the log stream, then the assignment key is read from list controls via, for instance, a read list controls command, STEP 518, and the block id to be read is set to the assignment key just retrieved, STEP 519. Additionally, the browse direction is set to youngest to oldest and the assignment key request type is set to less than or equal. Subsequent to obtaining the block id of the log block to be read, processing continues with INQUIRY 488 (FIG. 15d) "LOG BLOCK IN CF?", as described in detail above.

Returning to INQUIRY 480, if the user on the browse request did not specify the OLDEST or YOUNGEST keyword, then a determination is made as to whether the user specified a particular block id, INQUIRY 520 "BLOCK ID?" If a block id is specified, then the configuration data is read in a manner described above to obtain the lowest valid block id in the log stream, STEP 521. Further, the assignment key is read from list controls using the read list controls command to obtain the id of the next available block in the log stream, STEP 522. These two values, the lowest valid block id and the assignment key, provides a range of valid block ids.

If the block id provided by the user is not within the range of valid block ids, INQUIRY 523 "IS BLOCK ID VALID?", then an error code is returned, STEP 524 "ERROR." However, if the block id is within the range of block ids and is thus valid, the block id is set equal to the user specified block id, STEP 526, and browse processing continues with INQUIRY 488 "LOG BLOCK IN CF?", as described above.

Returning to INQUIRY 520 "BLOCK ID?", if the user did not specify a block id, then the only remaining possibility is positioning the cursor by time. The timestamp to be searched is specified by the user in the SEARCH keyword on the browse start request. Initially, the configuration data is read in order to obtain the highest GMT time or highest local time of log blocks written to dasd depending on the request specified by the user, as well as the highest block id written to dasd, STEP 530 "READ CONFIGURATION DATA."

Next, an inquiry is made into whether the log block is in the coupling facility, INQUIRY 532 "IS LOG BLOCK IN CF?" In one example, this determination is made by comparing the timestamp input by the user to the timestamp retrieved from the configuration data. If the supplied timestamp is greater than the highest timestamp in dasd, then it is presumed at this time that the log block is located in the coupling facility. Thus, the log stream data list is scanned from oldest to youngest looking for a timestamp which matches the timestamp provided by the user or a timestamp which is greater than the one provided by the user indicating that the read should stop. In one example, the entry is located by an unkeyed position and thus, a read list command by unkeyed position is used to scan the list header, STEP 534 "SCAN LIST HEADER FROM OLDEST TO YOUNGEST." One example of a technique for locating and reading an entry is described in detail in "Apparatus And Method For List Management In A Coupled Data Processing System," by J. A. Frey et al., Ser. No. 07/860,633, Filed: Mar. 30, 1992, now U.S. Pat. No. 5,410,695, which is hereby incorporated herein by reference in its entirety.

Subsequent to scanning the list, the configuration data is reread in order to obtain the highest block written to dasd to be used in determining whether an off-load has occurred, STEP 536. If the highest block written to dasd is greater than the highest block written to dasd obtained during STEP 530, then an off-load has occurred, INQUIRY 538. If an off-load has occurred, then processing is returned to STEP 530 "READ CONFIGURATION DATA."

However, if an off-load has not occurred, then a determination is made as to whether the log block was found during scanning of the list, INQUIRY 540. If the log block was not found, then an error is returned, STEP 542. However, if the log block was found, then the browse session state information is updated, as described above, and processing of the browse request is complete, STEPS 494, 496.

Returning to INQUIRY 532 "IS LOG BLOCK IN CF?", if the log block is not in the coupling facility, then the data sets are searched for the log block. In particular, the data set corresponding to the timestamp is determined by, for instance, reading the data set directory for the data set that contains the timestamp, STEP 544 "DETERMINE CORRESPONDING DATA SET." Specifically, for each data set in the directory, the highest GMT or highest local time contained in that data set is found in order to determine if the timestamp provided by the user is located on that data set. The directory element is read by a read list entry command, for example. Once the proper data set is located, it is allocated, if necessary, and it is searched for the log block with a timestamp greater than or equal to the user specified timestamp, STEP 546 "SEARCH DATA SET."

After the search is complete, a determination is made as to whether the log block was found in the data set, INQUIRY 540, and processing continues in the manner described above.

At each stage of termination of the start request processing, the browse token is returned along with an indicative return code, STEP 550 (FIG. 15*b*) "RETURN BROWSE TOKEN; INDICATIVE RETURN CODE."

If a browse start was not requested, then a check is made to see if a browse end was requested, INQUIRY 554. Should REQUEST=END be specified on the browse processing invocation, then an end of the browse session is to take place. In order to end the browse session, any open data sets are closed, any allocated data sets are unallocated and the control block structures are cleaned up, STEPS 556, 558 and 560 (FIG. 15*g*). Specifically, the browse session state information is cleared and the browse token is invalidated. Additionally, an indicative return code is returned, STEP 569 (FIG. 15*b*).

Returning to FIG. 15*b*, next a determination is made as to whether a browse read cursor was requested, INQUIRY 570 "BROWSE READ CURSOR?" If REQUEST= READCURSOR was specified on the input parameters of the browse request, then the user is allowed to browse consecutive log blocks in the log stream in a direction specified by the user.

Initially, the configuration data is read in order to retrieve the highest block id written to dasd, STEP 572 (FIG. 15*h*). Next, a determination is made as to whether this is the first read cursor after a browse start or reset, INQUIRY 574. In one example, this is determined by a flag referred to as special case located in the browse session state information. If special case indicates that this is the first read cursor after a browse start or reset, then the block id is set to the current cursor position, STEP 576, and processing continues with INQUIRY 488 "LOG BLOCK IN CF?", as described in detail above.

If, however, special case indicates that this is not the first read cursor after the browse start or reset, then a question is asked as to whether the previous log block was read from dasd, INQUIRY 578. In one example, this is determined by a flag, last log block read from dasd, stored in the browse session state information. If the previous block was read from dasd, then an inquiry is made as to whether the next block id is known, INQUIRY 579 (FIG. 15*i*). This information is read from the browse session state information. If the next block id is not equal to zero, then the block id is known, and the next block is read from dasd using the technique described in detail above with reference to FIG. 15*e*.

If the dasd read was successful, INQUIRY 582, then processing of the browse read cursor is complete, STEP 584 "RETURN." However, if the read was unsuccessful, then a determination is made as to whether an end of file (EOF) or beginning of file (BOF) depending on the direction of the read has been reached, INQUIRY 586 "EOF OR BOF?". In other words, if the highest block id or lowest block id written to the dasd has been processed, then the EOF or BOF has been reached, respectively.

If neither the end or beginning of file has been reached, then an error has occurred, STEP 588 "ERROR." However, if the end or beginning of file has been reached and the direction is youngest to oldest, INQUIRY 590, then it is the beginning of the log stream, STEP 592, and processing of the browse request is complete.

On the other hand, when the end or beginning of file has been reached and the direction is oldest to youngest indicating that all of the log blocks in dasd have been read, the oldest block from the coupling facility is read using a read list entry command, STEP 596 "READ OLDEST BLOCK FROM CF."

Subsequently, the configuration data is reread to obtain the highest block id written to dasd, STEP 598. The highest block id written to dasd retrieved in STEP 598 is compared to the highest block id written to dasd read in STEP 572, and if the highest block id written to dasd retrieved in STEP 598 is greater than the highest block id written to dasd previously obtained, an off-load has occurred, INQUIRY 600 "OFF-LOAD?" If an off-load occurred, flow returns to STEP 579 "DO WE KNOW THE NEXT BLOCK ID?"

If an off-load did not occur, then a determination is made as to whether the block identified by the block id was successfully read, INQUIRY 602 "SUCCESS?" Should the read be successful, the cursor is positioned at the next block id to be read and processing is complete, STEP 604 "POSITION CURSOR AND RETURN." If, however, the read was unsuccessful, and the coupling facility is not empty, INQUIRY 606 "CF EMPTY?", then an error has occurred, STEP 610 "ERROR." Further, if the read was unsuccessful but the coupling facility was empty, then all of the log blocks of the log stream have been read and the end of file has been reached, STEP 608 "EOF."

Returning to INQUIRY 579 "DO WE KNOW THE NEXT BLOCK ID?", if the response is in the negative, then the block id is set equal to the current block id, which is obtained from the browse session state information, STEP 581. Subsequent to obtaining the block id, a determination is made as to whether the log block identified by the block id just set is located in the coupling facility, INQUIRY 583 (FIG. 15*j*) "LOG BLOCK IN CF?" In one example, this determination is made by comparing the block id just set to the highest block id written to dasd, which was previously read from the configuration data. If the block id is greater than the highest block id in dasd, then it is presumed at this time that the log block is located in the coupling facility. Thus, the list-entry key operand (LEK) is set to the block id, STEP 585 and a read list command is issued to read the block from the coupling facility, STEP 587 "READ LOG BLOCK FROM CF." The read list command is passed the list-entry key.

If the block was successfully read, INQUIRY 589, then processing returns to STEP 597 (FIG. 15*i*), "WAS A NEXT BLOCK FOUND?", as described in detail below. However, if the read from the coupling facility was unsuccessful and thus, an off-load occurred from the coupling facility to dasd, the log block is read from dasd, STEP 591 "READ BLOCK FROM DASD." One embodiment of the logic associated with reading a log block from dasd is described in detail above with reference to FIG. 15e.

If the log block was not successfully read from dasd, then an error occurred, STEP 595. However, if the read was successful, then processing returns to FIG. 15i and in particular, STEP 597 "WAS A NEXT BLOCK FOUND?" If the next block was found, then the next block is read from dasd, STEP 580, as described in detail above. If the next block was not found, then processing continues to INQUIRY 586 "EOF OR BOF?", as described in detail above.

Returning to FIG. 15h, and specifically, INQUIRY 578, if the previous log block was not read from dasd, then a further determination is made as to whether the previous read cursor read the youngest/oldest in the coupling facility, INQUIRY 612. If the previous read cursor did not read the youngest/oldest, and the next block id retrieved from the browse session state information (i.e., previous block id or next block id, depending on direction) is known, INQUIRY 614, the block id is set to the next or previous block id, STEP 622.

However, if the key of the next block id is not known, the block id is set equal to the current cursor position retrieved from the browse session state information, STEP 616. Subsequently, processing continues with INQUIRY 583 (FIG. 15j) "LOG BLOCK IN CF?", as described above. After returning from that routine, if the read was unsuccessful, processing of the browse request is terminated, STEP 620 "RETURN." However, should the read be successful, then the block id is set to the next or previous block id, as described above, STEP 622. Once the block id is set, processing continues with INQUIRY 488 "LOG BLOCK IN CF?" (FIG. 15d).

Returning to INQUIRY 612 "DID PREVIOUS READ CURSOR READ Y/O IN CF?", if the previous read cursor did read the youngest/oldest log record in the coupling facility, a determination is made as to whether the direction was old to young, INQUIRY 624. In one example, the direction is specified by the user in the DIRECTION keyword of the browse macro. If the direction was old to young, and the current cursor is on dasd, INQUIRY 626, processing continues with INQUIRY 579 (FIG. 15i) "DO WE KNOW THE NEXT BLOCK ID?" However, if the direction is old to young and the current cursor is not on dasd, processing continues with INQUIRY 614 "DO WE KNOW THE KEY OF NEXT BLOCK ID?"

On the other hand, if the direction is not old to young, INQUIRY 624, and the current cursor is on dasd, INQUIRY 628, processing passes to INQUIRY 579 "DO WE KNOW THE NEXT BLOCK ID?" However, if the current cursor is not on dasd, the block id is set to the highest block id written to dasd obtained from the configuration data set, STEP 630, and processing continues with INQUIRY 488 "LOG BLOCK IN CF?"

Returning to FIG. 15b, after processing of the browse read cursor request, the log data read from the log stream, the length of the log data read, the block id, a timestamp and an indicative return code are returned to the caller, STEP 639.

Figure 15K:
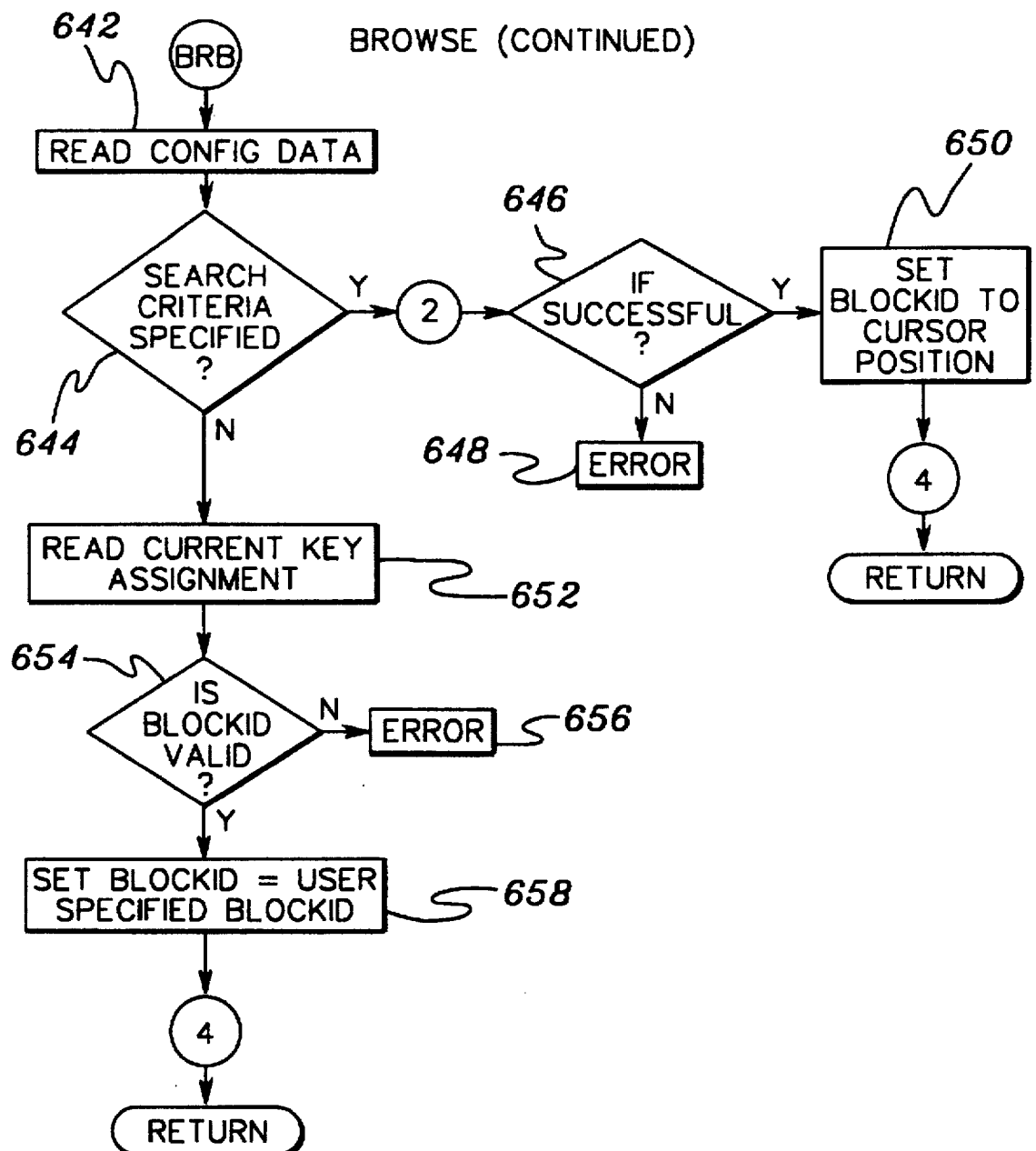
Figure 15L:
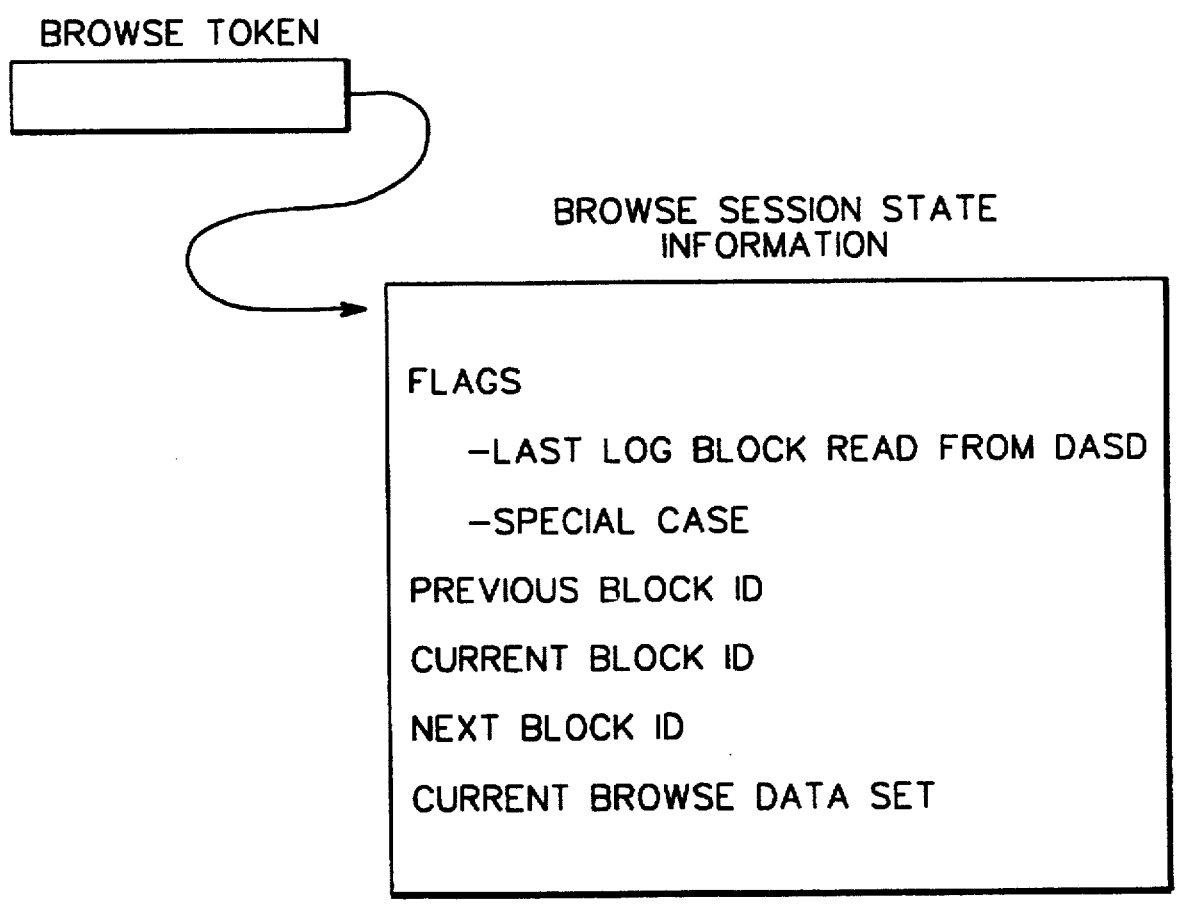
FIG. 15l depicts one embodiment of a browse token and its associated session state information, in accordance with the principles of the present invention.

If a start, end, nor read cursor was requested, then a determination is made as to whether a read block was requested, INQUIRY 640 "BROWSE READ BLOCK?" If the caller specified REQUEST=READBLOCK, thereby requesting that a specific log block be read from the log stream, the configuration data is read to retrieve the highest block id written to dasd, the lowest valid block id in the log stream, the highest GMT time of a block off-loaded to dasd and the highest local time of a block off-loaded to dasd, STEP 642 (FIG. 15k).

Subsequently, a determination is made as to whether search criteria was specified as input to the browse invocation, INQUIRY 644 "SEARCH CRITERIA SPECIFIED?" If search criteria was specified, then processing continues with using the timestamps to position the cursor. In particular, flow passes to STEP 530 "READ CONFIGURATION DATA" (FIG. 15f). After obtaining the log block and updating the browse session state information, as described above, a determination is made as to whether the read was successful, INQUIRY 646 (FIG. 15k). If the read was unsuccessful, an error code is returned. However, if the read was successful, then the block id is set equal to the current cursor position, and flow passes to INQUIRY 488 "LOG BLOCK IN CF?"

Returning to INQUIRY 644 "SEARCH CRITERIA SPECIFIED?" on FIG. 15k, if search criteria was not specified, then the user specified log block is located. The configuration data is read to obtain the lowest valid block id in the log stream. Further, the assignment key is read from list controls using the read list controls command to obtain the id of the next available block in the log stream, STEP 652. These two values, the lowest valid block id and the assignment key, provides a range of valid block ids. If the block id provided by the user is not within the range of valid block ids, INQUIRY 654 "IS BLOCK ID VALID?", then an error code is returned, STEP 656 "ERROR." However, if the block id is within the range of block ids and is thus valid, the block id is set equal to the user specified block id, STEP 658, and processing once again continues with INQUIRY 488 "LOG BLOCK IN CF?"

Returning to FIG. 15b, after processing the browse read block, the log data, data length, timestamp and indicative return code are returned to the caller, STEP 663.

If a browse start, end, read cursor, or read block was not requested, then the request was a browse reset, which is specified on the browse invocation as REQUEST=RESET. The browse reset repositions the browse cursor to the youngest/oldest log block in the log stream. In order to process the browse reset, processing is passed to STEP 482 "READ CONFIG. DATA." Subsequent to processing the browse reset, an indicative return code is passed to the caller, STEP 665 (FIG. 15b).

In accordance with the principles of the present invention, it is possible to delete one or more log records from a log stream, after a connection is made to the log stream. In one example, in order to delete log blocks from a log stream, a service referred to as IXGDELET is invoked. One embodiment of the syntax of the IXGDELET macro is described below. (In this example, certain of the parameters are listed as required, while others are listed as optional. This is only one example and it may be different for another embodiment.):

| [xlabel] | IXGDELET | ,STREAMTOKEN=xstreamtoken |
| | | ,BLOCKS=ALL |
| | | ,BLOCKS=RANGE |
| | | ,BLOCKID=xblockid |
| | | ,MODE=SYNC |
| | | ,MODE=SYNCECB |
| | | ,ECB=xecb |
| | | ,ANSAREA=xansarea |
| | | ,ANSLEN=xanslen |
| | | ,RETCODE=xretcode |
| | | ,rsncode=xrsncode |

Where:

[xlabel] is an optional symbol, starting in column 1, that is the name of the IXGDELET macro invocation. DEFAULT: No name.

STREAMTOKEN(xstreamtoken) is the name (RS-type) (or address in register (2)–(12) ASM only) of a required 16 character input that specifies the log stream token that was returned by the IXGCONN service.

BLOCKS({ALL|RANGE}) is a required keyword input which indicates whether a subset or all log blocks are to be deleted.

BLOCKS(ALL) specifies that, for the log stream identified by STREAMTOKEN, all the log blocks are to be deleted.

BLOCKS(RANGE) specifies that a range of log blocks are to be deleted. When BLOCKS(RANGE) is specified, the BLOCKID keyword must also be specified. All log blocks prior to the log block identified by BLOCKID are deleted.

BLOCKID(xblockid) is the name (RS-type) (or address in register (2)–(12) ASM only) of a required 8 character input of the log block identifier of the log block prior to which all log blocks in the log stream will be deleted.

MODE({SYNC|SYNCECB}) is an optional keyword input which indicates whether the DELETE request should be performed synchronously or asynchronously. If MODE(SYNCECB) is specified, then the ECB keyword must also be specified. DEFAULT: SYNC MODE(SYNC) specifies that the request should be performed synchronously. Control is not returned to the caller until request processing is complete.

If necessary, the caller will be suspended until the request completes.

MODE(SYNCECB) specifies that the request should be attempted synchronously. If the request can not be completed synchronously, control is returned to the caller prior to completion of the request and the ECB specified by ECB is posted when the request has completed.

When MODE=SYNCECB is specified and the request does not complete synchronously, the system logger maintains latent binds to the storage location specified by ANSAREA.

ECB(xecb) is the name (RS-type) (or address in register (2)–(12) ASM only) of a required fullword input that specifies an ECB, which is the ECB that is to be posted when the request completes.

The ECB should be initialized by the requestor prior to using this service.

ANSAREA(xansarea) is the name (RS-type) (or address in register (2)–(12) ASM only) of a required 160 character input that specifies the answer area. The ANSAREA contains additional error status when the IXGDELET service generates an error return code.

ANSLEN(xanslen) is the name (RS-type) (or address in register (2)–(12) ASM only) of a required fullword input that specifies the answer area length.

RETCODE(xretcode) is the name (RS-type) (or register (2)–(12) ASM only) of an optional fullword output variable into which the return code is to be copied from GPR 15.

RSNCODE(xrsncode) is the name (RS-type) (or register (2)–(12) ASM only) of an optional fullword output variable into which the reason code is to be copied from GPR 0.

One embodiment of the logic associated with IXGDELET is described in detail below with reference to FIG. 16. It should be noted that the delete processing associated with IXGDELET is a logical delete. Physical deletion takes place during the off-load processing described in detail above.

Figure 16:
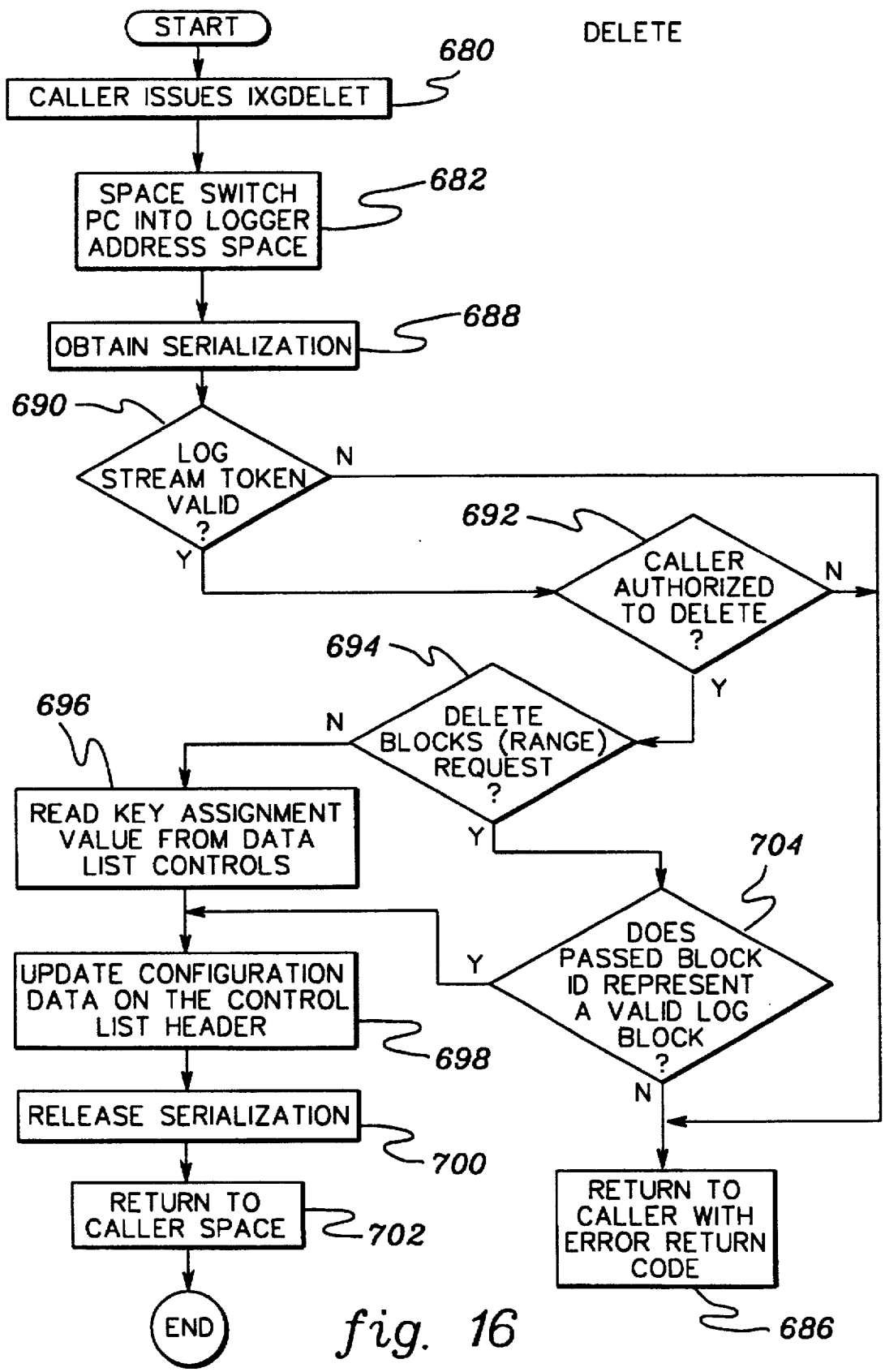
FIG. 16 illustrates one embodiment of the logic associated with deleting a log block from a log stream, in accordance with the principles of the present invention.

Referring to FIG. 16, initially, the caller issues the IXGDELET service from the caller's address space, STEP 680 "CALLER ISSUES IXGDELET." Thereafter, there is a space switch program call to the system logger address space in order to proceed with the delete processing, STEP 682 "SPACE SWITCH PC INTO LOGGER ADDRESS SPACE."

In the system logger address space, local serialization of the log stream is obtained, STEP 688 "OBTAIN SERIALIZATION," and a determination is made as to whether the log stream token received on successful completion of the connect service is valid, INQUIRY 690 "LOG STREAM TOKEN VALID?" If the log stream token is invalid, then an error return code is passed to the caller, STEP 686 "RETURN TO CALLER WITH ERROR RETURN CODE," and delete processing is terminated. However, if the log stream token is valid ensuring a proper connect to the log stream, an inquiry is made into whether the caller is authorized to delete log blocks from the log stream, INQUIRY 692 "IS CALLER AUTHORIZED TO DELETE?" In particular, the AUTH parameter of IXGCONN is used to determine whether this particular caller is authorized to delete log blocks from the log stream. If the caller is not authorized, then once again, an error return code is passed to the caller, STEP 686. If, however, the caller is authorized, delete processing continues, as described below.

In accordance with the principles of the present invention, it is possible to delete all of the blocks of a log stream or a specified range of blocks. Therefore, if BLOCKS(RANGE) is not specified on the IXGDELET macro, INQUIRY 694 "DELETE BLOCKS(RANGE) REQUEST?", then all of the log blocks associated with the log stream will be deleted. In one example, in order to delete all of the blocks, the assignment key value from list controls of the data list header is read, STEP 696 "READ KEY ASSIGNMENT VALUE FROM DATA LIST CONTROLS." In particular, a read list controls command is issued, which returns in the response operands the list controls associated with the data list header of the list structure. One example of the read list controls command is described in detail in "Apparatus And Method For List Management In A Coupled Data Processing System," by J. A. Frey et al., Ser. No. 07/860,633, Filed: Mar. 30, 1992, now U.S. Pat. No. 5,410,695, which is hereby incorporated herein by reference in its entirety. Thus, the read list controls command places the value of the assignment key, which represents the block id to be assigned to the next record, in the assignment key operand. The returned assignment key represents the next valid block id to be assigned.

Additionally, the configuration data on the control list header is updated using, for example, the write list entry (element) command described in detail above, STEP 698 "UPDATE CONFIGURATION DATA ON THE CONTROL LIST HEADER." The update indicates, for example, the new lowest valid block id for the log stream, which is retrieved when the assignment key is read in STEP 696. Thereafter, local serialization is released, STEP 700 and a return is made to the caller's address space, STEP 702.

Returning to INQUIRY 694 "DELETE BLOCKS (RANGE) REQUEST?", if a range of log blocks to be deleted was specified, then a determination is made as to whether the passed block id represents a valid log block, INQUIRY 704. In particular, the validity checking involves range checking to see if the block id is within the valid range of block ids and reading the log block, as described in detail above. If an invalid log block id was passed, then an error return code is passed to the caller, STEP 686, and delete processing is complete. However, if the block id is valid then processing continues with STEP 698 "UPDATE CONFIGURATION DATA ON THE CONTROL LIST HEADER."

Figures 17A, 17B:
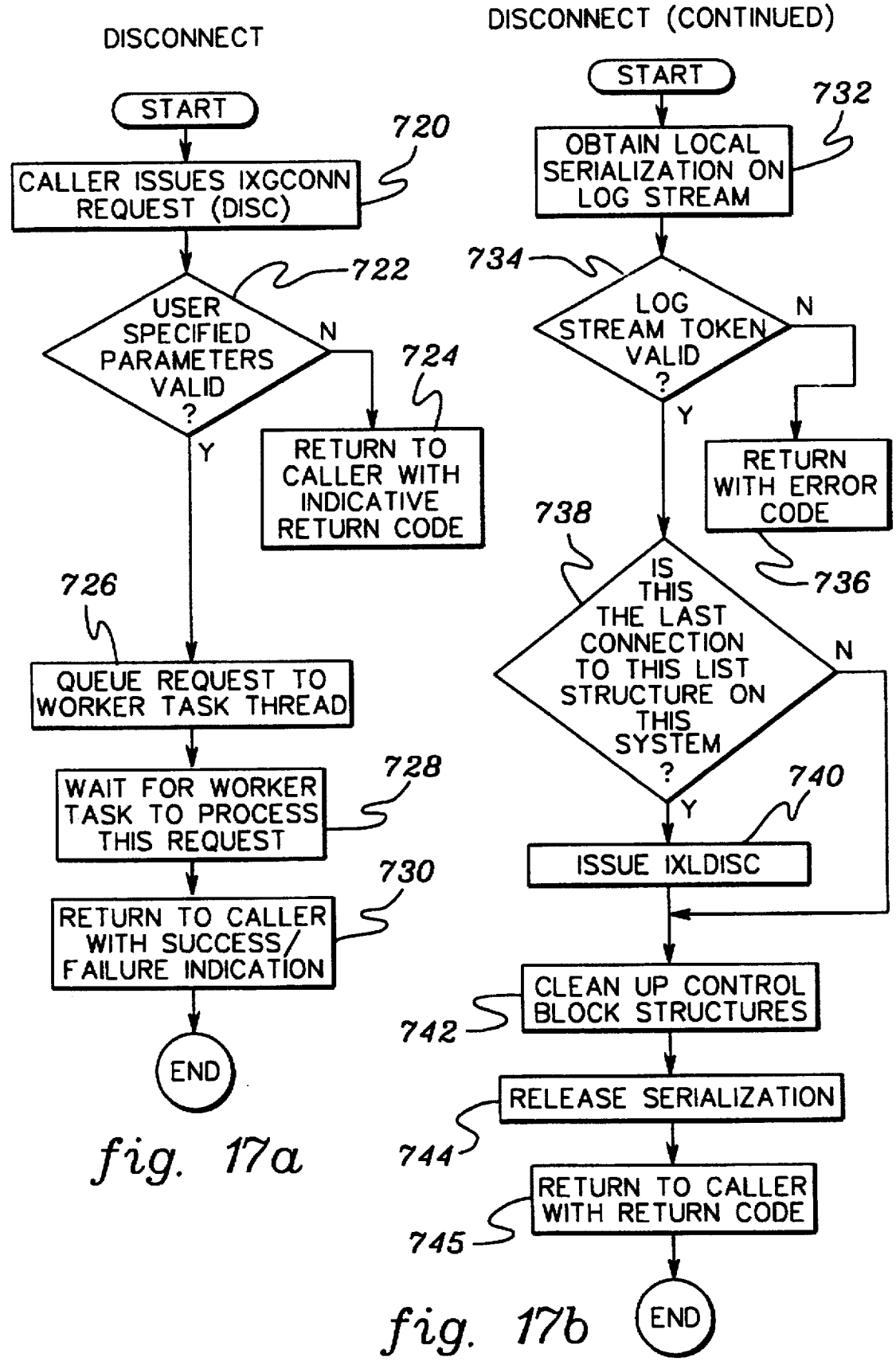
FIGS. 17a–17b depict one example of the logic associated with disconnecting from a log stream, in accordance with the principles of the present invention.

In accordance with the principles of the present invention, when an application no longer needs to access a log stream, it disconnects from the log stream. If the application has connected to the same log stream multiple times, then the application must issue a corresponding number of disconnect requests. When the connection count to the log stream in the system logger address space reaches zero, the log stream token is invalidated. No tasks in the application's address space can issue MVS system logger requests using that token. One embodiment of disconnect processing is depicted in FIGS. 17a–17b and described in detail below.

Initially, the caller invokes the IXGCONN service specifying REQUEST(DISC) and indicating the log stream to disconnect from, STEP 720 "CALLER ISSUES IXGCONN SPACE REQUEST(DISC)." In one example, the log stream to be disconnected is identified by the STREAMTOKEN parameter of the IXGCONN macro.

Thereafter, a determination is made as to whether the specified user parameters indicated on the IXGCONN macro are valid, INQUIRY 722 "USER SPECIFIED PARAMETERS VALID?" If the parameters are invalid, then an indicative return code is returned to the caller, STEP 724 "RETURN TO CALLER WITH INDICATIVE RETURN CODE."

If, however, the specified input parameters are valid, then the disconnect request is queued to the worker task thread, as described above with connect processing, STEP 726 "QUEUE REQUEST TO WORKER TASK THREAD." In due course, the request is processed by the worker task, STEP 728 "WAIT FOR WORKER TASK TO PROCESS THIS REQUEST." Subsequently, an indication is returned to the caller, specifying whether or not the processing of the request was successful, STEP 730 "RETURN TO CALLER WITH SUCCESS/FAILURE INDICATION."

One embodiment of the processing of the disconnect request by the worker task is described below with reference to FIG. 17b. Initially, local serialization is obtained on the log stream, such that no other connects or disconnects to the log stream can be made on this system until this disconnect is complete, STEP 732 "OBTAIN LOCAL SERIALIZATION ON LOG STREAM."

Next, a determination is made as to whether the log stream token input on the IXGCONN service to indicate the log stream to disconnect from is valid, INQUIRY 734 "LOG STREAM TOKEN VALID?" Should the log stream token be invalid, an indicative return code is provided, STEP 736 "RETURN WITH ERROR RETURN CODE," and disconnect processing is terminated. However, if the log stream token is valid, another determination is made as to whether this is the last connection to this structure on this system, INQUIRY 738.

Should this be the last connection to this list structure on this system, then disconnect processing is continued by invoking, for example, a service referred to as IXLDISC, STEP 740 "ISSUE IXLDISC" IXLDISC is described in detail in "A Structure Rebuild Method and System," by Allen et al., Ser. No. 08/146,635, Filed Nov. 1, 1993, now abandoned, which is hereby incorporated herein by reference in its entirety. Thereafter, or if this was not the last connection to this list structure on this system, the control block structures are cleaned up such that knowledge about the connection to the log stream is erased, and local serialization is released, STEPS 742, 744. Additionally, a return code indicative of the disconnect processing is returned to the caller, STEP 745 "RETURN TO CALLER WITH RETURN CODE," and processing of disconnect is complete.

Described above in detail is the system logger and examples of the services it provides. The logic flows depicted and described represent only one example. It is possible that some of the steps of the flows are interchangeable, while others are added or deleted without departing from the spirit of the invention. A number of commands have been referenced, such as a write list controls command, a write list entry command, a read list controls command, a read list entry command, as well as others. These commands are described in detail in, for example, "Apparatus And Method For List Management In A Coupled Data Processing System," by J. A. Frey et al., Ser. No. 07/860,633, Filed: Mar. 30, 1992, now U.S. Pat. No. 5,410,695, which is hereby incorporated herein by reference in its entirety.

The following is one example of how the system logger services of the present invention are used. The example contains two applications. The first application, APPL1, is a server application that is responsible for writing log records for one or more clients. In one example, APPL1 represents CICS offered by International Business Machines Corporation. The clients add their log records to a queue and notify APPL1 whenever the queue transitions to non-empty. When the queue transitions to non-empty, the log records are written to a log stream. The second application, APPL2, is an application that is responsible for periodically reading all the data from the log stream, processing each log record of the log stream and then deleting all of the data that it just read.

There can be one or more instances of APPL1 running on each operating system in the coupled system. The same can be true of APPL2. However, if the nature of the log data is such that it is not acceptable for multiple APPL2's to be processing the same log data in parallel, then serialization could be employed to prevent the same.

Figure 19:
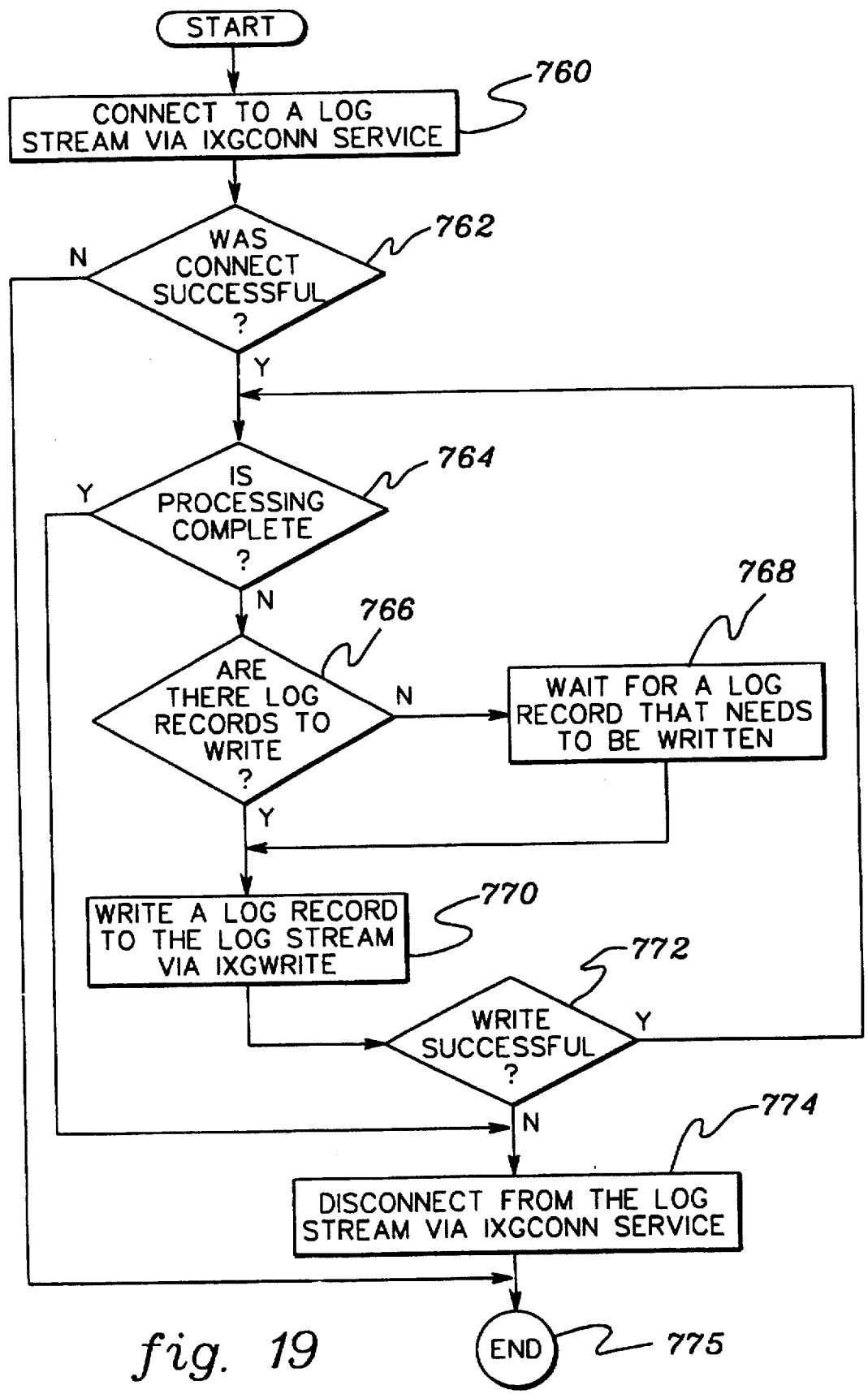
FIG. 19 depicts one embodiment of an application connecting to a log stream and writing log blocks to the log stream, in accordance with the principles of the present invention.

FIG. 19 depicts one example of the logic associated with the use of the system logger by APPL1. Initially, APPL1 connects to a log stream via, for example, the IXGCONN connection service described in detail above, STEP 760 "CONNECT TO A LOG STREAM VIA IXGCONN SERVICE." After the connect is issued, a determination is made as to whether the connect was successful, INQUIRY 762 "WAS CONNECT SUCCESSFUL?" If the connect was unsuccessful, then processing of the connect service terminates and APPL1 may take any action it deems appropriate. However, if APPL1 successfully connected to the log stream, then a determination is made as to whether processing, as specified by the application, is complete, INQUIRY 764 "IS PROCESSING COMPLETE?"

If application processing is complete, then the application disconnects from the log stream via, for example, the IXGCONN service described in detail above, STEP 774 "DISCONNECT FROM THE LOG STREAM VIA IXGCONN SERVICE."

On the other hand, if application processing is not complete, then there is a further inquiry into whether there are log records to be written, INQUIRY 766 "ARE THERE LOG RECORDS TO WRITE?" The specific manner in which this inquiry could be answered is application dependent. However, in one example, APPL1, checks a queue. If the queue is empty and therefore, there are no log records to be processed, then the application waits for a log record that needs to be written, STEP 768 "WAIT FOR A LOG RECORD THAT NEEDS TO BE WRITTEN." Once again, the mechanism for waiting and being notified of a log record to be written is application specific. It is possible, for instance, that another application writes a record to a queue and then, notifies APPL1 that there is work to be processed.

When there is a log record to be written to the log stream designated by the application, the log record is written using, for example, the IXGWRITE service described in detail above. If the write was unsuccessful, INQUIRY 772 "WRITE SUCCESSFUL?", then APPL1 disconnects from the log stream using, for instance, IXGCONN, and processing is complete, STEPS 774, 775. However, if the write was successful, then processing continues with INQUIRY 764 "IS PROCESSING COMPLETE?".

Figure 20:
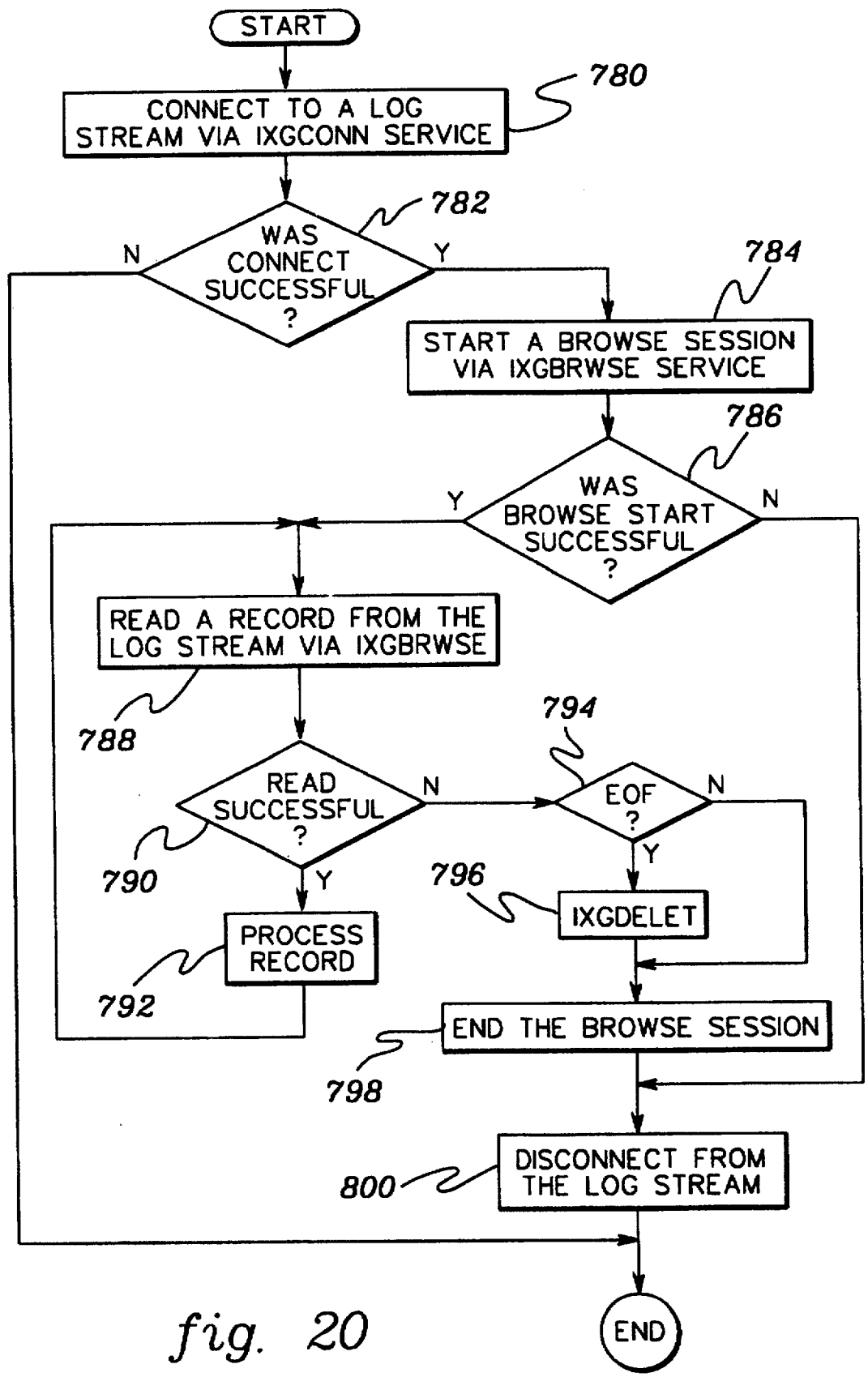
FIG. 20 depicts one embodiment of an application browsing log blocks in a log stream and deleting from a log stream, in accordance with the principles of the present invention.

The second application, APPL2, is responsible, in this example, for periodically reading the data or the log records from a specified log stream, processing each log record and then deleting all of the log records from the log stream. One example of the processing logic associated with APPL2 is described in detail with reference to FIG. 20.

Initially, APPL2 connects to a log stream it designates when issuing the IXGCONN service, STEP 780. If the connection was unsuccessful, INQUIRY 782 "WAS THE CONNECT SUCCESSFUL?", then the application takes any action it deems appropriate. However, if the connect was successful, then a browse session is started using, for example, IXGBRWSE service described in detail above, STEP 784 "START A BROWSE SESSION VIA IXG-BRWSE SERVICE." In particular, in one example, APPL2 issues an IXGBRWSE REQUEST=START. It is assumed for this particular example that the cursor position is initialized at the oldest block in the log stream, where the oldest block is defined as the block with the oldest timestamp which has not been deleted from the log stream.

If initiation of the browse session was unsuccessful, INQUIRY 786 "WAS BROWSE START SUCCESSFUL?", then APPL2 disconnects from the log stream using IXGCONN, as one example, STEP 800 "DISCONNECT FROM LOG STREAM," and processing is complete. On the other hand, if the browse start was successful, then a record is read from the log stream using the IXGBRWSE service, STEP 788. In one example, it is possible to sequentially read all the log blocks in the log stream by specifying REQUEST=READCURSOR on the IXGBRWSE service.

If the log block was successfully read, INQUIRY 790 "READ SUCCESSFUL?", then the record is processed in a manner indicated by APPL2, STEP 792 "PROCESS RECORD," and processing continues with STEP 788 "READ A RECORD FROM THE LOG STREAM VIA IXGBRWSE."

Returning to INQUIRY 790, if the read was unsuccessful, then a determination is made as to whether the end of data has been reached, INQUIRY 794 "EOF?" If the end of file has been reached indicating there are no more log records to be read from the log stream, then each of the log records read is deleted using, for example, the IXGDELET service described in detail above, STEP 796 "IXGDELET."

Subsequent to deleting the log records, the browse session is ended and the application disconnects from the log stream, STEP 798 "END THE BROWSE SESSION," STEP 800 "DISCONNECT FROM THE LOG STREAM."

Returning to INQUIRY 790, if the read was unsuccessful and it was not the end of file, INQUIRY 794, then an unexpected error has occurred and the application disconnects from the log stream using, for example, IXGCONN, STEP 800 "DISCONNECT FROM LOG STREAM."

Although a preferred embodiment has been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for managing log data in a data processing system comprising a plurality of processors, said method comprising:

writing, by said plurality of processors, a plurality of data records to a log stream, said log stream comprising at least a portion of a coupling facility storage structure residing within a coupling facility, said coupling facility sharable by said plurality of processors and comprising a processor and a communications facility, said writing comprising:

providing a real-time merge of said plurality of data records in a particular sequence, said providing comprising performing serialization for said log stream at said coupling facility, wherein said plurality of processors are relieved of providing said serialization for said log stream.

2. The method of claim 1, wherein said providing comprises writing said plurality of data records to said log stream in time sequence.

3. The method of claim 2, wherein said providing comprises:

determining a value for a list authority control; and using said value to place said plurality of data records within said log stream in time sequence.

4. The method of claim 2, further comprising retrieving one or more of said plurality of data records using a selected time stamp.

5. The method of claim 1, further comprising determining a logical identifier for each of said plurality of data records, wherein each of said plurality of data records has a respective logical identifier, each logical identifier representing a logical offset into said log stream.

6. The method of claim 5, wherein each logical identifier represents a key for direct access to its respective data record when said respective data record resides in said at least a portion of said coupling facility storage structure.

7. The method of claim 5, wherein said log stream further comprises one or more data sets and wherein each logical identifier is usable in direct access of its respective data record when said respective data record resides in one of said one or more data sets.

8. The method of claim 1, wherein said at least a portion of said coupling facility storage structure comprises a list.

9. The method of claim 1, further comprising concurrently performing a function against said log stream being written to while maintaining integrity of said log stream.

10. The method of claim 9, wherein said function comprises one of the following functions: a write function, a delete function, a read function and an off-load function.

11. The method of claim 1, wherein said log stream further comprises one or more data sets and said method further comprises off-loading one or more of said plurality of data records from said at least a portion of said coupling facility storage structure to said one or more data sets.

12. The method of claim 11, wherein said off-loading comprises:

reading one or more data records from said at least a portion of said coupling facility storage structure;

storing in an input/output buffer a predetermined amount of said one or more data records read from said at least a portion of said coupling facility storage structure; and writing said input/output buffer to said one or more data sets when said predetermined amount of said one or more data records is stored in said input/output buffer.

13. The method of claim 12, further comprising repeating said storing and writing until said one or more data records read from said at least a portion of said coupling facility storage structure has been stored in said input/output buffer.

14. The method of claim 13, further comprising deleting from said at least a portion of said coupling facility storage structure said one or more data records read from said at least a portion of said coupling facility storage structure after said one or more data records is written to said one or more data sets.

15. The method of claim 11, further comprising off-loading said one or more data records until a predefined low threshold of resources has been attained for said at least a portion of said coupling facility storage structure.

16. A system for managing log data in a data processing system comprising a plurality of processors, said system comprising:

a log stream comprising at least a portion of a coupling facility storage structure residing within a coupling facility, said coupling facility sharable by said plurality of processors and comprising a processor and a communications facility, said coupling facility being adapted to provide serialization for said log stream, wherein said plurality of processors is relieved of providing said serialization for said log stream; and means for writing, by said plurality of processors, a plurality of data records to said log stream in a particular sequence, wherein a real-time merge of said plurality of data records is provided.

17. The system of claim 16, wherein said means for writing comprises means for writing said plurality of data records to said log stream in time sequence.

18. The system of claim 17, wherein said means for writing comprises:

means for determining a value for a list authority control; and means for using said value to place said plurality of data records within said log stream in time sequence.

19. The system of claim 17, further comprising means for retrieving one or more of said plurality of data records using a selected time stamp.

20. The system of claim 16, further comprising means for determining a logical identifier for each of said plurality of data records, wherein each of said plurality of data records has a respective logical identifier, each logical identifier representing a logical offset into said log stream.

21. The system of claim 20, wherein each logical identifier represents a key for direct access to its respective data record when said respective data record resides in said at least a portion of said coupling facility storage structure.

22. The system of claim 20, wherein said log stream further comprises one or more data sets and wherein each logical identifier is usable in direct access of its respective data record when said respective data record resides in one of said one or more data sets.

23. The system of claim 16, wherein said at least a portion of said coupling facility storage structure comprises a list.

24. The system of claim 16, further comprising means for concurrently performing a function against said log stream being written to while maintaining integrity of said log stream.

25. The system of claim 24, wherein said function comprises one of the following functions: a write function, a delete function, a read function and an off-load function.

26. The system of claim 16, wherein said log stream further comprises one or more data sets and said system further comprises means for off-loading one or more of said plurality of data records from said at least a portion of said coupling facility storage structure to said one or more data sets.

27. The system of claim 26, wherein said means for off-loading comprises:

means for reading one or more data records from said at least a portion of said coupling facility storage structure;

an input/output buffer storing a predetermined amount of said one or more data records read from said at least a portion of said coupling facility storage structure; and means for writing said input/output buffer to said one or more data sets when said predetermined amount of said one or more data records is stored in said input/output buffer.

28. The system of claim 27, further comprising means for deleting from said at least a portion of said coupling facility storage structure one or more data records read from said at least a portion of said coupling facility storage structure after said one or more data records is written to said one or more data sets.

29. The system of claim 26, further comprising means for off-loading said one or more data records until a predefined low threshold of resources has been attained for said at least a portion of said coupling facility storage structure.

30. A method for logging information in a data processing system comprising a first processor executing a first application and a second processor executing a second application, said method comprising:

said first application writing a first record to a log stream; and said second application writing a second record to said log stream, said first and second applications writing independently of each other such that application serialization during said writing of said first record and said second record is not necessary, and wherein the writing of the first and second records provides a real-time merge of said first record and said second record in a predetermined logical sequence.

31. The method of claim 30, further comprising determining prior to writing said second record if said second record can be written to said log stream in said predetermined logical sequence.

32. The method of claim 31, wherein said predetermined logical sequence comprises ascending time order and wherein said determining comprises performing a list authority comparison, wherein said second record is not written when said list authority comparison is unsuccessful.

33. The method of claim 32, wherein said performing comprises:

comparing a comparative list authority operand with a list authority control to determine if a predefined relationship exists between said comparative list authority operand and said list authority control.

34. The method of claim 33, wherein said predefined relationship comprises a less than or equal operation.

35. The method of claim 30, further comprising assigning a first identifier to said first record and a second identifier to said second record, said first and second identifiers indicating the logical sequence of said first and second records in said log stream, said first identifier and said second identifier representing logical offsets into said log stream for direct access of said first record and said second record, respectively.

36. The method of claim 35, wherein said assigning is performed independently of other functions processing against said log stream.

37. The method of claim 35, further comprising using said first identifier during one or more operations requiring direct access to said first record.

38. The method of claim 37, wherein said one or more operations comprises one of deleting said first record from the log stream and reading said first record in the log stream.

39. The method of claim 35, wherein said log stream comprises at least a portion of a coupling facility storage structure and one or more data sets, and wherein said first identifier is usable in direct access of said first record regardless of its location in said at least a portion of said coupling facility storage structure and said one or more data sets.

40. The method of claim 30, wherein said first application and said second application each writes a plurality of records to said log stream in said predetermined logical sequence.

41. The method of claim 30, wherein said log stream comprises a portion of a coupling facility storage structure and one or more data sets and said method further comprises reading said log stream to read one of said first and second records regardless of its location in said at least a portion of said coupling facility storage structure and said one or more data sets.

42. The method of claim 30, further comprising:

assigning, by said first processor, a first identifier to said first record as part of said writing of said first record; and assigning, by said second processor, a second identifier to said second record as part of said writing of said second record, wherein said first processor assigns said first identifier and said second processor assigns said second identifier without communicating with each other about the assigning of the first and second identifiers.

43. The method of claim 42, wherein said assigning said first identifier comprises setting said first identifier equal to an assignment variable.

44. The method of claim 43, further comprising:

determining an increment value; and updating said assignment variable by said increment value, wherein the updated assignment variable comprises said second identifier.

45. The method of claim 30, wherein said log stream comprises a coupling facility list structure and one or more data sets.

46. A method for assigning identifiers to data records within a data processing system, said method comprising:

dynamically determining a unique identifier for a record to be written to a stream of records, said identifier being in logical sequence with any other identifiers associated with said stream of records and representing a logical relative offset into said stream of records for direct access of said record, wherein said identifier is determined independently of other functions being processed against said stream of records; and assigning said identifier to said record when said record is written to said stream of records.

47. The method of claim 46, wherein said other functions comprises one of a write function, a delete function, a read function and an off-load function.

48. The method of claim 46, wherein said stream of records comprises at least a portion of a coupling facility storage structure and a data set, and wherein said identifier is usable in direct access of said record, regardless of whether said record is stored in said coupling facility storage structure or said data set.

49. The method of claim 46, wherein said assigning comprises setting said identifier equal to an assignment variable.

50. The method of claim 49, further comprising:

determining an increment value; and updating said assignment variable by said increment value, wherein the updated assignment variable comprises a next identifier to be assigned.

51. A system for logging information in a data processing system, said system comprising:

a first processor adaptable to write a first record to a log stream; and a second processor adaptable to write a second record to said log stream, said first and second processors being adaptable to write independently of each other such that application serialization during said writing of said first record and said second record is not necessary, and wherein the writing of the first and second records provides a real-time merge of said first record and said second record in a predetermined logical sequence.

52. The system of claim 51, further comprising means for determining prior to writing said second record if said second record can be written to said log stream in said predetermined logical sequence.

53. The system of claim 52, wherein said predetermined logical sequence comprises ascending time order and wherein said means for determining comprises means for performing a list authority comparison, wherein said second record is not written when said list authority comparison is unsuccessful.

54. The system of claim 53, wherein said means for performing comprises:

means for comparing a comparative list authority operand with a list authority control to determine if a predefined relationship exists between said comparative list authority operand and said list authority control.

55. The system of claim 54, wherein said predefined relationship comprises a less than or equal operation.

56. The system of claim 51, further comprising means for assigning a first identifier to said first record and a second identifier to said second record, said first and second identifiers indicating the logical sequence of said first and second records in said log stream, said first identifier and said second identifier representing logical offsets into said log stream for direct access of said first record and said second record, respectively.

57. The system of claim 56, wherein said means for assigning is performed independently of other functions processing against said log stream.

58. The system of claim 56, further comprising means for using said first identifier during one or more operations requiring direct access to said first record.

59. The system of claim 58, wherein said one or more operations comprises one of deleting said first record from the log stream and reading said first record in the log stream.

60. The system of claim 56, wherein said log stream comprises at least a portion of a coupling facility storage structure and one or more data sets, and wherein said first identifier is usable in direct access of said first record regardless of its location in said at least a portion of said coupling facility storage structure and said one or more data sets.

61. The system of claim 51, wherein said first application and said second application each writes a plurality of records to said log stream in said predetermined logical sequence.

62. The system of claim 51, wherein said log stream comprises a portion of a coupling facility storage structure and one or more data sets and said system further comprises means for reading said log stream to read one of said first and second records regardless of its location in said at least a portion of said coupling facility storage structure and said one or more data sets.

63. The system of claim 51, wherein:

said first processor is adaptable to assign a first identifier to said first record as part of said writing of said first record; and said second processor is adaptable to assign a second identifier to said second record as part of said writing of said second record, and wherein said first processor assigns said first identifier and said second processor assigns said second identifier without communicating with each other about the assigning of the first and second identifiers.

64. The system of claim 63, wherein said assigning said first identifier comprises means for setting said first identifier equal to an assignment variable.

65. The system of claim 64, further comprising:

means for determining an increment value; and means for updating said assignment variable by said increment value, wherein the updated assignment variable comprises said second identifier.

66. The system of claim 51, wherein said log stream comprises a coupling facility list structure and one or more data sets.

67. A system for assigning identifiers to data records within a data processing system, said system comprising:

means for dynamically determining a unique identifier for a record to be written to a stream of records, said identifier being in logical sequence with any other identifiers associated with said stream of records and representing a logical relative offset into said stream of records for direct access of said record, wherein said identifier is determined independently of other functions being processed against said stream of records; and means for assigning said identifier to said record when said record is written to said stream of records.

68. The system of claim 67, wherein said other functions comprises one of a write function, a delete function, a read function and an off-load function.

69. The system of claim 67, wherein said stream of records comprises at least a portion of a coupling facility storage structure and a data set, and wherein said identifier is usable in direct access of said record, regardless of whether said record is stored in said coupling facility storage structure or said data set.

70. The system of claim 67, wherein said means for assigning comprises means for setting said identifier equal to an assignment variable.

71. The system of claim 70, further comprising:

means for determining an increment value; and means for updating said assignment variable by said increment value, wherein the updated assignment variable comprises a next identifier to be assigned.

* * * * *